US012316417B2

(12) United States Patent
Ramireddy et al.

(10) Patent No.: US 12,316,417 B2
(45) Date of Patent: May 27, 2025

(54) EXPLICIT CHANNEL INFORMATION FEEDBACK BASED ON HIGH-ORDER PCA DECOMPOSITION OR PCA COMPOSITION

(71) Applicant: Fraunhofer-Gesellschaft zur Foerderung der angewandten Forschung e.V., Munich (DE)

(72) Inventors: Venkatesh Ramireddy, Erlangen (DE); Markus Landmann, Erlangen (DE); Marcus Grossmann, Erlangen (DE); Florian Römer, Saarbrücken (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/543,086

(22) Filed: Dec. 18, 2023

(65) Prior Publication Data

US 2024/0154672 A1 May 9, 2024

Related U.S. Application Data

(63) Continuation of application No. 16/950,688, filed on Nov. 17, 2020, now Pat. No. 11,876,589, which is a
(Continued)

(30) Foreign Application Priority Data

Jun. 1, 2018 (EP) ..................... 18175629

(51) Int. Cl.
*H04B 7/06* (2006.01)
*H04B 7/0426* (2017.01)
*H04B 7/0456* (2017.01)

(52) U.S. Cl.
CPC ......... *H04B 7/0626* (2013.01); *H04B 7/0434* (2013.01); *H04B 7/0456* (2013.01)

(58) Field of Classification Search
CPC ... H04B 7/0626; H04B 7/0434; H04B 7/0456
See application file for complete search history.

(56) References Cited

U.S. PATENT DOCUMENTS

2007/0254602 A1 11/2007 Li et al.
2010/0271931 A1 10/2010 Cheng et al.
(Continued)

FOREIGN PATENT DOCUMENTS

CN 101432996 A 5/2009
CN 102415002 A 4/2012
(Continued)

OTHER PUBLICATIONS

C. Peng et al., Multidimensional Compressive Sensing Based Analog CSI Feedback for Massive MIMO-OFDM Systems, pp. 1-6, 2014 IEEE 80th Vehicular Technology Conference (VTC2014—Fall), Sep. 14, 2014, IEEE, XP032695191, 2014.
(Continued)

*Primary Examiner* — Curtis B Odom
(74) *Attorney, Agent, or Firm* — Perkins Coie LLP; Michael A. Glenn

(57) ABSTRACT

A communication device for providing an explicit channel state information, CSI, feedback in a wireless communication system includes a transceiver to receive, from a transmitter a radio signal via a radio time-variant frequency MIMO channel, the radio signal including downlink reference signals according to a reference signal configuration, and downlink signals including the reference signal configuration, and a processor. The processor estimates the CSI using measurements on the downlink reference signals of the radio channel according to the reference signal configuration over one or more time instants/slots, constructs a frequency-domain channel tensor using the CSI estimate, performs a higher-order principal component analysis, HO-PCA, on the channel tensor, identifies a plurality of domi-
(Continued)

nant principal components of the channel tensor, thereby obtaining a compressed channel tensor, and reports to the transmitter the explicit CSI including the dominant principal components of the channel tensor.

7 Claims, 18 Drawing Sheets

Related U.S. Application Data continuation of application No. PCT/EP2019/063887, filed on May 28, 2019.

(56) References Cited

U.S. PATENT DOCUMENTS

| | | | |
|---|---|---|---|
| 2013/0242773 | A1 | 9/2013 | Bergman et al. |
| 2017/0302353 | A1* | 10/2017 | Rahman ............... H04B 7/0486 |
| 2018/0076871 | A1 | 3/2018 | Rahman et al. |

FOREIGN PATENT DOCUMENTS

| | | |
|---|---|---|
| CN | 107171702 A | 9/2017 |
| WO | 2017190356 A1 | 11/2017 |
| WO | 2018052255 A1 | 3/2018 |

OTHER PUBLICATIONS

Y. Zhu et al., HOSVD-based limited feedback and precoding design for massive MIMO systems, pp. 1-6, 2016 IEEE/CIC International Conference on Communications in China (ICCC Workshops), Jul. 27, 2017 IEEE, XP032976331, 2016.

TS 38.211 (3GPP TS 38.211 V15.1.0, 3rd Generation Partnership Project; Technical Specification Group Radio Access Network; NR; Physical channels and modulation, Release 15, sub-clause 7.4.1.5, Mar. 2018, 2018.

TS.38.331, 3GPP TS 38.331 V15.1.0, 3rd Generation Partnership Project; Technical Specification Group Radio Access Network; NR; Radio Resource Control (RRC); Protocol specification, Release 15, sub-clause 6.3.2, Mar. 2018, 2018.

* cited by examiner

```
-- ASN1START
-- TAG-CSI-RS-BURSTDURATION-START

CSI-RS-BURSTDURATION ::=   ENUMERATED {
   burstSlots0, burstSlots1, burstSlots2, burstSlots3,
burstSlots4, burstSlots5
}

-- TAG- CSI-RS-BURSTDURATION-STOP
-- ASN1STOP
```

Fig. 17

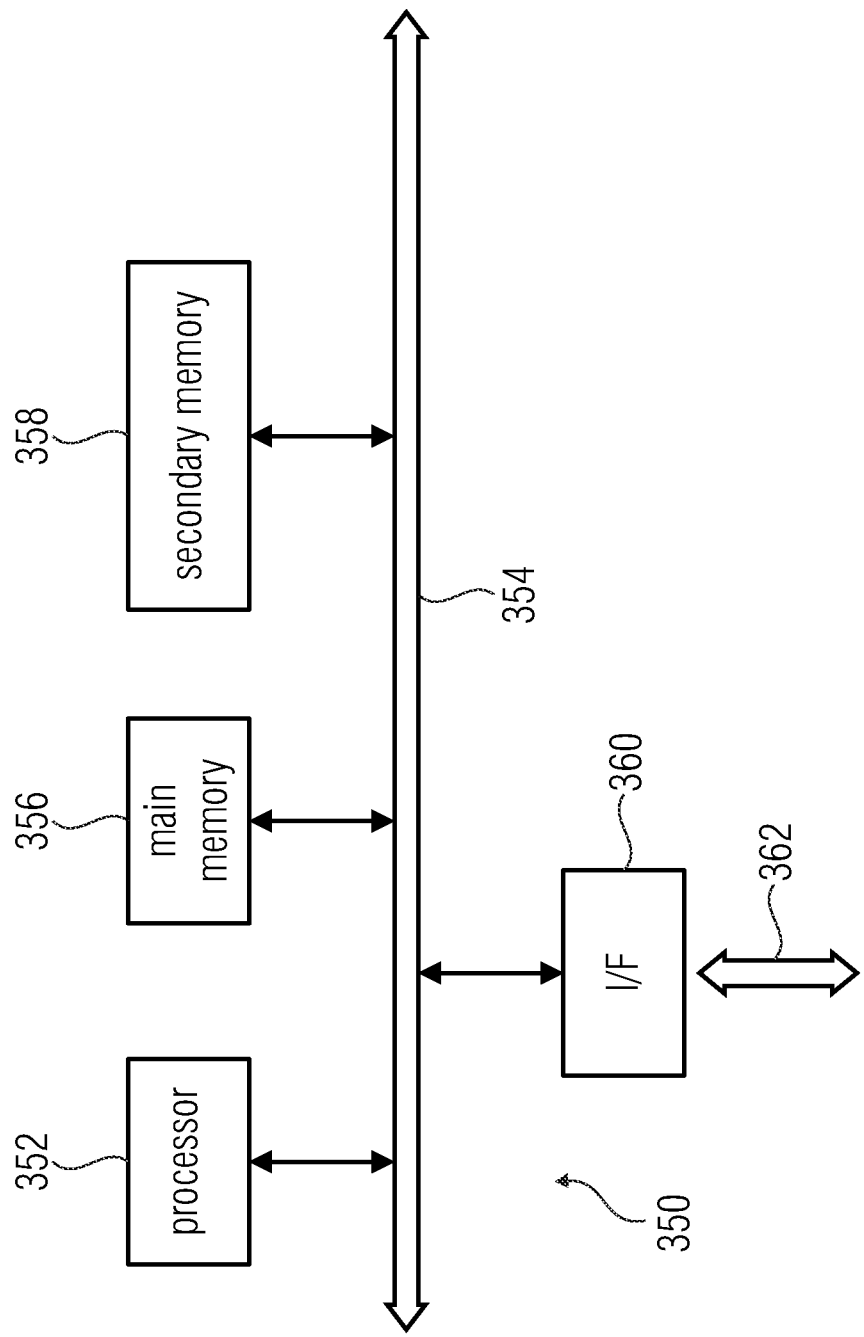

EXPLICIT CHANNEL INFORMATION FEEDBACK BASED ON HIGH-ORDER PCA DECOMPOSITION OR PCA COMPOSITION

CROSS-REFERENCES TO RELATED APPLICATIONS

This application is a continuation of copending U.S. patent application Ser. No. 16/950,688, filed Nov. 17, 2020, which in turn is a continuation of copending International Application No. PCT/EP2019/063887, filed May 28, 2019, which is incorporated herein by reference in its entirety, and additionally claims priority from European Application No. EP 18 175 629.7, filed Jun. 1, 2018, which is incorporated herein by reference in its entirety.

BACKGROUND OF THE INVENTION

The present application concern with the field of wireless communications, more specifically to wireless communication systems employing precoding using explicit channel state information, CSI.

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

Moreover, the downlink signal(s) of the base station (gNB) may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part, and used at the user equipment (UE) to obtain a channel estimate to demodulate the data or control information. The CSI-RS is transmitted with a reduced density in the time and frequency domain compared to CRS, and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanism were introduced such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beamforming operation is applied over a single- or multiple antenna ports to have several narrow beams with high gain in different directions and therefore, no cell-wide coverage.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver. The precoder matrix to be used at the gNB to map the data to the transmit antenna ports is decided using channel state information, CSI.

In a wireless communication system employing time division duplexing, TDD, due to channel reciprocity, the channel state information (CSI) is available at the base station (gNB). However, when employing frequency division duplexing, FDD, due to the absence of channel reciprocity, the channel has to be estimated at the UE and feed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel.15 support the use of several downlink reference symbols (such as CSI-RS) for CSI estimation at the UE. In FDD systems (up to Rel. 15), the estimated channel at the UE is reported to the gNB implicitly where the CSI transmitted by the UE over the feedback channel includes the rank index (RI), the precoding matrix index (PMI) and the channel quality index (CQI) (and the CRI from Rel. 13) allowing, at the gNB, deciding the precoding matrix, and the modulation order and coding scheme (MCS) of the symbols to be transmitted. The PMI and the RI are used to determine the precoding matrix from a predefined set of matrices Ω called 'codebook'. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antenna elements), or with two-dimensional Uniform Planar Arrays (UPAs) having $N_1N_2$ dual-polarized antennas (in total $N_t=2N_1N_2$ antenna elements). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the 'array steering vectors') of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to 'read' the codebook and obtain the precoder. The array steering vectors may be described by the columns of a 2D Discrete Fourier Transform (DFT) matrix.

An inherent drawback of implicit feedback is the limited accuracy of the CSI available at the gNB which may be inadequate for the use of advanced precoder techniques such as non-linear (NL) precoding in multi-user settings. Since future NR systems (e.g., Rel. 16) are likely to be based on advanced precoder techniques, the usage of implicit CSI feedback may result in a CSI mismatch which will become a serious issue when high performance gains are targeted. Considering this issue, RAN1 has agreed to support a specification on advanced CSI reporting such as explicit CSI in the upcoming Rel. 16. Here, explicit CSI refers to reporting of explicit channel coefficients from the UE to the gNB without a codebook for the precoder selection at the UE. With explicit CSI feedback, no codebook is used to determine the precoder. The coefficients of the precoder matrix are transmitted explicitly by the UE. Alternatively, the coefficients of the instantaneous channel matrix may be transmitted, from which the precoder is determined by the gNB.

WO 2018/052255 A1 relates to explicit CSI acquisition to represent the channel in wireless communication systems using the principal component analysis (PCA), which is applied on the frequency-domain channel matrix, covariance matrix, or eigenvector of the channel matrix. A major disadvantage of the PCA approach is that the size (with respect to the dimensions) of the "compressed" channel matrix after the PCA decomposition is identical to the size of the "uncompressed" channel matrix. Therefore, the feedback overhead scales linearly with the system bandwidth size, i.e., with the total number of allocated sub-bands. Thus, the availability of accurate explicit CSI comes at an increased overhead for the feedback channel which is not desired.

This issue could be solved, in principle, with an increase in the sub-band size for large system bandwidth sizes. However, the increase of the sub-band size comes at the expense of a reduced CSI accuracy at the gNB.

It is noted that the information in the above section is only for enhancing the understanding of the background of the invention and therefore it may contain information does not form known technology that is already known to a person of ordinary skill in the art.

SUMMARY

An embodiment may have a communication device for providing an explicit channel state information, CSI, feedback in a wireless communication system, the communication device including: a transceiver configured to receive, from a transmitter a radio signal via a radio time-variant frequency MIMO channel, the radio signal including downlink reference signals according to a reference signal configuration, and downlink signals including the reference signal configuration, and a processor configured to
- estimate the CSI using measurements on the downlink reference signals of the radio channel according to the reference signal configuration over one or more time instants/slots,
- construct a frequency-domain channel tensor using the CSI estimate,
- perform a higher-order principal component analysis, HO-PCA, on the channel tensor,
- identify a plurality of dominant principal components of the channel tensor, thereby acquiring a compressed channel tensor, and
- report to the transmitter the explicit CSI including the dominant principal components of the channel tensor.

Another embodiment may have a communication device for providing an explicit channel state information, CSI, feedback in a wireless communication system, the communication device including: a transceiver configured to receive, from a transmitter a radio signal via a radio time-variant frequency MIMO channel, the radio signal including downlink reference signals according to a reference signal configuration, and downlink signals including the reference signal configuration; and a processor configured to
- estimate the CSI using measurements on the downlink reference signals of the radio channel according to the reference signal configuration over one or more time instants/slots,
- construct a frequency-domain channel tensor using the CSI estimate,
- calculate a transformed channel tensor using the channel tensor,
- rewrite the transformed channel tensor to a transformed channel matrix,
- perform a standard principal component analysis, PCA, on the transformed channel matrix,
- identify a plurality of dominant principal components of the transformed channel matrix,
- thereby acquiring a transformed/compressed channel matrix, and
- report to the transmitter the explicit CSI including the plurality of dominant principal components of the transformed/compressed channel tensor.

Another embodiment may have a communication device for providing an explicit channel state information, CSI, feedback in a wireless communication system, the communication device including: a transceiver configured to receive, from a transmitter a radio signal via a radio time-variant frequency MIMO channel, the radio signal including downlink reference signals according to a reference signal configuration, and downlink signals including the reference signal configuration; and a processor configured to
- estimate the CSI using measurements on the downlink reference signals of the radio channel,
- construct a frequency-domain channel matrix using the CSI estimate,
- perform a standard principal component analysis, PCA, on the channel matrix,
- identify the dominant principal components of the channel matrix, the channel matrix including
  - a first set of r basis vectors contained in a matrix $\overline{U}=[u_1, u_2, \ldots, u_r] \in \mathbb{C}^{N_t N_r \times r}$;
  - a second set of r basis vectors contained in a matrix $\overline{V}=[v_1, v_2, \ldots, v_r] \in \mathbb{C}^{S \times r}$; and
  - a third set of r coefficients contained in a diagonal matrix $\Sigma = \mathrm{diag}(s_1, s_2, \ldots, s_r) \in \mathbb{C}^{r \times r}$ with ordered singular values $s_i$ ($s_1 \geq s_2 \geq \ldots \geq s_r$) on its diagonal;
- calculate a reduced-sized delay-domain matrix $\tilde{V}$ from the frequency-domain matrix $\overline{V}$, wherein the delay-domain matrix, including r basis vectors, is given by $$\overline{V} \approx F_V \tilde{V},$$

where
$F_V \in \mathbb{C}^{S \times L}$ contains L vectors of size S×1, selected from a discrete Fourier transform, DFT, codebook $\Omega$, the size of the compressed delay-domain matrix $\tilde{V}=[\tilde{v}_1, \tilde{v}_2, \ldots, \tilde{v}_r]$ is given by L×r, and L is the number of delays, and
the oversampled codebook matrix is given by $\Omega=[d_0, d_1, \ldots, d_{SO_f-1}]$, where $$\left[1 \quad e^{\frac{-j2\pi i}{O_f S}} \quad \ldots \quad e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes
the oversampling factor of the DFT-codebook matrix; and
report to the transmitter the explicit CSI including the identified first set of r basis vectors, the second reduced-sized delay-domain set of r basis vectors, along with the L delays, represented by a set of indices that correspond to the selected DFT-vectors in the codebook $\Omega$.

Another embodiment may have a transmitter in a wireless communication system, the transmitter including: an antenna array including a plurality of antennas for a wireless communication with one or more communication devices according to the invention for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals (CSI-RS) according to a CSI-RS, and downlink signals including the CSI-RS configuration; and receive uplink signals including a plurality of CSI reports including an explicit CSI from the communication device; and a processor configured to construct a precoder matrix applied on the antenna ports using the explicit CSI.

Another embodiment may have a wireless communication network, including: at least one communication device for providing an explicit channel state information, CSI, feedback in a wireless communication system, the communication device including: a transceiver configured to receive, from a transmitter a radio signal via a radio time-variant frequency MIMO channel, the radio signal including downlink reference signals according to a reference signal configuration, and downlink signals including the reference signal configuration, and a processor configured to
- estimate the CSI using measurements on the downlink reference signals of the radio channel according to the reference signal configuration over one or more time instants/slots,
- construct a frequency-domain channel tensor using the CSI estimate,
- perform a higher-order principal component analysis, HO-PCA, on the channel tensor,
- identify a plurality of dominant principal components of the channel tensor, thereby acquiring a compressed channel tensor, and
- report to the transmitter the explicit CSI including the dominant principal components of the channel tensor, and
- at least one transmitter according to the invention.

Another embodiment may have a method for providing by a communication device in a wireless communication system an explicit channel state information, CSI, feedback, the method having the steps of: receiving, from a transmitter a radio signal via a radio time-variant frequency MIMO channel, the radio signal including downlink reference signals according to a reference signal configuration, and downlink signals including the reference signal configuration, estimating the CSI using measurements on the downlink reference signals of the radio channel according to the reference signal configuration over one or more time instants/slots, constructing a frequency-domain channel tensor using the CSI estimate, performing a high-order principal component analysis, HO-PCA, on the channel tensor, identifying a plurality of dominant principal components of the channel tensor, thereby acquiring a compressed channel tensor, and reporting the explicit CSI including the dominant principal components of the channel tensor from the communication device to the transmitter.

Another embodiment may have a method for providing by a communication device in a wireless communication system an explicit channel state information, CSI, feedback, the method having the steps of: receiving, from a transmitter a radio signal via a radio time-variant frequency MIMO channel, the radio signal including downlink reference signals according to a reference signal configuration, and downlink signals including the reference signal configuration, estimating the CSI using measurements on the downlink reference signals of the radio channel according to the reference signal configuration over one or more time instants/slots, constructing a frequency-domain channel tensor using the CSI estimate, calculating a transformed channel tensor using the channel tensor, rewriting the transformed channel tensor to a transformed channel matrix, performing a standard principal component analysis, PCA, on the transformed channel matrix, identifying a plurality of dominant principal components of the transformed channel matrix, thereby acquiring a transformed/compressed channel matrix, and reporting the explicit CSI including the plurality of dominant principal components of the transformed/compressed channel tensor from the communication device to the transmitter.

Another embodiment may have a method for providing by a communication device in a wireless communication system an explicit channel state information, CSI, feedback, the method having the steps of: receiving, from a transmitter, a radio signal via a radio time-variant frequency MIMO channel, the radio signal including downlink reference signals according to a reference signal configuration, and downlink signals including the reference signal configuration; and estimating the CSI using measurements on the downlink reference signals of the radio channel, constructing a frequency-domain channel matrix using the CSI estimate, performing a standard principal component analysis, PCA, on the channel matrix, identifying the dominant principal components of the channel matrix, the channel matrix including
- a first set of r basis vectors contained in a matrix $\bar{U}=[u_1, u_2, \ldots, u_r] \in \mathbb{C}^{N_t N_r \times r}$;
- a second set of r basis vectors contained in a matrix $\bar{V}=[v_1, v_2, \ldots, v_r] \in \mathbb{C}^{S \times r}$; and
- a third set of r coefficients contained in a diagonal matrix $\Sigma = \mathrm{diag}(s_1, s_2, \ldots, s_r) \in \mathbb{C}^{r \times r}$ with ordered singular values $s_i$ ($s_1 \geq s_2 \geq \ldots \geq s_R$) on its diagonal;
- calculating a reduced-sized delay-domain matrix $\tilde{V}$ from the frequency-domain matrix $\bar{V}$, wherein the delay-domain matrix, including r basis vectors, is given by $$\bar{V} \approx F_V \tilde{V},$$

where
$F_V \in \mathbb{C}^{S \times L}$ contains L vectors of size S×1, selected from a discrete Fourier transform, DFT, codebook $\Omega$, the size of the compressed delay-domain matrix $\tilde{V}=[\tilde{v}_1, \tilde{v}_2, \ldots, \tilde{v}_r]$ is given by L×r, and L is the number of delays, and the oversampled codebook matrix is given by $\Omega=[d_0, d_1, \ldots, d_{SO_f-1}]$, where $$\left[ 1 \quad e^{\frac{-j2\pi i}{O_f S}} \quad \ldots \quad e^{\frac{-j2\pi i(S-1)}{O_f S}} \right]^T \in \mathbb{C}^{S \times 1}, i \in \{0, \ldots, SO_f - 1\},$$

and $O_f \in \{1, 2, 3, \ldots\}$ denotes
the oversampling factor of the DFT-codebook matrix; and
reporting the explicit CSI including the identified first set of r basis vectors, the second reduced-sized delay-domain set of r basis vectors, along with the L delays, represented by a set of indices that correspond to the selected DFT-vectors in the codebook $\Omega$ from the communication device to the transmitter.

Another embodiment may have a method for transmitting in a wireless communication system including a communication device and a transmitter, the method having the steps of: transmitting, to the communication device, downlink reference signals (CSI-RS) according to a CSI-RS configuration, and downlink signals including the CSI-RS configuration; receiving, at the transmitter, uplink signals including a plurality of CSI reports including an explicit CSI from the communication device; constructing a precoder matrix for a precoder connected to an antenna array including a plurality of antennas; applying the precoder matrix on antenna ports using the explicit CSI so as to apply a set of beamforming weights to one or more antennas of the antenna array to form, by the antenna array, one or more transmit beams or one or more receive beams.

Another embodiment may have a non-transitory digital storage medium having a computer program stored thereon to perform the method for providing by a communication device in a wireless communication system an explicit channel state information, CSI, feedback, the method having the steps of: receiving, from a transmitter a radio signal via a radio time-variant frequency MIMO channel, the radio signal including downlink reference signals according to a reference signal configuration, and downlink signals including the reference signal configuration, estimating the CSI using measurements on the downlink reference signals of the radio channel according to the reference signal configuration over one or more time instants/slots, constructing a frequency-domain channel tensor using the CSI estimate, performing a high-order principal component analysis, HO-PCA, on the channel tensor, identifying a plurality of dominant principal components of the channel tensor, thereby acquiring a compressed channel tensor, and reporting the explicit CSI including the dominant principal components of the channel tensor from the communication device to the transmitter; when said computer program is run by a computer.

BRIEF DESCRIPTION OF THE DRAWINGS

Embodiments of the present invention will be detailed subsequently referring to the appended drawings, in which:

FIG. 17 illustrates a CSI-RS-BurstDuration information element in accordance with an embodiment;

FIG. 18 illustrates an example of a computer system on which units or modules as well as the steps of the methods described in accordance with the inventive approach may execute.

DETAILED DESCRIPTION OF THE INVENTION

In the following, embodiments of the present invention are described in further detail with reference to the enclosed drawings in which elements having the same or similar function are referenced by the same reference signs.

Figure 1:
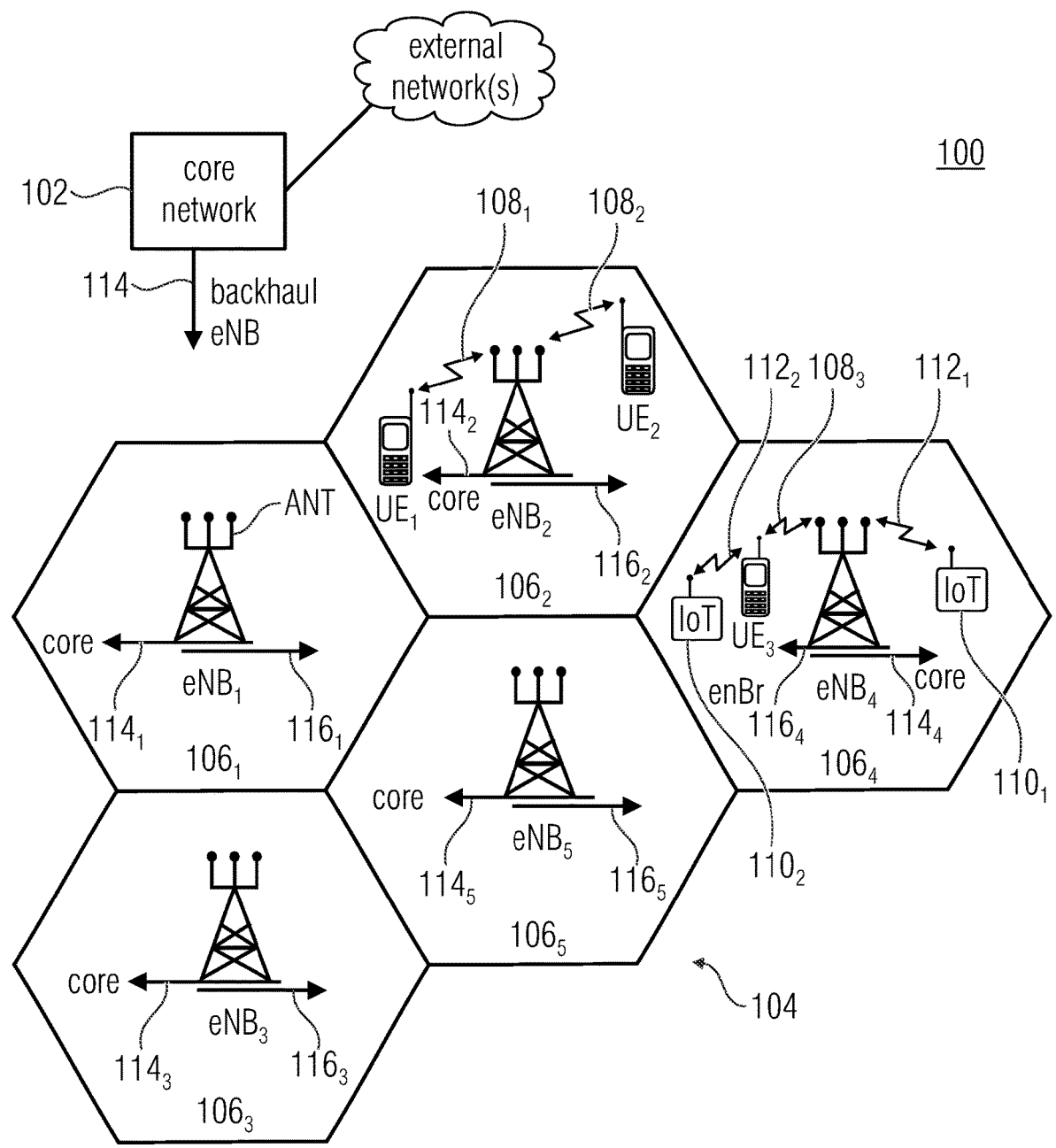
FIG. 1 shows a schematic representation of an example of a wireless communication system.
Figure 2:
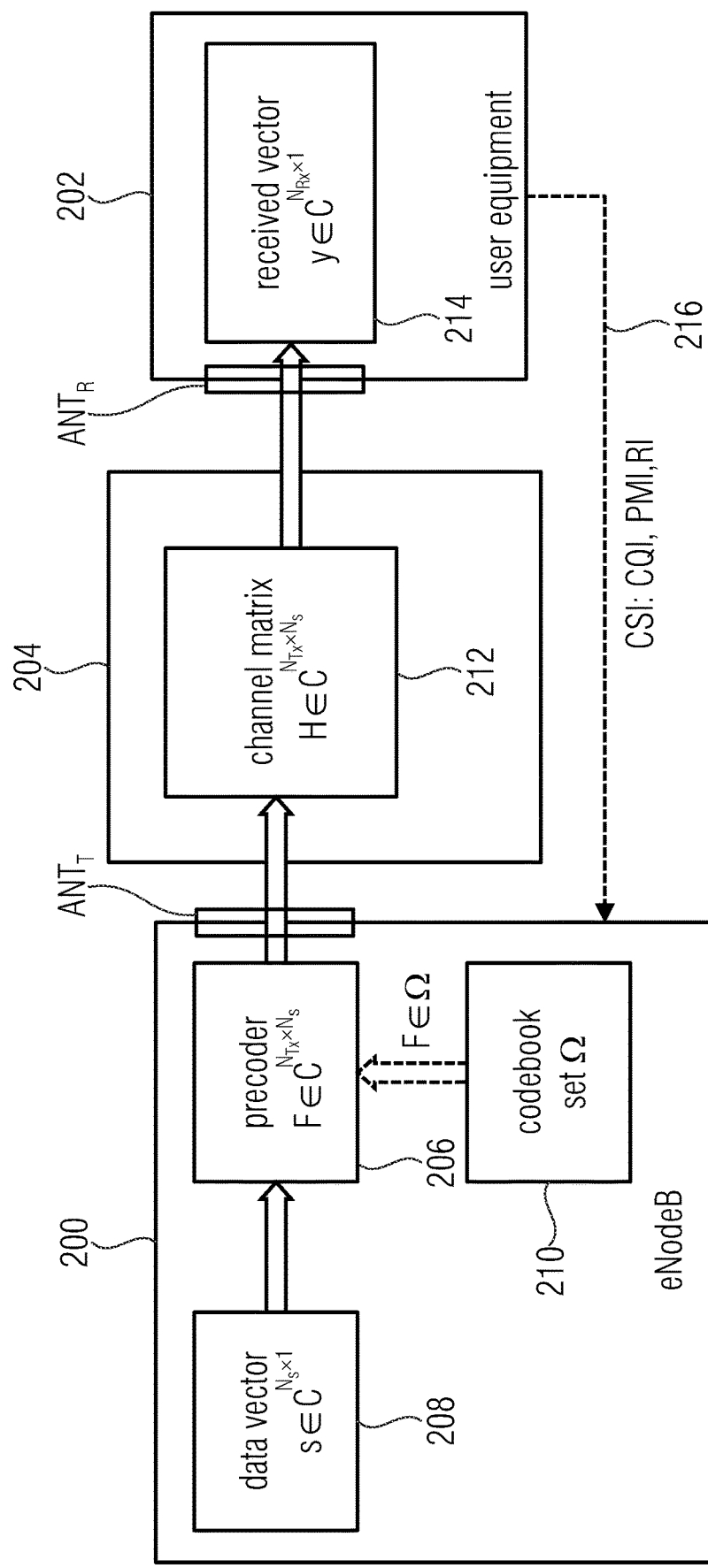
FIG. 2 shows a block-based model of a MIMO DL transmission using codebook-based-precoding in accordance with LTE release 8.
Figure 3:
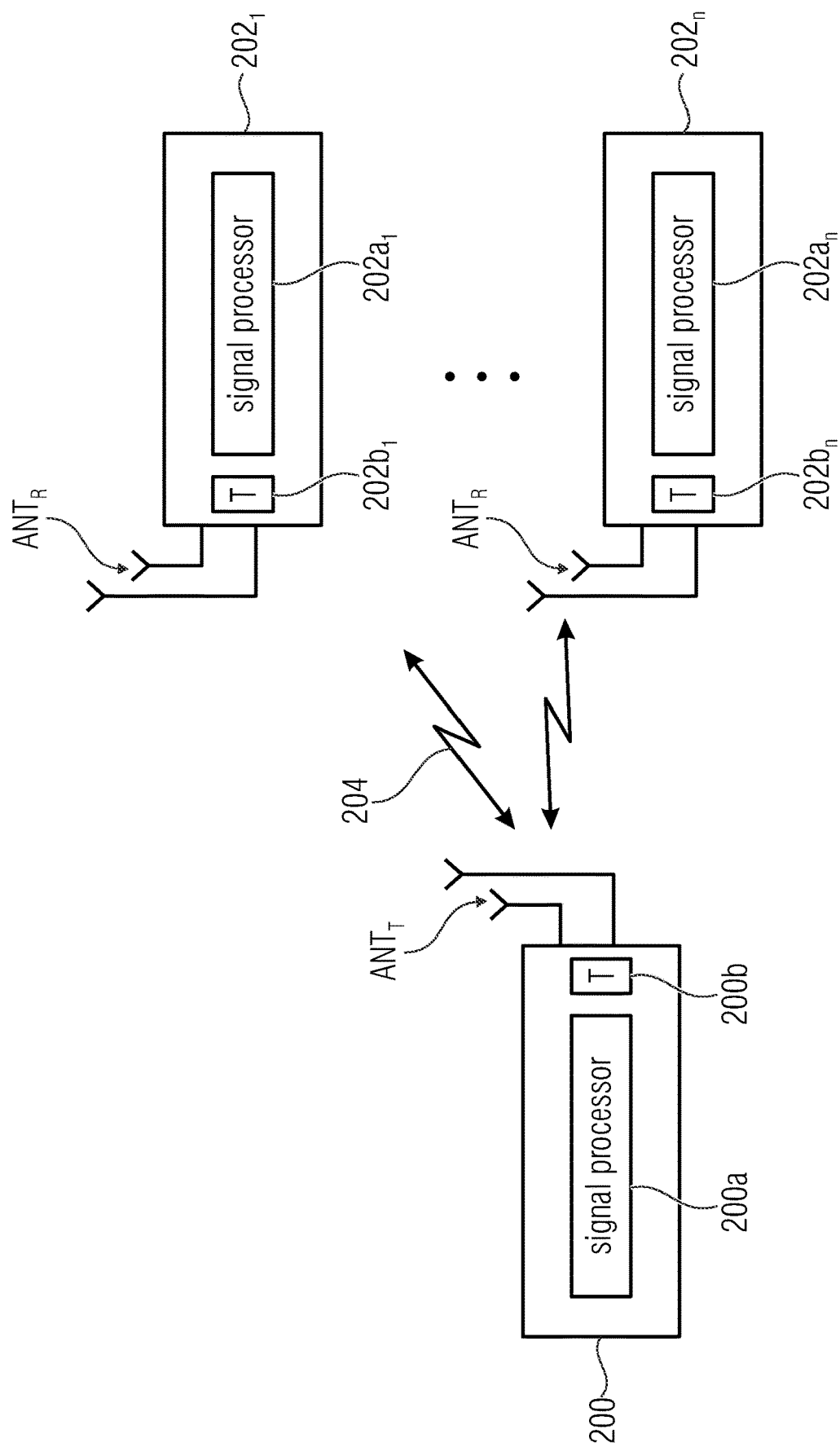
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and receivers or users, like mobile or stationary terminals or IoT devices, as mentioned above. FIG. 3 is a schematic representation of a wireless communication system for communicating information between a transmitter 200, like a base station, and a plurality of receivers $202_1$ to $202_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200a. The UEs 202 include one or more antennas $ANT_R$ or an antenna array having a plurality of antennas, a signal processor $202a_1$, $202a_n$, and a transceiver $202b_1$, $202b_n$. The base station 200 and the respective UEs 202 may operate in accordance with the inventive teachings described herein.

Communication Device

The present invention provides a communication device 202 for providing an explicit channel state information, CSI, feedback in a wireless communication system, the communication device comprising a transceiver 202b configured to receive, from a transmitter 200 a radio signal via a radio time-variant frequency MIMO channel 204, the radio signal including downlink reference signals according to a reference signal configuration, and downlink signals comprising the reference signal configuration, and a processor 202a configured to estimate the CSI using measurements on the downlink reference signals of the radio channel according to the reference signal configuration over one or more time instants/slots, construct a frequency-domain channel tensor using the CSI estimate, perform a higher-order principal component analysis, HO-PCA, on the channel tensor, identify a plurality of dominant principal components of the channel tensor, thereby obtaining a compressed channel tensor, and report to the transmitter 200 the explicit CSI comprising the dominant principal components of the channel tensor.

In accordance with embodiments, the communication device is configured to receive from the transmitter an explicit CSI report configuration containing a CSI channel-type information, CSI-Ind, indicator for the CSI report, wherein the CSI-Ind indicator is associated with a channel-type configuration, the channel tensor is a three-dimensional, 3D, channel tensor, or is represented by a 3D channel covariance tensor, a 3D beamformed-channel tensor, or a 3D beamformed channel covariance tensor, as indicated by the CSI-Ind indicator, and wherein the plurality of dominant principal components of the compressed 3D channel tensor of dimension $N_r \times N_t \times S$ comprise:

a first set of $r_1$ basis vectors contained in a matrix $U_R = [u_{R,1}, \ldots, u_{R,r_1}] \in \mathbb{C}^{N_r \times r_1}$;

a second set of $r_2$ basis vectors contained in a matrix $U_T = [u_{T,1}, \ldots, u_{T,r_2}] \in \mathbb{C}^{N_t \times r_2}$;

a third set of $r_3$ basis vectors contained in a matrix $U_S = [u_{S,1}, \ldots, u_{S,r_3}] \in \mathbb{C}^{S \times r_3}$; and $r_1 r_2 r_3$ associated high-order singular values $S_{ijk}$, sorted such that $\Sigma_{j,k,l}|S_{i,j,k,l}|^2 \geq \Sigma_{j,k}|S_{i+1,j,k}|^2$, $\Sigma_{i,k}|S_{i,j,k}|^2 \geq \Sigma_{i,k}|S_{i,j+1,k}|^2$, and $\Sigma_{i,j}|S_{i,j,k}|^2 \geq \Sigma_{i,j}|S_{i,j,k+1}|^2$ for all i, j, k.

In accordance with embodiments, the values of $r_1$, $r_2$, and $r_3$ representing the number of dominant principal components with respect to the first, second and third dimension of the compressed 3D channel tensor, respectively, are configured via the CSI report configuration by the transmitter, or reported by the communication device in the CSI report, or pre-determined and known at the communication device.

In accordance with embodiments, the processor is configured to quantize the coefficients in the vectors $u_{R,i}$, $u_{T,j}$, and $u_{S,k}$ and the HO singular values $S_{ijk}$ of the 3D channel tensor using a codebook approach, the number of complex coefficients to be quantized being given by $N_r r_1 + N_t r_2 + S r_3$ for the higher-order singular vectors, and a number of real coefficients to be quantized being given by $r_1 r_2 r_3$ for the higher-order singular values, respectively.

In accordance with embodiments, the channel tensor is a four-dimensional, 4D, channel tensor, or represented either by a 4D channel covariance tensor, a 4D beamformed-channel tensor, or a 4D beamformed channel covariance tensor, as indicated by the CSI-Ind indicator, and the plurality of dominant principal components of the compressed 4D channel tensor of dimension $N_r \times N_t \times S \times D$ comprise:

a first set of $r_1$ basis vectors contained in a matrix $U_R = [u_{R,1}, \ldots, u_{R,r_1}] \in \mathbb{C}^{N_r \times r_1}$;

a second set of $r_2$ basis vectors contained in a matrix $U_T = [u_{T,1}, \ldots, u_{T,r_2}] \in \mathbb{C}^{N_t \times r_2}$;

a third set of $r_3$ basis vectors contained in a matrix $U_S = [u_{S,1}, \ldots, u_{S,r_3}] \in \mathbb{C}^{S \times r_3}$;

a fourth set of $r_4$ basis vectors contained in a matrix $U_D = [u_{D,1}, \ldots, u_{D,r_4}] \in \mathbb{C}^{D \times r_4}$; and $r_1 r_2 r_3 r_4$ associated high-order singular values $S_{ijkl}$, sorted such that $\Sigma_{j,k,l}|S_{i,j,k,l}|^2 \geq \Sigma_{j,k,l}|S_{i+1,j,k,l}|^2$, $\Sigma_{i,k,l}|S_{i,j,k,l}|^2 \geq \Sigma_{i,k,l}|S_{i,j+1,k,l}|^2$, and $\Sigma_{i,j,l}|S_{i,j,k,l}|^2 \geq \Sigma_{i,j,l}|S_{i,j,k+1,l}|^2$, and $\Sigma_{i,j,k}|S_{i,j,k,l}|^2 \geq \Sigma_{i,j,k}|S_{i,j,k,l+1}|^2$ for all i, j, k, l.

In accordance with embodiments, the values of $r_1$, $r_2$, $r_3$, and $r_4$ representing the number of dominant principal components of the 4D channel tensor are configured via the CSI report configuration by the transmitter, or they are reported by the communication device in the CSI report, or they are pre-determined and known at the communication device.

In accordance with embodiments, the processor is configured to quantize the coefficients of the vectors $u_{R,i}$, $u_{T,j}$, $u_{S,k}$, $u_{D,l}$ and the singular values $S_{ijkl}$ using a codebook approach, a number of complex coefficients to be quantized being given by $N_r r_1 + N_t r_2 + S r_3 + D r_4$ for the higher-order singular vectors, and a number of real coefficients to be quantized being given by $r_1 r_2 r_3 r_4$ for the higher-order singular values, respectively.

In accordance with embodiments, the explicit CSI comprises a delay-domain CSI for the higher-order singular-value matrix $\overline{U}_S$, and wherein the processor is configured to calculate a reduced-sized delay-domain higher-order singular-matrix $\tilde{U}_S$ from the frequency-domain higher-order singular-matrix $\overline{U}_S$, wherein the delay-domain higher-order singular-matrix is given by $$\overline{U}_S \approx F_S \tilde{U}_S,$$

where $F_S \in \mathbb{C}^{S \times L}$ contains L vectors of size $S \times 1$, selected from a discrete Fourier transform, DFT, codebook $\Omega$, the size of the compressed delay-domain matrix $\tilde{U}_S$ is given by $L \times r_3$, and L is the number of delays, and the oversampled codebook matrix is given by $\Omega = [d_0, d_1, \ldots, d_{SO_f - 1}]$, where $$d_i = \begin{bmatrix} 1 & e^{\frac{-j2\pi i}{O_f S}} & \ldots & e^{\frac{-j2\pi i(S-1)}{O_f S}} \end{bmatrix}^T \in \mathbb{C}^{S \times 1}, i \in \{0, \ldots, SO_f - 1\},$$

and $O_f \in \{1, 2, 3, \ldots\}$ denotes the oversampling factor of the DFT-codebook matrix;

quantize the coefficients in vectors $\tilde{U}_S = [\tilde{u}_{S,1}, \ldots, \tilde{u}_{S,r_3}] \in \mathbb{C}^{L \times r_3}$ using a codebook approach;

report to the transmitter the explicit CSI containing the coefficients of $\tilde{U}_S$ instead of $\overline{U}_S$, along with the L delays, represented by a set of indices that correspond to the selected DFT-vectors in the codebook $\Omega$.

In accordance with embodiments, the explicit CSI comprises a Doppler-frequency domain CSI for the higher-order singular-value matrices $\overline{U}_D$, and wherein the processor is configured to calculate a reduced-sized Doppler-frequency domain higher-order singular-matrix $\tilde{U}_D$ from the time-domain higher-order singular-matrix $\overline{U}_D$, wherein the Doppler-frequency domain higher-order singular-matrix is given by $$\overline{U}_D \approx F_D \tilde{U}_D,$$

where $F_D \in \mathbb{C}^{D \times G}$ contains G vectors of size $D \times 1$, selected from a discrete Fourier transform, DFT, codebook $\Omega$, the size of the compressed Doppler-frequency domain matrix $\tilde{U}_D$ is given by $G \times r_4$, and G is the number of Doppler-frequency components, and the oversampled codebook matrix is given by $\Omega = [d_0, d_1, \ldots, d_{DO_t-1}]$, where $$d_i = \begin{bmatrix} 1 & e^{\frac{-j2\pi i}{O_t D}} & \cdots & e^{\frac{-j2\pi i(D-1)}{O_t D}} \end{bmatrix}^T \in \mathbb{C}^{D \times 1}, i \in \{0, \ldots, O_t D - 1\},$$

and $O_t \in \{1, 2, 3, \ldots\}$ denotes the oversampling factor of the DFT-codebook matrix;

quantize the coefficients in vectors $\tilde{U}_D = [\tilde{u}_{D,1}, \ldots, \tilde{u}_{D,r_4}] \in \mathbb{C}^{G \times r_4}$ using a codebook approach; or report to the transmitter the explicit CSI report containing the coefficients of $\tilde{U}_D$ instead of $\check{U}_D$, along with the G Doppler-frequency components, represented by a set of indices that correspond to the selected DFT-vectors in the codebook $\Omega$.

The present invention provides a communication device 202 for providing an explicit channel state information, CSI, feedback in a wireless communication system, the communication device comprising a transceiver 202b configured to receive, from a transmitter 200 a radio signal via a radio time-variant frequency MIMO channel 204, the radio signal including downlink reference signals according to a reference signal configuration, and downlink signals comprising the reference signal configuration; and a processor 202a configured to estimate the CSI using measurements on the downlink reference signals of the radio channel according to the reference signal configuration over one or more time instants/slots, construct a frequency-domain channel tensor using the CSI estimate, calculate a transformed channel tensor using the channel tensor, rewrite the transformed channel tensor to a transformed channel matrix, perform a standard principal component analysis, PCA, on the transformed channel matrix, identify a plurality of dominant principal components of the transformed channel matrix, thereby obtaining a transformed/compressed channel matrix, and report to the transmitter the explicit CSI comprising the plurality of dominant principal components of the transformed/compressed channel tensor.

In accordance with embodiments, the communication device is configured to receive from the transmitter an explicit CSI report configuration containing a CSI channel-type information, CSI-Ind, indicator for the CSI report, wherein the CSI-Ind indicator is associated with a channel-type configuration, the channel tensor is a three-dimensional, 3D, channel tensor, or is represented either by a 3D channel covariance tensor, a 3D beamformed-channel tensor, or a 3D beamformed channel covariance tensor as indicated by the CSI-Ind indicator, or the channel tensor is a four-dimensional, 4D, channel tensor, or is represented either by a 4D channel covariance tensor, a 4D beamformed-channel tensor, or a 4D beamformed channel covariance tensor as indicated by the CSI-Ind indicator, and the 3D transformed channel tensor of dimension $N'_r \times N'_t \times S'$, or the 4D transformed channel tensor of dimension $N'_r \times N'_t \times S' \times D'$, is rewritten to a transformed channel matrix of dimension $N'_r N'_t \times S'D'$, where $D'=1$ for the 3D transformed channel tensor and $D'>1$ for the 4D transformed channel tensor, respectively, and the plurality of dominant principal components of the transformed channel matrix comprise:

a first set of r basis vectors contained in a matrix $\bar{U} = [u_1, u_2, \ldots, u_r] \in \mathbb{C}^{N'_t N'_r \times r}$;

a second set of r basis vectors contained in a matrix $\bar{V} = [v_1, v_2, \ldots, v_r] \in \mathbb{C}^{S'D' \times r}$;

a set of r coefficients contained in a diagonal matrix $\Sigma = \text{diag}(s_1, s_2, \ldots, s_r) \in \mathbb{C}^{r \times r}$ with ordered singular values $s_i$ ($s_1 \geq s_2 \geq \ldots \geq s_r$) on its diagonal.

In accordance with embodiments, the value of r representing the number of dominant principal components of the transformed channel matrix is configured via the CSI report configuration by the transmitter, or reported by the communication device in the CSI report, or pre-determined and known at the communication device.

In accordance with embodiments, the processor is configured to quantize the coefficients of the basis vectors $u_i$, $v_i$, and the singular values $s_i$ of the transformed channel matrix using a codebook approach.

In accordance with embodiments, the processor is configured to apply, after the construction of the 3D channel tensor, a one-dimensional, a two-dimensional, or multi-dimensional transformation/compression of the channel tensor with respect to the space dimension of the 3D channel tensor, or the frequency dimension of the 3D channel tensor, or both the frequency and space dimensions of the 3D channel tensor, or after the construction of the 4D channel tensor, a one-dimensional, a two-dimensional, or multi-dimensional transformation/compression of the channel tensor with respect to the space dimension of the channel tensor, or the frequency dimension of the channel tensor, or the time dimension of the channel tensor, or both the frequency and time dimensions of the channel tensor, so as to exploit a sparse or nearly-sparse representation of the 3D or 4D channel tensor in one or more dimensions.

In accordance with embodiments, the processor is configured to apply, after the construction of the 3D channel tensor, a transformation/compression with respect to all three dimensions of the 3D channel tensor $\mathcal{H}$ of dimension $N_r \times N_t \times S$ represented by a (column-wise) Kronecker product as $$\mathcal{H} = \mathcal{F}_{(1,2,3)}(\hat{\mathcal{H}}), \text{vec}(\mathcal{H}) = \text{vec}(\mathcal{F}_{(1,2,3)}(\hat{\mathcal{H}})) = \sum_{n_r=0}^{N'_r-1} \sum_{n_t=0}^{N'_t-1} \sum_{s=0}^{S'-1} \gamma_{n_r, n_t, s} \, b_{3, n_r, n_t, s} \otimes b_{2, n_r, n_t, s} \otimes b_{1, n_r, n_t, s},$$

where $b_{1, n_r, n_t, s}$ is a transformation vector of size $N_r \times 1$ with respect to the first dimension of the 3D channel tensor $\mathcal{H}$, selected from a codebook matrix $\Omega_1$;

$b_{2, n_r, n_t, s}$ is a transformation vector of size $N_t \times 1$ with respect to the second dimension of the 3D channel tensor $\mathcal{H}$, selected from a codebook matrix $\Omega_2$;

$b_{3, n_r, n_t, s}$ is a transformation vector of size $S \times 1$ with respect to the third dimension of the 3D channel tensor $\mathcal{H}$, selected from a codebook matrix $\Omega_3$;

$\gamma_{n_r,n_t,s}$ is the transformed/compressed channel coefficient associated with the vectors $b_{1,n_r,n_t,s}$, $b_{2,n_r,n_t,s}$, and $b_{3,n_r,n_t,s}$, and $N'_r$, $N'_t$, and $S'$ ($N'_r \leq N_r$, $N'_t \leq N_t$, $S' \leq S$) represents the value of the first, second and third dimension of the transformed/compressed 3D channel tensor $\hat{\mathcal{H}}$, respectively, or the space dimensions of the 3D channel tensor, represented by $$\mathcal{H} = \mathcal{F}_{(1,2)}(\hat{\mathcal{H}}), \; vec\,(\mathcal{H}) = vec\,(\mathcal{F}_{(1,2)}(\hat{\mathcal{H}})) =$$

$$\sum_{n_r=0}^{N'_r-1}\sum_{n_t=0}^{N'_t-1}\sum_{s=0}^{S'-1} \gamma_{n_r,n_t,s} \; b_{3,s} \otimes b_{2,n_r,n_t,s} \otimes b_{1,n_r,n_t,s},$$

where
- $b_{3,s}$ is a transformation vector of all zeros with the s-th element being one,
- $b_{2,n_r,n_t,s}$ is a vector of size $N_t \times 1$ with respect to the second dimension of the 3D channel tensor $\mathcal{H}$, selected from a codebook matrix $\Omega_2$, and
- $b_{1,n_r,n_t,s}$ is a transformation vector of size $N_r \times 1$ with respect to the first dimension of the 3D channel tensor $\mathcal{H}$, selected from a codebook matrix $\Omega_1$, $N'_r \leq N_r$, $N'_t \leq N_t$, $S'=S$, or the frequency dimension of the 3D channel tensor, represented by $$\mathcal{H} = \mathcal{F}_{(3)}(\hat{\mathcal{H}}), \; vec\,(\mathcal{H}) = vec\,(\mathcal{F}_{(3)}(\hat{\mathcal{H}})) =$$

$$\sum_{n_r=0}^{N'_r-1}\sum_{n_t=0}^{N'_t-1}\sum_{s=0}^{S'-1} \gamma_{n_r,n_t,s} \; b_{3,n_r,n_t,s} \otimes b_{2,n_r} \otimes b_{1,n_t},$$

where
- $b_{2,n_r}$ is a transformation vector of all zeros with the $n_r$-th element being one, $b_{1,n_t}$ is a vector of all zeros with the $n_t$-th element being one, and
- $b_{3,n_r,n_t,s}$ is a transformation vector of size $S \times 1$ with respect to the third dimension of the 3D channel tensor $\mathcal{H}$, selected from a codebook matrix $\Omega_3$, $N'_r=N_r$ and $N'_t=N_t$, $S' \leq S$.

In accordance with embodiments, (i) the 3D transformation function $\mathcal{F}_{(1, 2, 3)}(\cdot)$ is given by a two-dimensional Discrete Cosine transformation (2D-DCT) and a 1D-DFT transformation with respect to the space and frequency dimension of the channel tensor, respectively, the codebook matrices $\Omega_n$, n=1,2 are given by oversampled DCT matrices, and the codebook matrix $\Omega_3$ is given by an oversampled DFT matrix, or (ii) the 3D transformation function $\mathcal{F}_{(1, 2, 3)}(\cdot)$ is given by a 3D-DFT transformation and the codebook matrices $\Omega_n$, n=1, 2, 3 are given by oversampled DFT matrices, or (iii) the 2D transformation function $\mathcal{F}_{(1,2)}(\cdot)$ is given by a 2D-Discrete Cosine transformation (DCT) and the codebook matrices $\Omega_n$, n=1,2 are given by oversampled DCT matrices, or (iv) the 1D transformation function $\mathcal{F}_{(3)}(\cdot)$ is given by a 1D-DFT transformation and the codebook matrix $\Omega_3$ is given by an oversampled DFT matrix.

In accordance with embodiments, the processor is configured to apply, after the construction of the 4D channel tensor a transformation/compression with respect to all four dimensions of the channel tensor, represented by a (column-wise) Kronecker product as $\mathcal{H} = \mathcal{F}_{(1, 2, 3, 4)}(\hat{\mathcal{H}})$, $$vec\,(\mathcal{H}) = vec\,(\mathcal{F}_{(1,2,3,4)}(\hat{\mathcal{H}})) =$$

$$\sum_{n_r=0}^{N'_r-1}\sum_{n_t=0}^{N'_t-1}\sum_{s=0}^{S'-1}\sum_{d=0}^{D'-1} \gamma_{n_r,n_t,s,d} \; b_{4,n_r,n_t,s,d} \otimes b_{3,n_r,n_t,s,d} \otimes b_{2,n_r,n_t,s,d} \otimes b_{1,n_r,n_t,s,d},$$

where
- $b_{1,n_r,n_t,s,d}$ is a transformation vector of size $N_r \times 1$ with respect to the first dimension of the channel tensor $\mathcal{H}$, selected from a codebook matrix $\Omega_1$;
- $b_{2,n_r,n_t,s,d}$ is a transformation vector of size $N_t \times 1$ with respect to the second dimension of the channel tensor $\mathcal{H}$, selected from a codebook matrix $\Omega_2$;
- $b_{3,n_r,n_t,s,d}$ is a transformation vector of size $S \times 1$ with respect to the third dimension of the channel tensor $\mathcal{H}$, selected from a codebook matrix $\Omega_3$;
- $b_{4,n_r,n_t,s,d}$ is a transformation vector of size $D \times 1$ with respect to the fourth dimension of the channel tensor $\mathcal{H}$, selected from a codebook matrix $\Omega_4$;
- $\gamma_{n_r,n_t,s,d}$ is the transformed/compressed channel coefficient associated with the vectors $b_{1,n_r,n_t,s,d}$, $b_{2,n_r,n_t,s,d}$, $b_{3,n_r,n_t,s,d}$, and $b_{4,n_r,n_t,s,d}$ and $N'_r$, $N'_t$, $S'$ and $D'$ ($N'_r \leq N_r$, $N'_t \leq N_t$, $S' \leq S$, $D' \leq D$) represents the value of the first, second, third and fourth dimension of the transformed/compressed channel tensor $\hat{\mathcal{H}}$, respectively, or the space dimensions of the 4D channel tensor, represented by $\mathcal{H} = \mathcal{F}_{(1,2)}(\hat{\mathcal{H}})$, $$vec\,(\mathcal{H}) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} \; b_{4,d} \otimes b_{3,s} \otimes b_{2,n_r,n_t,s,d} \otimes b_{1,n_r,n_t,s,d},$$

where
- $b_{4,d}$ is a transformation vector of all zeros with the d-th element being one,
- $b_{3,s}$ is a transformation vector of all zeros with the s-th element being one,
- $b_{2,n_r,n_t,s,d}$ is a transformation vector of size $N_t \times 1$ with respect to the second dimension of the channel tensor $\mathcal{H}$, selected from a codebook matrix $\Omega_2$, and
- $b_{1,n_r,n_t,s,d}$ is a transformation vector of size $N_r \times 1$ with respect to the first dimension of the channel tensor $\mathcal{H}$, selected from a codebook matrix $\Omega_1$ and $N'_r \leq N_r$, $N'_t \leq N_t$, $S'=S$ and $D'=D$, or the frequency and time dimensions of the 4D channel tensor, represented by $$\mathcal{H} = \mathcal{F}_{(3,4)}(\hat{\mathcal{H}}), \; vec\,(\mathcal{H}) = vec\,(\mathcal{F}_{(3,4)}(\hat{\mathcal{H}})) =$$

$$\sum_{n_r=0}^{N'_r-1}\sum_{n_t=0}^{N'_t-1}\sum_{s=0}^{S'-1}\sum_{d=0}^{D'-1} \gamma_{n_r,n_t,s,d} \; b_{4,n_r,n_t,s,d} \otimes b_{3,n_r,n_t,s,d} \otimes b_{2,n_r} \otimes b_{1,n_t},$$

where
- $b_{4,n_r,n_t,s,d}$ is a transformation vector of size $D \times 1$ with respect to the fourth dimension of the channel tensor $\mathcal{H}$, selected from a codebook matrix $\Omega_4$, $b_{3,n_r,n_t,s,d}$ is a transformation vector of size S×1 with respect to the third dimension of the channel tensor $\mathcal{H}$, selected from a codebook matrix $\Omega_3$, $b_{2,n_r}$ is a transformation vector of all zeros with the $n_r$-th element being one, and $b_{1,n_t}$ is a transformation vector of all zeros with the $n_t$-th element being one and $N'_r=N_r N'_t=N_t$, S'≤S and D'≤D.

In accordance with embodiments, (i) the 4D transformation function $\mathcal{F}_{(1, 2, 3, 4)}(\cdot)$ is given by a 4D-DFT transformation and the codebook matrices $\Omega_n$, n=1, 2, 3, 4 are given by oversampled DFT matrices, or (ii) the 2D transformation/compression function $\mathcal{F}_{(3,4)}(\cdot)$ is given by a 2D-DFT and the codebook matrices $\Omega_n$, n=3,4 are given by oversampled DFT matrices, or (iii) the 2D transformation function $\mathcal{F}_{(1,2)}(\cdot)$ is given by a 2D-Discrete Cosine transformation (DCT) and the codebook matrices $\Omega_n$, n=1,2 are given by oversampled DCT matrices, or (iv) the 1D transformation function $\mathcal{F}_{(3)}(\cdot)$ is given by a 1D-DFT transformation and the codebook matrix $\Omega_3$ is given by an oversampled DFT matrix, or (v) the 1D transformation function $\mathcal{F}_{(4)}(\cdot)$ is given by a 1D-DFT transformation and the codebook matrix $\Omega_4$ is given by an oversampled DFT matrix.

In accordance with embodiments, the processor is configured to select the transformation vectors from codebook matrices $\Omega_n$, and store the selected indices in a set $\mathbb{Q}$ of g-tuples, where g refers to the number of transformed dimensions of the channel tensor, and report the set $\mathbb{Q}$ as a part of the CSI report to the transmitter.

In accordance with embodiments, the oversampling factors of the codebooks are configured via the CSI report configuration, or via higher layer or physical layer by the transmitter, pre-determined and known at the communication device.

The present invention provides a communication device 202 for providing an explicit channel state information, CSI, feedback in a wireless communication system, the communication device comprising a transceiver 202b configured to receive, from a transmitter 200 a radio signal via a radio time-variant frequency MIMO channel 204, the radio signal including downlink reference signals according to a reference signal configuration, and downlink signals comprising the reference signal configuration; and a processor 202a configured to estimate the CSI using measurements on the downlink reference signals of the radio channel, construct a frequency-domain channel matrix using the CSI estimate, perform a standard principal component analysis, PCA, on the channel matrix, identify the dominant principal components of the channel matrix, the channel matrix comprising a first set of r basis vectors contained in a matrix $U=[u_1, u_2, \ldots, u_r] \in \mathbb{C}^{N_t N_r \times r}$;

a second set of r basis vectors contained in a matrix $\tilde{V}=[\tilde{v}_1, \tilde{v}_2, \ldots, \tilde{v}_r] \in \mathbb{C}^{S \times r}$; and a third set of r coefficients contained in a diagonal matrix $\Sigma=\text{diag}(s_1, s_2, \ldots, s_r) \in \mathbb{C}^{r \times r}$ with ordered singular values $s_i$ ($s_1 \geq s_2 \geq \ldots \geq s_r$) on its diagonal;

calculate a reduced-sized delay-domain matrix $\tilde{V}$ from the frequency-domain matrix $\bar{V}$, wherein the delay-domain matrix, comprising r basis vectors, is given by $$\bar{V} \approx F_V \tilde{V},$$

where $F_V \in \mathbb{C}^{S \times L}$ contains L vectors of size S×1, selected from a discrete Fourier transform, DFT, codebook $\Omega$, the size of the compressed delay-domain matrix $\tilde{V}=[\tilde{v}_1, \tilde{v}_2, \ldots, \tilde{v}_r]$ is given by L×r, and L is the number of delays, and the oversampled codebook matrix is given by $\Omega=[d_0, d_1, \ldots, d_{SO_f-1}]$, where $$\left[ 1 \quad e^{\frac{-j2\pi i}{O_f S}} \quad \ldots \quad e^{\frac{-j2\pi i(S-1)}{O_f S}} \right]^T \in \mathbb{C}^{S \times 1}, i \in \{0, \ldots, SO_f - 1\},$$

and $O_f \in \{1, 2, 3, \ldots\}$ denotes the oversampling factor of the DFT-codebook matrix; and report to the transmitter the explicit CSI containing the identified first set of r basis vectors, the second reduced-sized delay-domain set of r basis vectors, along with the L delays, represented by a set of indices that correspond to the selected DFT-vectors in the codebook $\Omega$.

In accordance with embodiments, the value of r representing the number of dominant principal components of the transformed channel matrix is configured via the CSI report configuration by the transmitter, or it is reported by the communication device in the CSI report, or it is pre-determined and known at the communication device.

In accordance with embodiments, the processor is configured to quantize the coefficients of the basis vectors $u_i$, $\tilde{v}_i$, and the singular values $s_i$ of the channel matrix using a codebook approach.

In accordance with embodiments, the communication device is configured with one or more scalar codebooks for the quantization of each entry of each basis vector of the plurality of dominant principal components of the channel tensor or the compressed channel tensor and the singular values or high order singular values, or with one or more unit-norm vector codebooks for the quantization of each basis vector of the plurality of dominant principal components of the channel tensor or the compressed channel tensor, and wherein the communication device selects for each basis vector a codebook vector to represent the basis vector, and the communication device is configured to report the indices corresponding to the selected entries in the scalar or vector codebook as a part of the CSI report to the transmitter.

Transmitter

The present invention provides a transmitter 200 in a wireless communication system, the transmitter comprising:

an antenna array $ANT_T$ having a plurality of antennas for a wireless communication with one or more of the inventive communication devices 202a, 202b for providing a channel state information, CSI, feedback to the transmitter 200; and a precoder 206 connected to the antenna array $ANT_T$, the precoder 206 to apply a set of beamforming weights to one or more antennas of the antenna array $ANT_T$ to form, by the antenna array $ANT_T$, one or more transmit beams or one or more receive beams, a transceiver 200b configured to transmit, to the communication device 202a, 202b, downlink reference signals (CSI-RS) according to a CSI-RS, and downlink signals comprising the CSI-RS configuration; and receive uplink signals comprising a plurality of CSI reports including an explicit CSI from the communication device 202a, 202b; and a processor 200a configured to construct a precoder matrix applied on the antenna ports using the explicit CSI.

System

The present invention provides a wireless communication network, comprising at least one of the inventive communication devices 202a, 202b, and at least one of the inventive transmitters 200.

In accordance with embodiments, the communication device and the transmitter comprises one or more of a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or a SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

The present invention provides a method for providing by a communication device in a wireless communication system an explicit channel state information, CSI, feedback, the method comprising:

receiving, from a transmitter a radio signal via a radio time-variant frequency MIMO channel, the radio signal including downlink reference signals according to a reference signal configuration, and downlink signals comprising the reference signal configuration, estimating the CSI using measurements on the downlink reference signals of the radio channel according to the reference signal configuration over one or more time instants/slots, constructing a frequency-domain channel tensor using the CSI estimate, performing a high-order principal component analysis, HO-PCA, on the channel tensor, identifying a plurality of dominant principal components of the channel tensor, thereby obtaining a compressed channel tensor, and reporting the explicit CSI comprising the dominant principal components of the channel tensor from the communication device to the transmitter.

The present invention provides a method for providing by a communication device in a wireless communication system an explicit channel state information, CSI, feedback, the method comprising:

receiving, from a transmitter a radio signal via a radio time-variant frequency MIMO channel, the radio signal including downlink reference signals according to a reference signal configuration, and downlink signals comprising the reference signal configuration, estimating the CSI using measurements on the downlink reference signals of the radio channel according to the reference signal configuration over one or more time instants/slots, constructing a frequency-domain channel tensor using the CSI estimate, calculating a transformed channel tensor using the channel tensor, rewriting the transformed channel tensor to a transformed channel matrix, performing a standard principal component analysis, PCA, on the transformed channel matrix, identifying a plurality of dominant principal components of the transformed channel matrix, thereby obtaining a transformed/compressed channel matrix, and reporting the explicit CSI comprising the plurality of dominant principal components of the transformed/compressed channel tensor from the communication device to the transmitter.

The present invention provides a method for providing by a communication device in a wireless communication system an explicit channel state information, CSI, feedback, the method comprising:

receiving, from a transmitter, a radio signal via a radio time-variant frequency MIMO channel, the radio signal including downlink reference signals according to a reference signal configuration, and downlink signals comprising the reference signal configuration; and estimating the CSI using measurements on the downlink reference signals of the radio channel, constructing a frequency-domain channel matrix using the CSI estimate, performing a standard principal component analysis, PCA, on the channel matrix, identifying the dominant principal components of the channel matrix, the channel matrix comprising a first set of r basis vectors contained in a matrix $\bar{U}=[u_1, u_2, \ldots, u_r] \in \mathbb{C}^{N_t N_r \times r}$;

a second set of r basis vectors contained in a matrix $\bar{V}=[v_1, v_2, \ldots, v_r] \in \mathbb{C}^{S \times r}$; and a third set of r coefficients contained in a diagonal matrix $\bar{\Sigma}=\mathrm{diag}(s_1, s_2, \ldots, s_r) \in \mathbb{C}^{r \times r}$ with ordered singular values $s_i$ ($s_1 \geq s_2 \geq \ldots \geq s_R$) on its diagonal;

calculating a reduced-sized delay-domain matrix $\tilde{V}$ from the frequency-domain matrix $\bar{V}$, wherein the delay-domain matrix, comprising r basis vectors, is given by $$\bar{V} \approx F_V \tilde{V},$$

where $F_V \in \mathbb{C}^{S \times L}$ contains L vectors of size S×1, selected from a discrete Fourier transform, DFT, codebook $\Omega$, the size of the compressed delay-domain matrix $\tilde{V}=[\tilde{v}_1, \tilde{v}_2, \ldots, \tilde{v}_r]$ is given by L×r, and L is the number of delays, and the oversampled codebook matrix is given by $\Omega=[d_0, d_1, \ldots, d_{SO_f-1}]$, where $$\left[1 \; e^{\frac{-j2\pi i}{O_f S}} \ldots e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes the oversampling factor of the DFT-codebook matrix; and reporting the explicit CSI containing the identified first set of r basis vectors, the second reduced-sized delay-domain set of r basis vectors, along with the L delays, represented by a set of indices that correspond to the selected DFT-vectors in the codebook $\Omega$ from the communication device to the transmitter.

The present invention provides a method for transmitting in a wireless communication system including a communication device a communication device and a transmitter, the method comprising:

transmitting, to the communication device, downlink reference signals (CSI-RS) according to a CSI-RS configuration, and downlink signals comprising the CSI-RS configuration;

receiving, at the transmitter, uplink signals comprising a plurality of CSI reports including an explicit CSI from the communication device;

constructing a precoder matrix for a precoder connected to an antenna array having a plurality of antennas;

applying the precoder matrix on antenna ports using the explicit CSI so as to apply a set of beamforming weights to one or more antennas of the antenna array to form, by the antenna array, one or more transmit beams or one or more receive beams.

Computer Program Product

The present invention provides a computer program product comprising instructions which, when the program is executed by a computer, causes the computer to carry out one or more methods in accordance with the present invention.

Thus, the present invention provides several low feedback overhead approaches for explicit CSI reporting based on channel transformations and compression techniques, and embodiments relate to wireless communications systems and, more specifically, to frequency-domain, delay-domain, time domain or mixed frequency/delay and time/Doppler-frequency domain explicit CSI feedback to represent a downlink channel between a gNB and a single UE in the form of a channel tensor or matrix, a beamformed channel tensor or matrix, a covariance channel tensor or matrix, dominant eigenvectors of a channel tensor or matrix or dominant eigenvectors of a beamformed channel tensor or matrix. In the following, several embodiments of low feedback overhead approaches for explicit (frequency-domain, delay-domain, time domain or mixed frequency/delay and time/Doppler-frequency domain) CSI reporting based on combinations of channel transformations and compression techniques will be described.

High order PCA on Frequency-Domain Channel Tensor

In accordance with a first embodiment, a UE is configured to report "explicit CSI Type I" that represents a compressed form of a channel tensor, or a beam-formed channel tensor, or a channel covariance tensor, or a beam-formed channel covariance tensor over the configured subbands (SB), PRBs or subcarriers, according to the following sub-embodiments. Here, an SB corresponds to a set of consecutive PRBs. For example, for a bandwidth part of 10 MHz, 6 subbands each having 8 PRBs are configured.

The compressed CSI is based on a high-order principal component analysis (HO-PCA) of the channel tensor to exploit the correlations of the channel tensor in the space- and frequency-domains.

Figure 4:
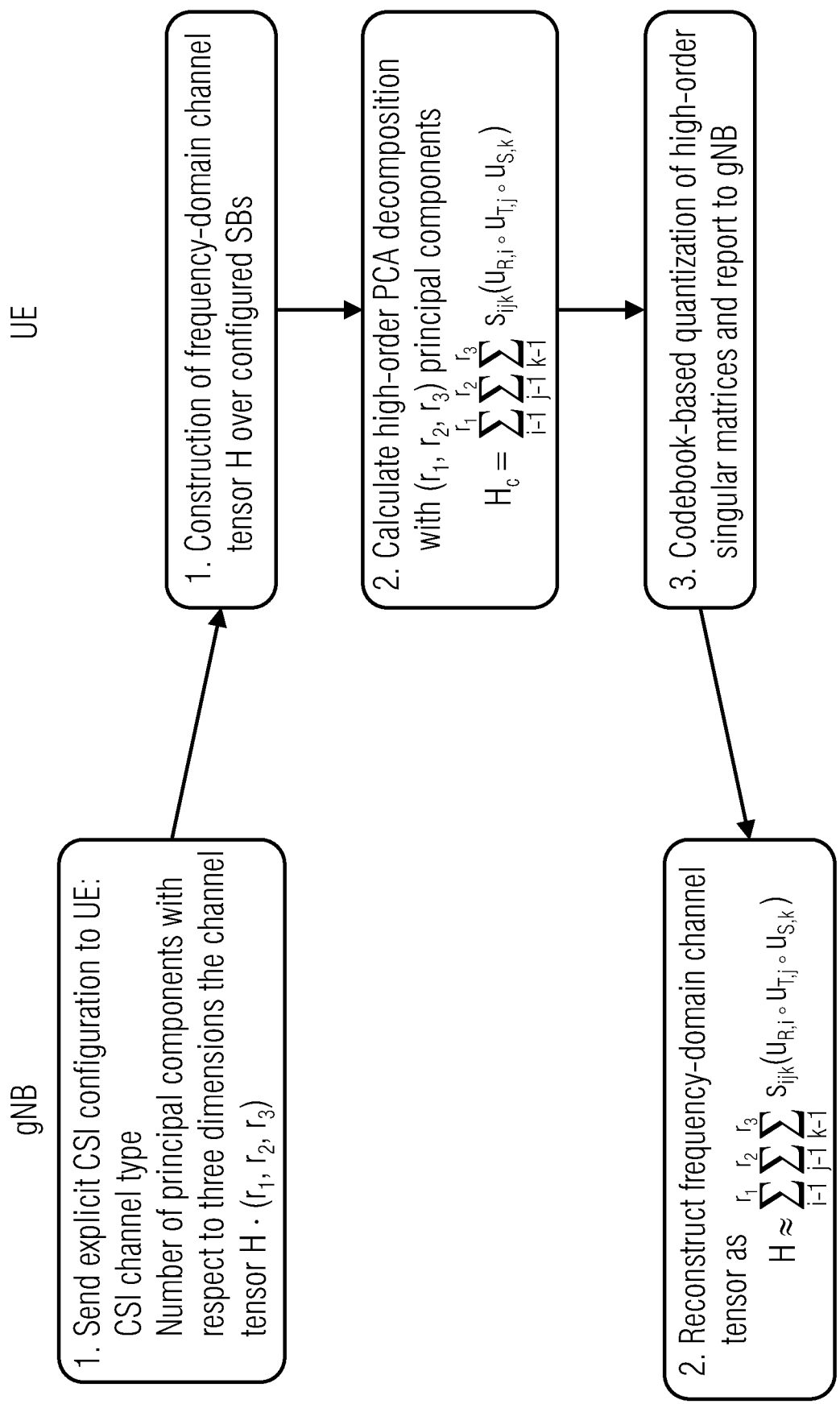
FIG. 4 is a flow diagram illustrating a HO-PCA decomposition/compression of a channel tensor, the reporting at a UE and the reconstruction of the channel tensor at the gNB in accordance with an embodiment of the present invention.
Figure 5:
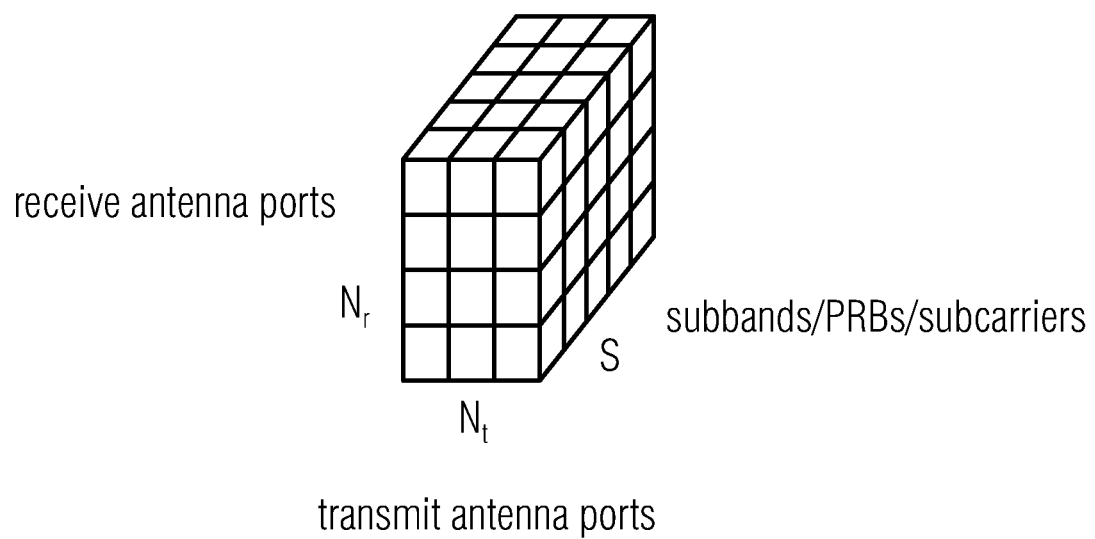
FIG. 5 illustrates a frequency-domain channel tensor (three-dimensional array) $\mathcal{H}$ of dimension $N_r \times N_t \times S$.

An illustration of this approach is shown in FIG. 4. The UE estimates in a first step the un-quantized explicit CSI using measurements on downlink reference signals (such as CSI-RS) in the frequency domain, and then constructs a three-dimensional (3D) frequency-domain channel tensor (a three-dimensional array) $\mathcal{H} \in \mathbb{C}^{N_r \times N_t \times S}$ of dimension $N_r \times N_t \times S$, where S is the number of subbands, PRBs, or subcarriers (see FIG. 5). The definition of $N_t$ and $N_r$ is dependent on the configuration of the CSI type:

$N_t$ is the number of transmit antenna ports $2N_1N_2$ for CSI type configuration "channel tensor", $N_t=2N_1N_2$, and $N_r$ is the number of UE receive antenna ports;

$N_t$ is the number of transmit antenna ports $2N_1N_2$ at the gNB, $N_t=2N_1N_2$, $N_r=2N_1N_2$, for CSI type configuration "channel covariance tensor";

$N_t$ is the number of beamformed antenna ports/beams $N_t=2U$ and $N_r$ is the number of UE receive antenna ports for CSI type configuration "beamformed-channel tensor";

$N_t$ is the number of beamformed antenna ports/beams $N_t=2U$ beams 2U and $N_r$ is the number of beamformed antenna ports/beams $N_r=2U$ beams 2U for CSI type configuration "beamformed-channel covariance tensor";

Then, the UE performs a HO-PCA on the channel tensor $\mathcal{H}$, such that $\mathcal{H}$ is represented by $$\mathcal{H} = \sum_{i=1}^{N_r}\sum_{j=1}^{N_t}\sum_{k=1}^{S} s_{ijk}(u_{R,i} \circ u_{T,j} \circ u_{S,k}),$$

where $U_R=[u_{R,1}, \ldots, u_{R,N_r}] \in \mathbb{C}^{N_r \times N_r}$ is matrix containing the higher order singular vectors with respect to the first dimension of the channel tensor $\mathcal{H}$;

$U_T=[u_{T,1}, \ldots, u_{T,N_t}] \in \mathbb{C}^{N_t \times N_t}$ is matrix containing the higher order singular vectors with respect to the second dimension of the channel tensor $\mathcal{H}$;

$U_S=[u_{S,1}, \ldots, u_{S,R}] \in \mathbb{C}^{S \times R}$ is a matrix containing the higher order singular vectors with respect to the frequency dimension (third dimension of the channel tensor $\mathcal{H}$) with $R=\min(S, N_tN_r)$;

$S_{ijk}$ are the higher order singular values, sorted as $S_{ijk} \geq S_{i'j'k'}$ with $i' \leq i$, $j' \leq j$, $k' \leq k$.

Moreover, the ○ symbol represents the outer product operator which is the generalization of the outer product of two vectors (giving rise to a matrix that contains the pairwise products of all the elements of the two vectors) to multi-way matrices/tensors. The outer product of an R-way tensor $\mathcal{A}$ (i.e., a matrix that is indexed by R indices) and a P-way tensor $\mathcal{B}$ is a (R+P)-way tensor $\mathcal{C}$ containing all pairwise products of all the elements of $\mathcal{A}$ and $\mathcal{B}$. Note that vectors and matrices may be seen as 1-way and 2-way tensors respectively. Therefore, the outer product between two vectors is a matrix, the outer product between a vector and a matrix is a 3-way tensor, and so on.

To reduce the number of channel coefficients, the channel tensor $\mathcal{H}$ is approximated by $(r_1, r_2, r_3)$, $(1 \leq r_1 \leq N_r, 1 \leq r_2 \leq N_t, 1 \leq r_3 \leq S)$ dominant principal components with respect to the first, second and third dimensions and the corresponding left, right and lateral singular matrices, respectively. The compressed explicit frequency-domain channel tensor (explicit CSI) is given by $$\mathcal{H}_c = \sum_{i=1}^{r_1}\sum_{j=1}^{r_2}\sum_{k=1}^{r_3} s_{ijk}(u_{R,i} \circ u_{T,j} \circ u_{S,k}).$$

where $\overline{U}_R=[u_{R,1}, \ldots, u_{R,r_1}] \in \mathbb{C}^{N_r \times r_1}$, $\overline{U}_T=[u_{T,1}, \ldots, u_{T,r_2}] \in \mathbb{C}^{N_t \times r_2}$, $\overline{U}_S=[u_{S,1}, \ldots, u_{S,r_3}] \in \mathbb{C}^{S \times r_3}$, To report the compressed frequency-domain channel tensor (explicit CSI) from the UE to the gNB, the UE quantizes the coefficients of the vectors $u_{R,i}$, $u_{T,j}$, and $u_{S,k}$ and the HO singular values $S_{ijk}$ using a codebook approach.

The gNB reconstructs the compressed channel tensor as $$\mathcal{H}_c = \sum_{i=1}^{r_1}\sum_{j=1}^{r_2}\sum_{k=1}^{r_3} s_{ijk}(u_{R,i} \circ u_{T,j} \circ u_{S,k}).$$

The number of complex coefficients that need to be quantized for the frequency-domain HO-PCA approach is given by $N_r r_1 + N_t r_2 + S r_3$ for the higher-order singular vectors and number of real coefficients that need to be quantized for the frequency-domain HO-PCA approach is $r_1 r_2 r_3$, for the higher-order singular values, respectively. In comparison, for the standard (non-high order) PCA, it is needed to quantize $N_r N_t r + S r + r$ values for the singular vectors and the singular values with $r=\min(N_r N_t, S)$. For small values of ($r_1$, $r_2$, $r_3$) (low rank approximation of the channel tensor), the compression achieved by the HO-PCA is higher than the compression achieved by the standard non-HO PCA approach.

In one method, the values of ($r_1$, $r_2$, $r_3$), representing the number of dominant principal components with respect to the first, second and third dimension of the channel tensor, respectively, are configured via higher layer (e.g., RRC, or MAC-CE) signaling from the gNB to the UE. In another method, the UE reports the preferred values of ($r_1$, $r_2$, $r_3$) as a part of the CSI report, or they are known at the UE.

Figure 6:
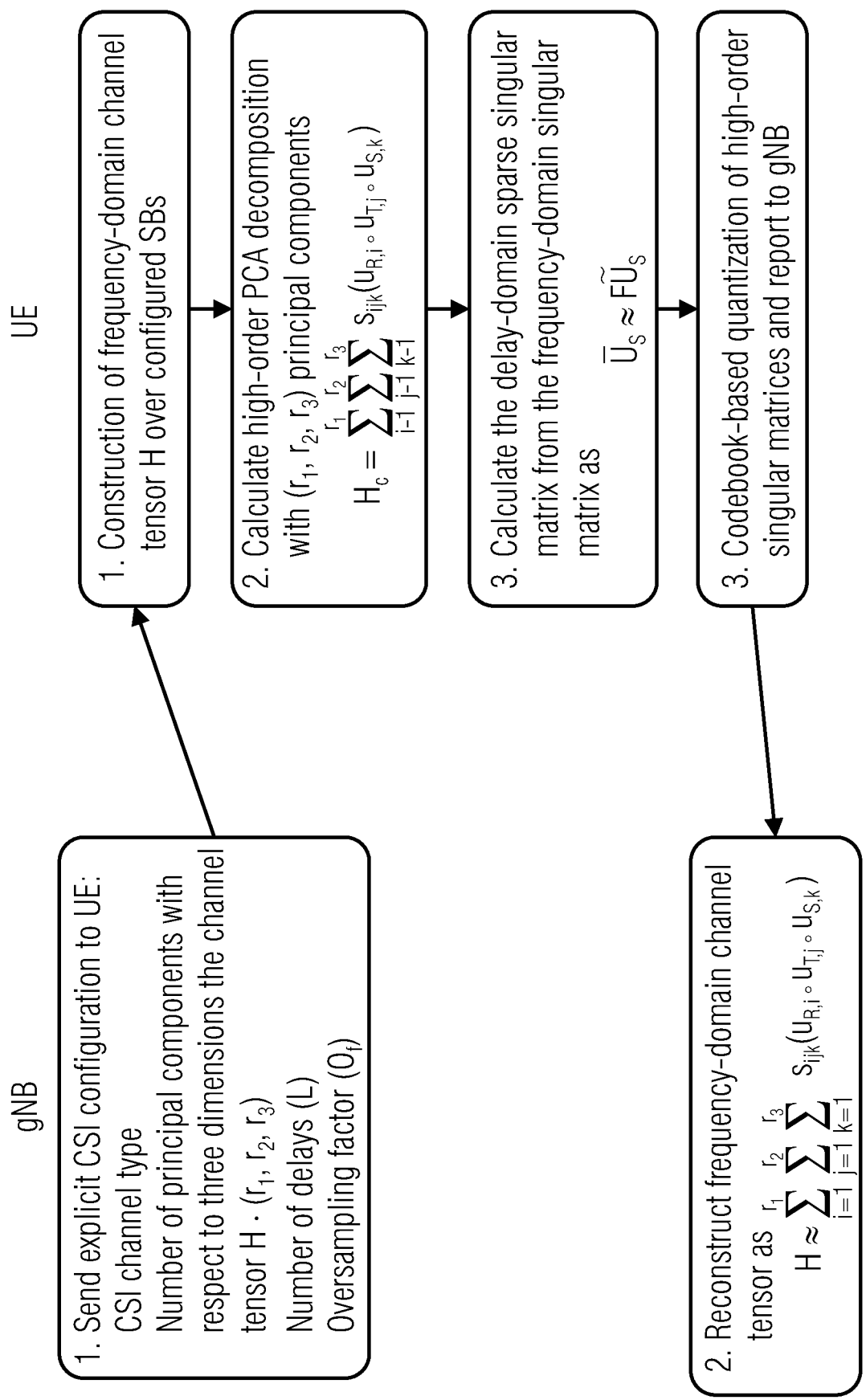
FIG. 6 is a flow diagram illustrating a HO-PCA decomposition/compression of a channel tensor in combination with delay-domain compression, the reporting at the UE and the reconstruction of the channel tensor at gNB in accordance with an embodiment of the present invention.

In accordance with a sub-embodiment 1-1 of the first embodiment 1, as illustrated in FIG. 6, a UE is configured to report "explicit CSI Type I" with "delay-domain CSI for the higher-order singular-value matrix $\overline{U}_S$". In this configuration, the UE calculates an approximated reduced-sized (compressed) delay-domain higher-order singular-matrix $\tilde{U}_S$ from the frequency-domain higher-order singular-matrix $\overline{U}_S$. The delay-domain higher-order singular-matrix is given by $$\overline{U}_S \approx F_S \tilde{U}_S,$$

where $F_S \in \mathbb{C}^{S \times L}$ is non-square, or square matrix of size $S \times L$ consisting of L discrete Fourier transform (DFT) vectors. The size of the compressed delay-domain matrix $\tilde{U}_S$ is given by $L \times r_3$. A compression is achieved when $L < S$.

The DFT vectors in $F_S$ are selected from a oversampled DFT-codebook matrix $\Omega = [d_0, d_1, \ldots, d_{SO_f-1}]$, where $$d_i = \begin{bmatrix} 1 & e^{\frac{-j2\pi i}{O_f S}} & \ldots & e^{\frac{-j2\pi i(S-1)}{O_f S}} \end{bmatrix}^T \in \mathbb{C}^{S\times 1}, i = 0, \ldots, O_f S - 1.$$

Here, $O_f \in \{1, 2, 3, \ldots\}$ denotes the oversampling factor of the DFT-codebook matrix. The indices of the vectors in $F_S$ selected from the codebook $\Omega$ are stored in a set $\mathbb{Q} = (i_1, i_2, \ldots, i_L)$.

The UE quantizes the coefficients of the vectors in $\overline{U}_R = [u_{R,1}, \ldots, u_{R,r_1}]$, $\overline{U}_T = [u_{T,1}, \ldots, u_{T,r_2}]$, and $\tilde{U}_S = [\tilde{u}_{S,1}, \ldots, \tilde{u}_{S,r_3}] \in \mathbb{C}^{L \times r_3}$ and the HO singular values $s_{ijk}$ using a codebook approach, and reports them along with the L delays, represented by a set of indices $\mathbb{Q}$ that correspond to the selected DFT vectors in the codebook $\Omega$, to the gNB. The gNB reconstructs the frequency-domain channel tensor $\mathcal{H}_c$, according to embodiment 1, where $\overline{U}_S$ is calculated as $\overline{U}_S = [u_{S,1}, \ldots, u_{S,r_3}] = F_S \tilde{U}_S$.

In one method, the number of delays L is configured via higher layer (e.g., RRC, or MAC) signaling from the gNB to the UE. In another method, the UE reports the preferred value of L as a part of the CSI report, or it is known at the UE.

The oversampled factor $O_f$ of the DFT codebook matrix is configured via higher layer (e.g., RRC, or MAC) or physical layer (via the downlink control indicator (DCI)) signaling from the gNB to the UE, or it is known at the UE.

Standard (Non-High-Order) PCA of Frequency-Domain Channel Matrix with Delay-Domain Compression In accordance with a second embodiment 2, a UE is configured to report "explicit CSI Type II" that represents a compressed form of a channel matrix, or a beam-formed channel matrix, or a channel covariance matrix, or beam-formed channel covariance matrix over the configured sub-bands (SB), PRBs or subcarriers, according to the following sub-embodiments.

The compressed CSI performs a standard non-high-order principal component analysis (non-HO-PCA) on a channel matrix combined with a delay-domain transformation and compression of the channel matrix.

Figure 7:
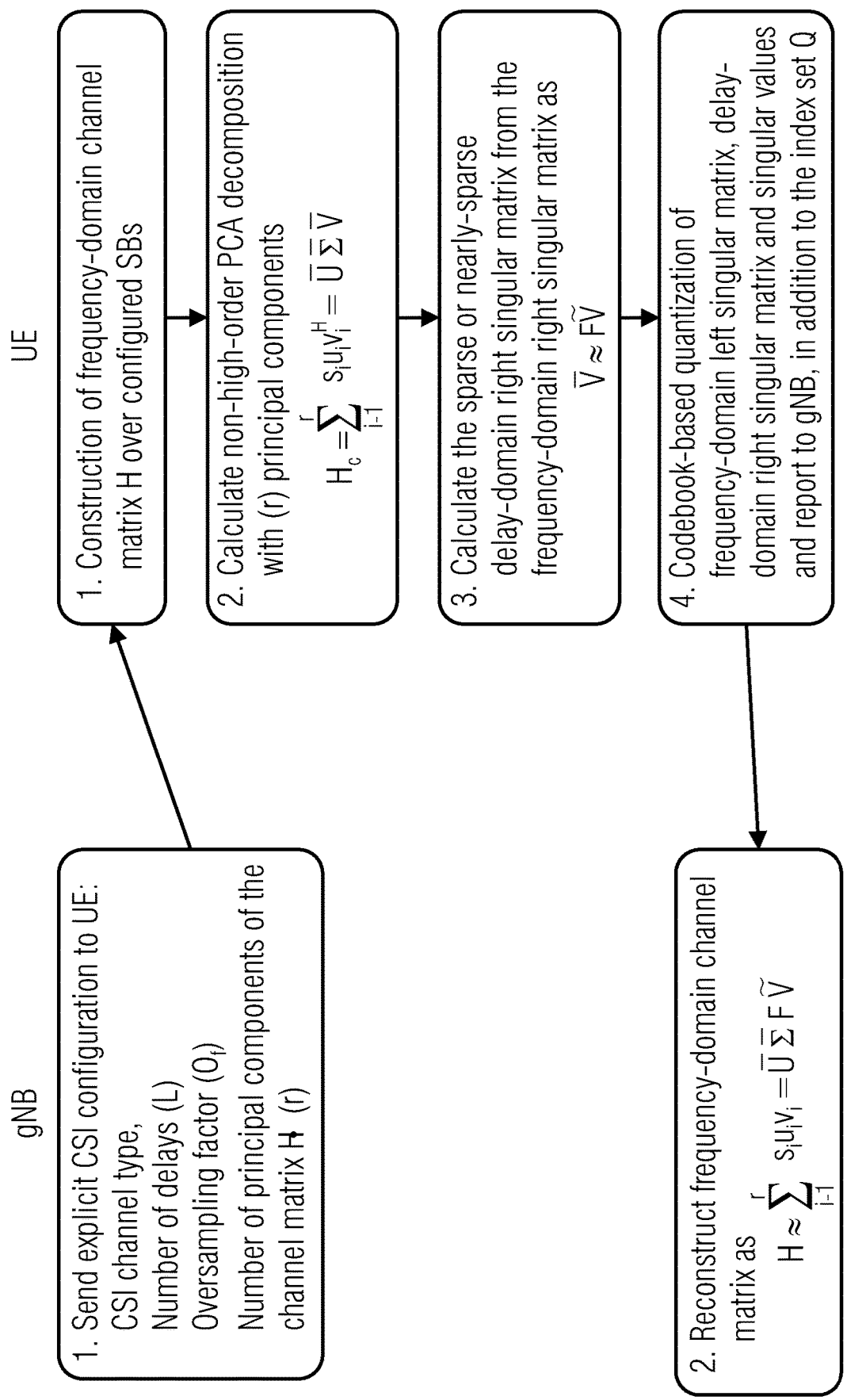
FIG. 7 is a flow diagram illustrating a PCA decomposition/compression of a channel matrix, the reporting at a UE and the reconstruction of the channel matrix at the gNB in accordance with an embodiment of the present invention.
Figure 8:
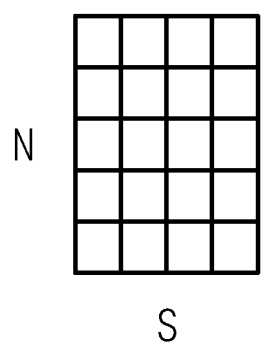
FIG. 8 illustrates a frequency-domain channel matrix (two-dimensional array) H of dimension N×S, where $N=N_t N_r$.

An illustration of this approach is shown in FIG. 7. The UE estimates in a first step the un-quantized explicit CSI using measurements on downlink reference signals (such as CSI-RS) in the frequency domain, and then constructs a 2D frequency-domain channel matrix $H \in \mathbb{C}^{N_t N_r \times S}$ of dimension $N_t N_r \times S$, where S is the number of subbands, PRBs, or subcarriers (see FIG. 8). The definition of $N_t$ and $N_r$ is dependent on the configuration of the CSI type:

$N_t$ is the number of transmit antenna ports $2N_1 N_2$ for CSI type configuration "channel matrix", $N_t = 2N_1 N_2$, and $N_r$ is the number of UE receive antenna ports;

$N_t$ is the number of transmit antenna ports $2N_1 N_2$ at the gNB, $N_t = 2N_1 N_2$, $N_r = 2N_1 N_2$, for CSI type configuration "channel covariance matrix";

$N_t$ is the number of beamformed antenna ports/beams $N_t = 2U$ and $N_r$ is the number of UE receive antenna ports for CSI type configuration "beamformed-channel matrix";

$N_t$ is the number of beamformed antenna ports/beams $N_t = 2U$ and $N_r$ is the number of beamformed antenna ports/beams $N_r = 2U$ for CSI type configuration "beamformed-channel covariance matrix";

The UE applies a standard PCA-decomposition to the frequency-domain channel matrix H, represented by $$H = U\Sigma V^H = \sum_{i=1}^{R} s_i u_i v_i^H,$$

where
$U = [u_1, u_2, \ldots, u_R]$ is the $N_t N_r \times R$ left-singular matrix;
$V = [v_1, v_2, \ldots, v_R]$ is the $S \times R$ right-singular matrix;
$\Sigma$ is a $R \times R$ diagonal matrix with ordered singular values $s_i$ ($s_1 \geq s_2 \geq \ldots s_R$) on its main diagonal, and $R = \min(S, N_t N_r)$.

To reduce the number of channel coefficients, the channel matrix H is approximated by r, $1 \leq r \leq R$ dominant principal components. The "compressed" channel matrix $H_c$ is given by $$H_c = \overline{U}\overline{\Sigma}\overline{V}^H,$$

where $\overline{U} = [u_1, u_2, \ldots, u_r]$, $\overline{V} = [v_1, v_2, \ldots, v_r]$, and $\overline{\Sigma} = \mathrm{diag}(s_1, s_2, \ldots, s_r)$.

Furthermore, the UE calculates from the frequency-domain right-singular matrix $V$ the corresponding "compressed" delay-domain right singular matrix. The delay-domain right-singular matrix is approximated by $$\overline{V} \approx F_V \tilde{V},$$

where $F_V \in \mathbb{C}^{S \times L}$ is a squared, or non-squared DFT matrix of size S×L. The size of the compressed delay-domain left-singular matrix is given by L×r. A compression is achieved for L<S.

The columns of the transformation/compression matrix $F_V$ are selected from a DFT codebook matrix ($\Omega$) of dimension S×SO$_f$, where O$_f$ denotes the oversampling factor of the DFT codebook-matrix. The indices of the selected vectors in $F_V$ from the codebook are stored in a set $\mathbb{Q} = (i_1, i_2, \ldots, i_L)$.

The UE quantizes the frequency-domain left singular-matrix $\overline{U}$, the delay-domain right singular-matrix $\tilde{V}$ and the singular values $s_1, s_2, \ldots, s_r$ using a codebook approach, and then reports them along with the L delays, represented by the index set $\mathbb{Q}$ to the gNB.

The gNB reconstructs the explicit CSI as $$H_c = \overline{U}\Sigma(F\tilde{V})^H$$

In one method, the number of delays L is configured via higher layer (e.g., RRC, or MAC) signaling, or physical layer (via the downlink control indicator (DCI)) signaling from the gNB to the UE. In another method, the UE reports the preferred value of L as a part of the CSI report, or it is known at the UE.

In one method, the value of r, representing the number of dominant principal components of the channel matrix is configured via higher layer (e.g., RRC, or MAC-CE) signaling from the gNB to the UE. In another method, the UE reports the preferred value of r as a part of the CSI report, or it is known at the UE.

The oversampled factor O$_f$ of the DFT codebook matrix is configured via higher layer (e.g., RRC, or MAC) or via DCI physical signaling from the gNB to the UE, or it is known at the UE.

Transformation/Compression of Channel Tensor in Combination with HO-PCA

In accordance with a third embodiment 3, a UE is configured to report "explicit CSI Type III" that represents a transformed and compressed form of a channel tensor, or a beam-formed channel tensor, or a channel covariance tensor, or a beam-formed covariance tensor over the configured subbands (SB), PRBs or subcarriers with respect to the space, frequency, or space and frequency dimension of the channel tensor. The CSI combines channel tensor transformation with data compression by exploiting the sparse representation in the delay domain and the correlations of the channel coefficients in the spatial and frequency/delay domains.

Figure 9:
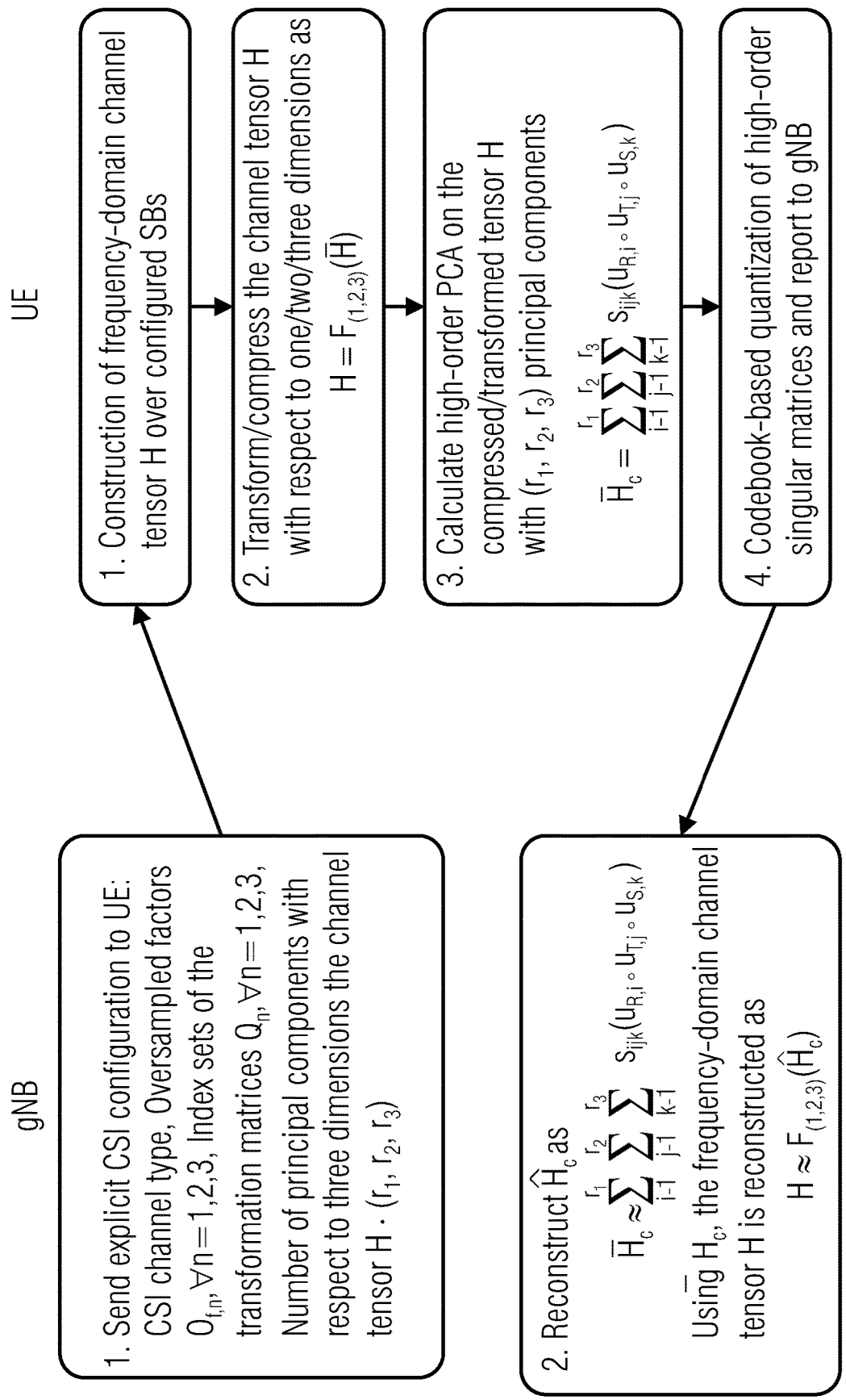
FIG. 9 is a flow diagram illustrating a transformation/compression of a channel tensor in combination with a HO-PCA decomposition, the reporting at the UE and the reconstruction of the channel tensor at gNB in accordance with an embodiment of the present invention.

An illustration of this approach is shown in FIG. 9. The UE estimates in a first step the un-quantized explicit CSI using measurements on downlink reference signals (such as CSI-RS) in the frequency domain, and then constructs a 3D frequency-domain channel tensor $\mathcal{H} \in \mathbb{C}^{N_r \times N_t \times S}$ of dimension $N_r \times N_t \times S$, where S is the number of subbands, PRBs, or subcarriers. The definition of $N_t$ and $N_r$ is dependent on the configuration of the CSI type:

$N_t$ is the number of transmit antenna ports $2N_1N_2$ for CSI type configuration "channel tensor", $N_t = 2N_1N_2$, and $N_r$ is the number of UE receive antenna ports;

$N_t$ is the number of transmit antenna ports $2N_1N_2$ at the gNB, $N_t = 2N_1N_2$, $N_r = 2N_1N_2$, for CSI type configuration "channel covariance tensor";

$N_t$ is the number of beamformed antenna ports/beams $N_t = 2U$ and $N_r$ is the number of UE receive antenna ports for CSI type configuration "beamformed-channel tensor";

$N_t$ is the number of beamformed antenna ports/beams $N_t = 2U$ and $N_r$ is the number of beamformed antenna ports/beams $N_r = 2U$ for CSI type configuration "beamformed-channel covariance tensor";

After the construction of the frequency-domain channel tensor $\mathcal{H}$, a one-dimensional (1D), two-dimensional (2D) or three-dimensional (3D) transformation of the channel tensor is applied with respect to the space, frequency, or frequency and space dimensions of the channel tensor. The aim of the transformation is to obtain a sparse or nearly-sparse representation of the channel tensor in one, two, or three dimensions. After the transformation and compression step, the size of the channel tensor is reduced and a compression with respect to one, two or three dimensions of the channel tensor is achieved. For example, a transformation/compression with respect to all three dimensions of the channel tensor $\mathcal{H}$ is represented by a (column-wise) Kronecker product as $$\mathcal{H} = \mathcal{F}_{(1,2,3)}(\hat{\mathcal{H}}),$$

$$vec(\mathcal{H}) =$$

$$vec(\mathcal{F}_{(1,2,3)}(\hat{\mathcal{H}})) = \sum_{n_r=0}^{N'_r-1} \sum_{n_t=0}^{N'_t-1} \sum_{s=0}^{S'-1} \gamma_{n_r,n_t,s} b_{3,n_r,n_t,s} \otimes b_{2,n_r,n_t,s} \otimes b_{1,n_r,n_t,s},$$

where
$b_{1,n_r,n_t,s}$ is a transformation vector of size $N_r \times 1$ with respect to the first dimension of the channel tensor $\mathcal{H}$, selected from a codebook matrix $\Omega_1$;
$b_{2,n_r,n_t,s}$ is a transformation vector of size $N_t \times 1$ with respect to the second dimension of the channel tensor $\mathcal{H}$, selected from a codebook matrix $\Omega_2$;
$b_{3,n_r,n_t,s}$ is a transformation vector of size S×1 with respect to the third dimension of the channel tensor $\mathcal{H}$, selected from a codebook matrix $\Omega_3$;
$\gamma_{n_r,n_t,s}$ is the transformed/compressed channel coefficient associated with the vectors $b_{1,n_r,n_t,s}$, $b_{2,n_r,n_t,s}$, and $b_{3,n_r,n_t,s}$, and
$N'_r$, $N'_t$, and $S'$ represents the value of the first, second and third dimension of the transformed/compressed channel tensor $\hat{\mathcal{H}}$ respectively.

The transformed/compressed channel coefficients $\gamma_{n_r,n_t,s}$ are used to form the transformed/compressed channel tensor $\hat{\mathcal{H}}$ of dimension $N'_r \times N'_t \times S'$, where $N'_r \leq N_r$, $N'_t \leq N_t$, $S' \leq S$.

For example, a transformation/compression with respect to the two space dimensions of the channel tensor $\mathcal{H}$ is represented by $$\mathcal{H} = \mathcal{F}_{(1,2)}(\hat{\mathcal{H}}),$$

$$vec(\mathcal{H}) = vec(\mathcal{F}_{(1,2)}(\hat{\mathcal{H}})) = \sum_{n_r=0}^{N'_r-1} \sum_{n_t=0}^{N'_t-1} \sum_{s=0}^{S'-1} \gamma_{n_r,n_t,s} b_{3,s} \otimes b_{2,n_r,n_t,s} \otimes b_{1,n_r,n_t,s},$$

where $b_{3,s}$ is a vector of all zeros with the s-th element being one, $b_{2,n_r,n_t,s}$ is a vector of size $N_t \times 1$ with respect to the second dimension of the channel tensor $\mathcal{H}$, selected from a codebook matrix $\Omega_2$, $b_{1,n_r,n_t,s}$ is a transformation vector of size $N_r \times 1$ with respect to the first dimension of the channel tensor $\mathcal{H}$, selected from a codebook matrix $\Omega_1$ and $N'_r \leq N_r$, $N'_t \leq N_t$, S'=S.

For example, a transformation/compression with respect to the frequency dimension of the channel tensor $\mathcal{H}$ is represented by $$\mathcal{H} = \mathcal{F}_{(3)}(\hat{\mathcal{H}}),$$

$$vec(\mathcal{H}) = vec(\mathcal{F}_{(3)}(\hat{\mathcal{H}})) = \sum_{n_r=0}^{N'_r-1} \sum_{n_t=0}^{N'_t-1} \sum_{s=0}^{S'-1} \gamma_{n_r,n_t,s} b_{3,n_r,n_t,s} \otimes b_{2,n_r} \otimes b_{1,n_t},$$

where $b_{2,n_r}$ is a vector of all zeros with the $n_r$-th element being one, $b_{1,n_t}$ is a vector of all zeros with the $n_t$-th element being one, $b_{3,n_r,n_t,s}$ is a transformation vector of size $S \times 1$ with respect to the third dimension of the channel tensor $\mathcal{H}$, selected from a codebook matrix $\Omega_3$, and $N'_r = N_r$, $N'_t = N_t$ and $S' \leq S$.

The indices of the selected vectors $b_{1,n_r,n_t,s}$, $b_{2,n_r,n_t,s}$ and $b_{3,n_r,n_t,s}$ from the codebook matrices $\Omega_n$, n=1, 2, 3 are stored in a set $\mathbb{Q}$ of g-tuples, where g refers to the number of transformed dimensions.

For example, for g=1, the set $\mathbb{Q}$ is represented by $\mathbb{Q} = \{i_1, i_2, \ldots, i_T\}$, where T denotes the number of selected vectors with respect to the transformed/compressed dimension of the channel tensor $\mathcal{H}$. For example, in the case of a transformation/compression with respect to the frequency dimension, T=S'.

For example, for g=3, the set $\mathbb{Q}$ is represented by 3-tuples $(i_{1,n_r}, i_{2,n_t}, i_{3,s})$, where $i_{1,n_r}$ is the index associated with vectors $b_{1,n_r,n_t,s}$, $i_{2,n_t}$ is the index associated with vector $b_{1,n_r,n_t,s}$, and $i_{3,s}$ is the index associated with vector $b_{3,n_r,n_t,s}$. The set $\mathbb{Q}$ is given by $$\mathbb{Q} = \{(i_{1,0}, i_{2,0}, i_{3,0}), \ldots, (i_{1,N'_r-1}, i_{2,N'_t-1}, i_{3,S'-1})\}$$

In one method, the size of the set $\mathbb{Q}$ is configured via higher layer (e.g., RRC, or MAC) or physical layer signaling from the gNB to the UE. In another method, the UE reports the preferred size of the set as a part of the CSI report or it is known at the UE.

The codebook matrices $\Omega_n$ are given by matrices $\Omega_n = [d_{n,0}, d_{n,1}, \ldots, d_{n,TO_n-1}]$, where the parameter $O_n$ denotes the oversampling factor with respect to the n-th dimension where T=$N_r$ for n=1, T=$N_t$ for n=2, and T=S for n=3.

The oversampled factors $O_{f,n}$ of the codebook matrices are configured via higher layer (e.g., RRC, or MAC) or via DCI physical layer signaling from the gNB to the UE, or they are known at the UE.

As an example, the selection of the transformation/compression vectors and transformed/compressed channel coefficients for a transformation/compression with respect to the second and third dimension, can be calculated by $$\min \|vec(\mathcal{H}) - vec(\mathcal{F}_{(2,3)}(\hat{\mathcal{H}}))\|_2^2.$$

The optimization problem may be solved by standard algorithms such as orthogonal matching pursuit. As a result, the indices of the vectors in the transformation matrices selected from the codebooks and the transformed channel coefficients associated with each domain are known.

After the channel transformation/compression, the UE performs a HO-PCA on the transformed/compressed channel tensor $\hat{\mathcal{H}}$, such that $\hat{\mathcal{H}}$ is represented by $$\hat{\mathcal{H}} = \sum_{i=1}^{N'_r} \sum_{j=1}^{N'_t} \sum_{k=1}^{S'} s_{ijk}(u_{R,i} \circ u_{T,j} \circ u_{S,k}),$$

where $U_R = [u_{R,1}, \ldots, u_{R,N'_r}] \in \mathbb{C}^{N'_r \times N}$ is a matrix containing the high-order singular vectors with respect to the first dimension of the transformed/compressed channel tensor $\hat{\mathcal{H}}$;

$U_T = [u_{T,1}, \ldots, u_{T,N'_t}] \in \mathbb{C}^{N'_t \times N}$ is matrix containing the high-order singular vectors with respect to the second dimension of the transformed/compressed channel tensor $\hat{\mathcal{H}}$;

$U_S = [u_{S,1}, \ldots, u_{S,R}] \in \mathbb{C}^{S' \times R}$ is a matrix containing the high-order singular vectors with respect to the third dimension of the channel tensor $\mathcal{H}$ with R=min(S', $N'_t N'_r$)

$S_{ijk}$ are the high-order singular values, sorted as $S_{ijk} \geq S_{i'j'k'}$ with i'$\leq$i, j'$\leq$j, k'$\leq$k.

To further compress the number of channel coefficients, the transformed/compressed channel tensor $\hat{\mathcal{H}}$ is approximated by $(r_1, r_2, r_3)$, $(1 \leq r_1 \leq N'_r, 1 \leq r_2 \leq N'_t, 1 \leq r_3 \leq S')$ dominant principal components with respect to the first, second and third dimensions and the corresponding left, right and lateral singular matrices. The transformed/compressed explicit channel tensor (explicit CSI) is then given by $$\hat{\mathcal{H}}_c = \sum_{i=1}^{r_1} \sum_{j=1}^{r_2} \sum_{k=1}^{r_3} s_{ijk}(u_{R,i} \circ u_{T,j} \circ u_{S,k}).$$

where $\overline{U}_R = [u_{R,1}, \ldots, u_{R,r_1}] \in \mathbb{C}^{N'_r \times r_1}$, $\overline{U}_T = [u_{T,1}, \ldots, u_{T,r_1}] \in \mathbb{C}^{N'_t \times r_2}$, $\overline{U}_S = [u_{S,1}, \ldots, u_{S,r_3}] \in \mathbb{C}^{S' \times r_3}$.

The UE quantizes the coefficients of the vectors $u_{R,i}$, $u_{T,j}$, $u_{S,k}$ and the singular values $s_{ijk}$ using a codebook approach. The quantized vectors $u_{R,i}$, $u_{T,j}$, $u_{S,k}$ and the quantized singular values $S_{ijk}$ along with the index set $\mathbb{Q}$ are reported to the gNB. The gNB reconstructs first the transformed/compressed channel tensor $\hat{\mathcal{H}}_c$ as $$\hat{\mathcal{H}}_c = \sum_{i=1}^{r_1} \sum_{j=1}^{r_2} \sum_{k=1}^{r_3} s_{ijk}(u_{R,i} \circ u_{T,j} \circ u_{S,k}).$$

Then, based on the transformed/compressed channel tensor $\hat{\mathcal{H}}_c$ and the signaled index set $\mathbb{Q}$, the frequency-domain channel tensor $\mathcal{H}$ is reconstructed as $vec(\mathcal{H}) \approx \mathcal{F}_{(1,2,3)}(\hat{\mathcal{H}}_c)$(three-dimensional transformation/compression);

$vec(\mathcal{H}) \approx \mathcal{F}_{(1,2)}(\hat{\mathcal{H}}_c)$(two-dimensional transformation/compression);

$vec(\mathcal{H}) \approx \mathcal{F}_{(3)}(\hat{\mathcal{H}}_c)$(one-dimensional transformation/compression).

The number of coefficients that need to be quantized for the frequency-domain HO-PCA approach is given by $N'_1 r_1 + N'_2 r_2 + S' r_3 + r_1 r_2 r_3$, for the higher-order singular vectors and the higher-order singular values.

In one method, the values of ($r_1$, $r_2$, $r_3$), representing the number of dominant principal components with respect to the first, second and third dimension of the transformed/compressed channel tensor $\hat{\mathcal{H}}_c$, respectively, are configured via higher layer signaling from the gNB to the UE. In another method, the UE reports the preferred values of ($r_1$, $r_2$, $r_3$) as a part of the CSI report or they are known at the UE.

In accordance with a sub-embodiment 31 of the third embodiment 3, the 3D transformation/compression function $\mathcal{F}_{(1,2,3)}(\hat{\mathcal{H}}_c)$ is given by a two-dimensional Discrete Cosine transformation (2D-DCT) with respect to the space dimensions and a 1D-DFT transformation with respect to the frequency dimension of the channel tensor. The codebook matrices $\Omega_n$, n=1,2 are given by oversampled discrete cosine transform (DCT) matrices. The codebook matrix $\Omega_3$ is given by an oversampled DFT matrix.

In accordance with a sub-embodiment 32 of the third embodiment 3, the 3D transformation/compression function $\mathcal{F}_{(1,2,3)}(\hat{\mathcal{H}})$ is given by a 3D-DFT transformation and the codebook matrices $\Omega_n$, n=1, 2, 3 are given by oversampled DFT matrices.

In accordance with a sub-embodiment 33 of the third embodiment 3, the 2D transformation/compression function $\mathcal{F}_{(1,2)}(\hat{\mathcal{H}})$ is given by a 2D-Discrete Cosine transformation (DCT) and the codebook matrices $\Omega_n$, n=1,2 are given by oversampled DCT matrices.

In accordance with a sub-embodiment 34 of the third embodiment 3, the 1D transformation/compression function $\mathcal{F}_{(3)}(\hat{\mathcal{H}})$ is given by a 1D-DFT transformation and the codebook matrix $\Omega_3$ is given by an oversampled DFT matrix.

Transformation/Compression of Channel Matrix in Combination with Standard Non-HO-PCA In accordance with a fourth embodiment 4, a UE is configured to report "explicit CSI Type IV" that represents a transformed and compressed form of a channel matrix, or a beam-formed channel tensor, or a channel covariance tensor over the configured subbands (SB), PRBs or subcarriers with respect to the space, frequency, or space and frequency dimension of the channel matrix. The CSI combines channel tensor transformation with data compression by exploiting the sparse representation in the delay domain and the correlations of the channel coefficients in the spatial and frequency/delay domains.

Figure 10:
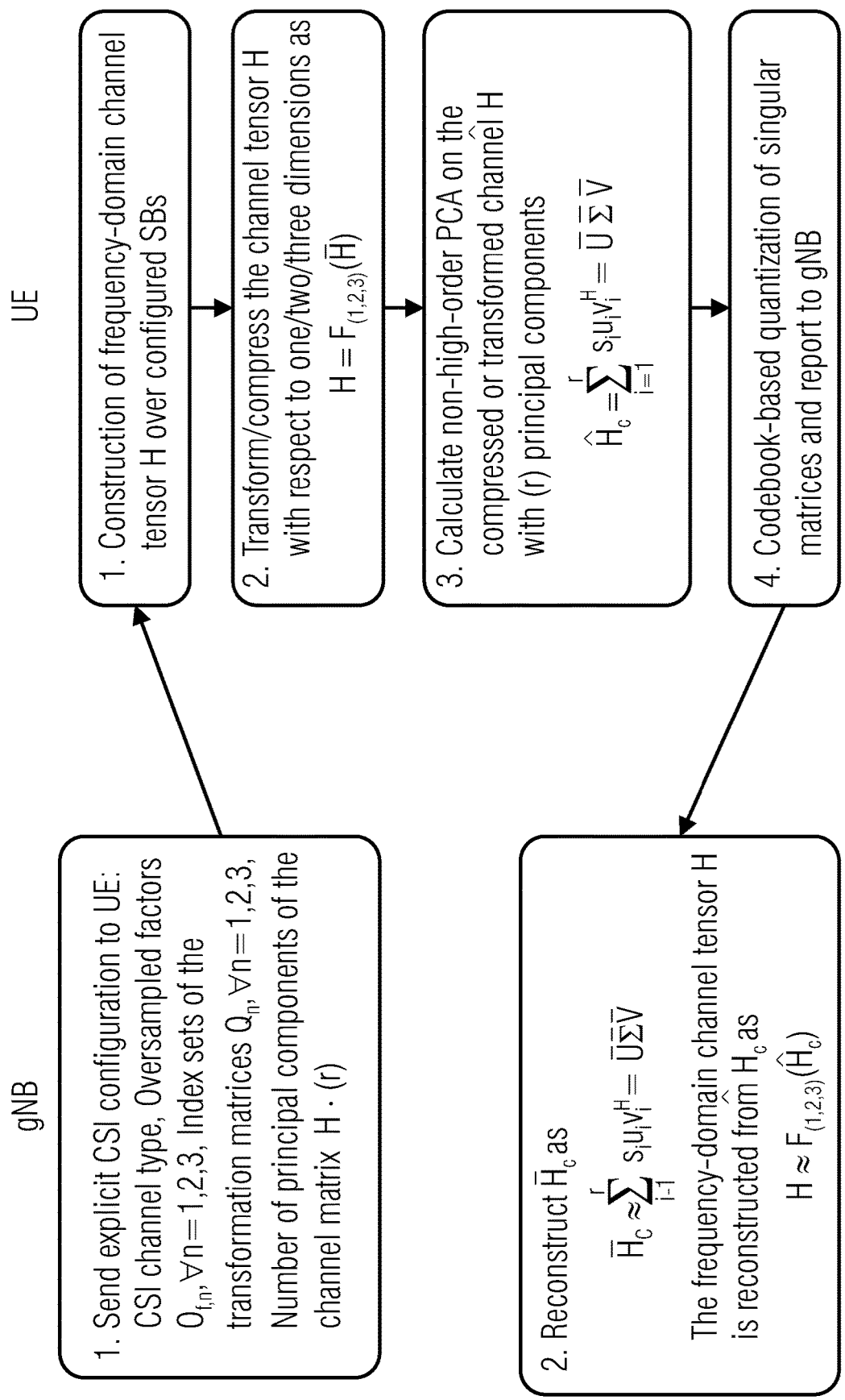
FIG. 10 is a flow diagram illustrating a transformation/compression of a channel matrix in combination with a non-HO PCA decomposition, the reporting at the UE and the reconstruction of channel tensor at the gNB in accordance with an embodiment of the present invention.

An illustration of this approach is shown in FIG. 10. The UE estimates in a first step the un-quantized explicit CSI using measurements on downlink reference signals (such as CSI-RS) in the frequency domain, and then constructs a three-dimensional (3D) frequency-domain channel tensor (a three-dimensional array) $\mathcal{H} \in \mathbb{C}^{N_r \times N_t \times S}$ of dimension $N_r \times N_t \times S$, where S is the number of subbands, PRBs, or subcarriers. The definition of $N_t$ and $N_r$ is dependent on the configuration of the CSI type:

- $N_t$ is the number of transmit antenna ports $2N_1 N_2$ for CSI type configuration "channel tensor", $N_t = 2N_1 N_2$, and $N_r$ is the number of UE receive antenna ports;
- $N_t$ is the number of transmit antenna ports $2N_1 N_2$ at the gNB, $N_t = 2N_1 N_2$, $N_r = 2N_1 N_2$, for CSI type configuration "channel covariance tensor";
- $N_t$ is the number of beamformed antenna ports/beams $N_t = 2U$ and $N_r$ is the number of UE receive antenna ports for CSI type configuration "beamformed-channel tensor";
- $N_t$ is the number of beamformed antenna ports/beams $N_t = 2U$ and $N_r$ is the number of beamformed antenna ports/beams $N_r = 2U$ for CSI type configuration "beamformed-channel covariance tensor";

After the construction of the frequency-domain channel tensor $\mathcal{H}$, a one-dimensional (1D), two-dimensional (2D) or three-dimensional (3D) transformation and compression of the channel tensor is applied with respect to the space, frequency, or frequency and space dimensions of the channel tensor. The aim of the transformation is to obtain a sparse or nearly-sparse representation of the channel tensor in one, two, or three dimensions and to extract the dominant coefficients having the highest energy. After the transformation/compression step, the size of the channel tensor is reduced and a compression with respect to one, two or three dimensions of the channel tensor is achieved.

For example, a transformation/compression with respect to all three dimensions of the channel tensor $\mathcal{H}$ is represented by a (column-wise) Kronecker product as $$\mathcal{H} = \mathcal{F}_{(1,2,3)}(\hat{\mathcal{H}}),$$

$$vec(\mathcal{H}) = vec(\mathcal{F}_{(1,2,3)}(\hat{\mathcal{H}})) = \sum_{n_r=0}^{N'_r-1} \sum_{n_t=0}^{N'_t-1} \sum_{s=0}^{N'_S-1} \gamma_{n_r,n_t,s} b_{3,n_r,n_t,s} \otimes b_{2,n_r,n_t,s} \otimes b_{1,n_r,n_t,s},$$

where
- $b_{1,n_r,n_t,s}$ is a transformation vector of size $N_r \times 1$ with respect to the first dimension of the channel tensor $\mathcal{H}$, selected from a codebook matrix $\Omega_1$;
- $b_{2,n_r,n_t,s}$ is a transformation vector of size $N_t \times 1$ with respect to the second dimension of the channel tensor $\mathcal{H}$, selected from a codebook matrix $\Omega_2$;
- $b_{3,n_r,n_t,s}$ is a transformation vector of size $S \times 1$ with respect to the third dimension of the channel tensor $\mathcal{H}$, selected from a codebook matrix $\Omega_3$;
- $\gamma_{n_r,n_t,s}$ is the transformed/compressed channel coefficient associated with the vectors $b_{1,n_r,n_t,s}$, $b_{2,n_r,n_t,s}$, and $b_{3,n_r,n_t,s}$, and
- $N'_r$, $N'_t$, and $S'$ represents the value of the first, second and third dimension of the transformed/compressed channel tensor $\hat{\mathcal{H}}$, respectively.

The transformed/compressed channel coefficients $\gamma_{n_r,n_t,s}$ are used to form the transformed/compressed channel tensor $\hat{\mathcal{H}}$ of dimension $N'_r \times N'_t \times S'$.

For example, a transformation/compression with respect to the two space dimensions of the channel tensor $\mathcal{H}$ is represented by $$\mathcal{H} = \mathcal{F}_{(1,2)}(\hat{\mathcal{H}}),$$

$$vec(\mathcal{H}) = vec(\mathcal{F}_{(1,2)}(\hat{\mathcal{H}})) = \sum_{n_r=0}^{N'_r-1} \sum_{n_t=0}^{N'_t-1} \sum_{s=0}^{S'-1} \gamma_{n_r,n_t,s} b_{3,s} \otimes b_{2,n_r,n_t,s} \otimes b_{1,n_r,n_t,s},$$

where $b_{3,s}$ is a vector of all zeros with the s-th element being one, $S'=S$, $b_{2,n_r,n_t,s}$ is a vector of size $N_t \times 1$ with respect to the second dimension of the channel tensor $\mathcal{H}$, selected from a codebook matrix $\Omega_2$, $b_{1,n_r,n_t,s}$ is a transformation vector of size $N_r \times 1$ with respect to the first dimension of the channel tensor $\mathcal{H}$, selected from a codebook matrix $\Omega_1$, $N'_r \leq N_r$, $N'_t \leq N_t$, and $S'=S$.

For example, a transformation/compression with respect to the frequency dimension of the channel tensor $\mathcal{H}$ is represented by $$\mathcal{H} = \mathcal{F}_{(3)}(\hat{\mathcal{H}}),$$

$$vec(\mathcal{H}) = vec(\mathcal{F}_{(3)}(\hat{\mathcal{H}})) = \sum_{n_r=0}^{N'_r-1} \sum_{n_t=0}^{N'_t-1} \sum_{s=0}^{S'-1} \gamma_{n_r,n_t,s} b_{3,n_r,n_t,s} \otimes b_{2,n_r} \otimes b_{1,n_t},$$

where $b_{2,n_r}$ is a vector of all zeros with the $n_r$-th element being one, $b_{1,n_t}$ is a vector of all zeros with the $n_t$-th element being one, $b_{3,n_r,n_t,s}$ is a transformation vector of size $S \times 1$ with respect to the third dimension of the channel tensor $\mathcal{H}$, selected from a codebook matrix $\Omega_3$, $N'_r = N_r$, $N'_t = N_t$ and $S' \leq S$.

As an example, the selection of the transformation/compression vectors and transformed/compressed channel coefficients for a transformation/compression with respect to the second and third dimension, can be calculated by $$\min \|vec(\mathcal{H}) - vec(\mathcal{F}_{(2,3)}(\hat{\mathcal{H}}))\|_2^2.$$

The optimization problem may be solved by standard algorithms such as orthogonal matching pursuit. As a result, the indices of the vectors in the transformation matrices selected from the codebooks and the transformed channel coefficients associated with each domain are known.

The indices of the selected vectors $b_{1,n_r,n_t,s}$, $b_{2,n_r,n_t,s}$ and $b_{3,n_r,n_t,s}$ from the codebook matrices $\Omega_n$, n=1, 2, 3 are stored in a set $\mathbb{Q}$ of g-tuples, where g refers to the number of transformed dimensions.

For example, for g=1, the set $\mathbb{Q}$ is represented by $\mathbb{Q} = \{i_1, i_2, \ldots, i_T\}$, where T denotes the number of selected vectors with respect to the transformed/compressed dimension of the channel tensor $\mathcal{H}$. For example, in the case of a transformation/compression with respect to the frequency dimension, $T=S'$.

For example, for g=3, the set $\mathbb{Q}$ is represented by 3-tuples $(i_{1,n_r}, i_{2,n_t}, i_{3,s})$, where $i_{1,n_r}$ is the index associated with vectors $b_{1,n_r,n_t,s}$, $i_{2,n_t}$ is the index associated with vector $b_{2,n_r,n_t,s}$, and $i_{3,s}$ is the index associated with vector $b_{3,n_r,n_t,s}$. The set $\mathbb{Q}$ is given by $$\mathbb{Q} = \{(i_{1,0}, i_{2,0}, i_{3,0}), \ldots, (i_{1,N'_r-1}, i_{2,N'_t-1}, i_{3,S'-1})\}$$

In one method, the size of the set $\mathbb{Q}$ is configured via higher layer signaling from the gNB to the UE. In another method, the UE reports the preferred size of the set as a part of the CSI report or it is known at the UE.

The codebook matrices $\Omega_n$ are given by matrices $\Omega_n = [d_{n,0}, d_{n,1}, \ldots, d_{n,TO_n-1}]$, where the parameter $O_{f,n}$ denotes the oversampling factor with respect to the n-th dimension where $T=N_r$ for n=1, $T=N_t$ for n=2, and $T=S$ for n=3.

The oversampled factors $O_{f,n}$ of the codebook matrices are configured via higher layer or via DCI physical layer signaling from the gNB to the UE, or they are known at the UE.

After the channel transformation/compression, the UE rewrites the transformed/compressed channel tensor to a transformed/compressed channel matrix $\hat{H}$, and applies a standard PCA decomposition, represented by $$\hat{H} = U\Sigma V^H = \sum_{i=1}^{R} s_i u_i v_i^H,$$

where
U=$[u_1, u_2, \ldots, u_R]$ is the $N'_r N'_t \times R$ left-singular matrix;
V=$[v_1, v_2, \ldots, v_R]$ is the $S' \times R$ right-singular matrix;
$\Sigma$ is a $R \times R$ diagonal matrix with ordered singular values $s_i$ ($s_1 \geq s_2 \geq \ldots \geq s_R$) on its main diagonal, and $R=\min(S', N'_t N'_r)$.

The transformed/compressed channel matrix $\hat{H}_c$ is then constructed using r, $1 \leq r \leq R$ dominant principal components as $$\hat{H}_c = \overline{U}\overline{\Sigma}\overline{V}^H,$$

where $\overline{U}=[u_1, u_2, \ldots, u_r]$ and $\overline{\Sigma}=\text{diag}(s_1, s_2, \ldots, s_r)$, and $\overline{V}=[v_1, v_2, \ldots, v_r]$.

The UE quantizes $\overline{U}$, $\overline{V}$ and the singular values $s_1, s_2, \ldots, s_r$ using a codebook approach, and then reports them along with the index set $\mathbb{Q}$ to the gNB.

The gNB reconstructs first the transformed/compressed channel matrix $\hat{H}_c$ as $$\hat{H}_c = \overline{U}\overline{\Sigma}\overline{V}^H.$$

Then, based on the transformed/compressed channel matrix, the gNB constructs the transformed/compressed channel tensor $\hat{\mathcal{H}}_c$. Using the signaled index set $\mathbb{Q}$, the frequency-domain channel tensor $\mathcal{H}$ is reconstructed as $$vec(\mathcal{H}) \approx \mathcal{F}_{(1,2,3)}(\hat{\mathcal{H}}_c) \text{(three-dimensional transformation/compression)};$$

$$vec(\mathcal{H}) \approx \mathcal{F}_{(1,2)}(\hat{\mathcal{H}}_c) \text{(two-dimensional transformation/compression)};$$

$$vec(\mathcal{H}) \approx \mathcal{F}_{(3)}(\hat{\mathcal{H}}_c) \text{(one-dimensional transformation/compression)}.$$

In one method, the value of r representing the number of dominant principal components of the transformed/compressed channel matrix $\hat{H}_c$ is configured via higher layer signaling from the gNB to the UE. In another method, the UE reports the preferred values of $(r_1, r_2, r_3)$ as a part of the CSI report or they are known at the UE.

In accordance with a sub-embodiment 41 of the fourth embodiment 4, the 3D transformation/compression function $\mathcal{F}_{(1,2,3)}(\hat{\mathcal{H}})$ is given by a 2D-DCT transformation with respect of the space dimensions and a 1D-DFT transformation with respect to the frequency dimension of the channel tensor. The codebook matrices $\Omega_n$, n=1,2 are given by oversampled DCT matrices. The codebook matrix $\Omega_3$ is given by an oversampled DFT matrix.

In accordance with a sub-embodiment 42 of the fourth embodiment 4, the 3D transformation/compression function $\mathcal{F}_{(1,2,3)}(\hat{\mathcal{H}})$ is given by a 3D DFT transformation and the codebook matrices $\Omega_n$, n=1, 2, 3 are given by oversampled DFT matrices.

In accordance with a sub-embodiment 43 of the fourth embodiment 4, the 2D transformation/compression function $\mathcal{F}_{(1,2)}(\hat{\mathcal{H}})$ is given by a 2D Discrete Cosine transformation (DCT) and the codebook matrices $\Omega_n$, n=1,2 are given by oversampled DCT matrices.

In accordance with a sub-embodiment 44 of the fourth embodiment 4, the 1D transformation/compression function $\mathcal{F}_{(3)}(\tilde{\mathcal{H}})$ is given by a 1D DFT transformation and the codebook matrix $\Omega_3$ is given by an oversampled DFT matrix.

Extension to Doppler Frequency Domain: High Order PCA on Four-Dimensional Frequency-Domain Channel Tensor In accordance with a fifth embodiment 5, a UE is configured to report "explicit CSI Type V" that represents a compressed form of a channel tensor, or a beam-formed channel tensor, or a channel covariance tensor, or a beam-formed channel covariance tensor over the configured sub-bands (SB), PRBs or subcarriers according to the following sub-embodiments.

The compressed CSI is based on a high-order principal component analysis (HO-PCA) of the four-dimensional channel tensor to exploit the correlations of the channel tensor in the space-, frequency- and time/Doppler-frequency domains.

Figure 11:
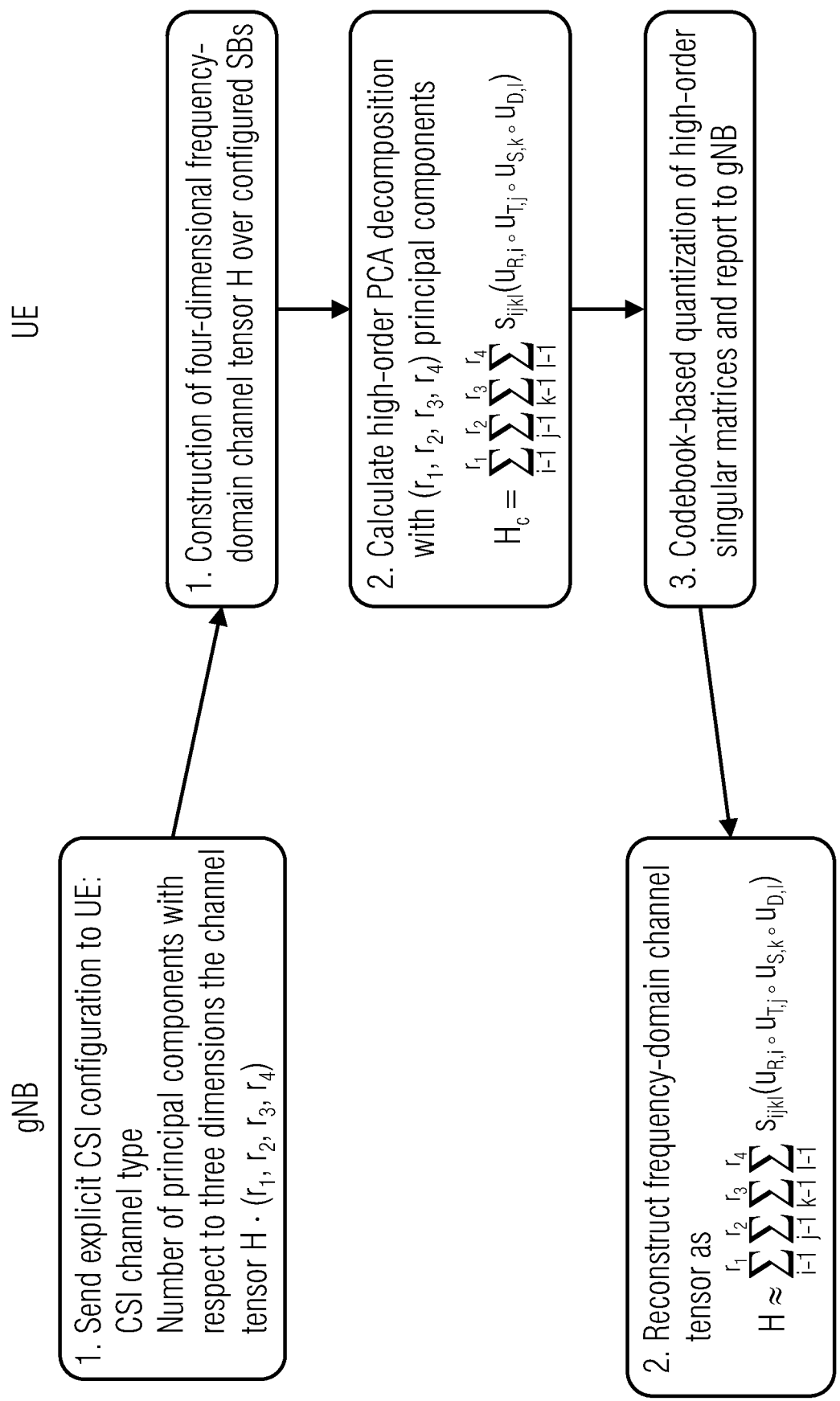
FIG. 11 is a flow diagram illustrating a HO-PCA decomposition/compression of a four-dimensional channel tensor, the reporting at the UE and the reconstruction of channel tensor at the gNB in accordance with an embodiment of the present invention.

An illustration of this approach is shown in FIG. 11. The UE estimates in a first step the un-quantized explicit CSI using measurements on downlink reference signals (such as CSI-RS) in the frequency domain, and then constructs a 4D frequency-domain channel $\mathcal{H} \in \mathbb{C}^{N_r \times N_t \times S \times D}$ of dimension $N_r \times N_t \times S \times D$, where S is the number of subbands, PRBs, or subcarriers and D is number of snapshots of the channel measured at D consecutive time instants/slots. The definition of $N_t$ and $N_r$ is dependent on the configuration of the CSI type:

$N_t$ is the number of transmit antenna ports $2N_1N_2$ for CSI type configuration "channel tensor", $N_t=2N_1N_2$, and $N_r$ is the number of UE receive antenna ports;

$N_t$ is the number of transmit antenna ports $2N_1N_2$ at the gNB, $N_t=2N_1N_2$, $N_r=2N_1N_2$ for CSI type configuration "channel covariance tensor";

$N_t$ is the number of beamformed antenna ports/beams $N_t=2U$ and $N_r$ is the number of UE receive antenna ports for CSI type configuration "beamformed-channel tensor";

$N_t$ is the number of beamformed antenna ports/beams $N_t=2U$ and $N_r$ is the number of beamformed antenna ports/beams $N_r=2U$ for CSI type configuration "beamformed-channel covariance tensor";

Then, the UE performs a HO-PCA on the four-dimensional channel tensor $\mathcal{H}$, such that $\mathcal{H}$ is represented by $$\mathcal{H} = \sum_{i=1}^{N_r}\sum_{j=1}^{N_t}\sum_{k=1}^{S}\sum_{l=1}^{D} s_{ijkl}(u_{R,i} \circ u_{T,j} \circ u_{S,k} \circ u_{D,l}),$$

where $U_R=[u_{R,1}, \ldots, u_{R,N_r}] \in \mathbb{C}^{N_r \times N_r}$ is matrix containing the higher order singular vectors with respect to the receive antennas (first dimension of the channel tensor $\mathcal{H}$);

$U_T=[u_{T,1}, \ldots, u_{T,N_t}] \in \mathbb{C}^{N_t \times N_t}$ is matrix containing the higher order singular vectors with respect to the transmit antennas (second dimension of the channel tensor $\mathcal{H}$);

$U_S=[u_{S,1}, \ldots, u_{S,S}] \in \mathbb{C}^{S \times S}$ is a matrix containing the higher order singular vectors with respect to the frequency dimension (third dimension of the channel tensor $\mathcal{H}$);

$U_D=[u_{D,1}, \ldots, u_{D,R}] \in \mathbb{C}^{D \times R}$ is a matrix containing the higher order singular vectors with respect to the time/channel snapshot dimension (fourth dimension of the channel tensor $\mathcal{H}$), where R is the rank of the channel tensor given by $R=\min\{N_r,N_t,S, D\}$;

$S_{ijkl}$ are the higher order singular values, sorted as $S_{ijkl} \geq S_{i'j'k'l'}$ with $i' \leq i$, $j' \leq j$, $k' \geq k$, $l' \leq l$.

To reduce the number of channel coefficients, the channel tensor $\mathcal{H}$ is approximated by $(r_1, r_2, r_3, r_4)$, $(1 \leq N_r, 1 \leq r_2 \leq N_t, 1 \leq r_3 \leq S, 1 \leq r_4 \leq D)$ dominant principal components with respect to the first, second, third and fourth dimensions and the corresponding 1-mode (left), 2-mode (right) and 3-mode (lateral) and 4-mode singular matrices. The compressed explicit frequency-domain channel tensor (explicit CSI) is given by $$\mathcal{H}_c = \sum_{i=1}^{r_1}\sum_{j=1}^{r_2}\sum_{k=1}^{r_3}\sum_{l=1}^{r_4} s_{ijkl}(u_{R,i} \circ u_{T,j} \circ u_{S,k} \circ u_{D,l}),$$

where $\bar{U}_R=[u_{R,1}, \ldots, u_{R,r_1}] \in \mathbb{C}^{N_r \times r_1}$, $\bar{U}_T=[u_{T,1}, \ldots, u_{T,r_2}] \in \mathbb{C}^{N_t \times r_2}$, $\bar{U}_S=[u_{S,1}, \ldots, u_{S,r_3}] \in \mathbb{C}^{S \times r_3}$, $\bar{U}_D=[u_{D,1}, \ldots, u_{D,r_4}] \in \mathbb{C}^{D \times r_4}$, To report the compressed frequency-domain channel tensor (explicit CSI) from the UE to the gNB, the UE quantizes the coefficients of the vectors $u_{R,i}$, $u_{T,j}$, $u_{S,k}$, $u_{D,l}$ and the singular values $S_{ijkl}$ using a codebook approach.

The gNB reconstructs the compressed channel tensor as $$\mathcal{H}_c = \sum_{i=1}^{r_1}\sum_{j=1}^{r_2}\sum_{k=1}^{r_3}\sum_{l=1}^{r_4} s_{ijkl}(u_{R,i} \circ u_{T,j} \circ u_{S,k} \circ u_{D,l}).$$

Figure 12:
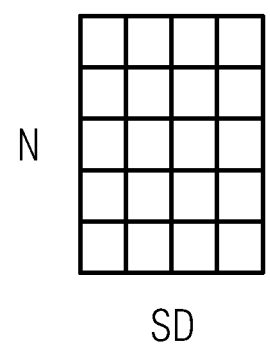
FIG. 12 illustrates a frequency domain channel matrix of size N×SD, where $N=N_t N_r$.

The number of complex coefficients that need to be quantized for the frequency-domain HO-PCA approach is given by $N_r r_1 + N_t r_2 + S r_3 + D r_4$ for the higher-order singular vectors, and the number of real coefficients that need to be quantized for the frequency-domain HO-PCA approach is given by $r_1 r_2 r_3 r_4$ for the higher-order singular values, respectively. In comparison, for the standard (non-high order) PCA (see FIG. 12), it is needed to quantize $N_r N_t r + SDr + r$ values for the singular vectors and the singular values with $r=\min(N_r N_t, SD)$. For small values of $(r_1, r_2, r_3, r_4)$ (low rank approximation of the channel tensor), the compression achieved by the HO-PCA is higher than the compression achieved by the standard non-HO PCA approach.

In one method, the values of $(r_1, r_2, r_3, r_4)$, representing the number of dominant principal components with respect to the first, second, third and fourth dimension of the channel tensor, respectively, are configured via higher layer signaling from the gNB to the UE. In another method, the UE reports the preferred values of $(r_1, r_2, r_3, r_4)$ as a part of the CSI report or they are known at the UE.

In accordance with a sub-embodiment 51 of the fifth embodiment 5, a UE is configured to report "explicit CSI Type V" with "delay-domain CSI for the higher-order singular-value matrix $\bar{U}_S$. In this configuration, the UE calculates an approximated reduced-sized (compressed) delay-domain higher-order singular-matrix $\tilde{U}_S$ from the frequency-domain higher-order singular-matrix $\bar{U}_S$. The delay-domain higher-order singular-matrix is given by $$\bar{U}_S \approx F_S \tilde{U}_S,$$

where $F_S \in \mathbb{C}^{S \times L}$ is an DFT matrix of size $S \times L$. The size of the compressed delay-domain matrix $\tilde{U}_S$ is given by $L \times r_3$. A compression is achieved when $L < S$.

The DFT vectors in $F_S$ are selected from an oversampled DFT-codebook matrix $\Omega$ of dimension $S \times SO_f$. Here, $O_f \in \{1, 2, 3, \ldots\}$ denotes the oversampling factor of the DFT-codebook matrix. The indices of the selected vectors in $F_S$ from the codebook $\Omega$ are stored in a set $\mathbb{Q} = (i_1, i_2, \ldots, i_L)$.

The UE quantizes the coefficients of the vectors in $\overline{U}_R = [u_{R,1}, \ldots, u_{R,r_1}]$, $\overline{U}_T = [u_{T,1}, \ldots, u_{T,r_2}]$, $\tilde{U}_S = [\tilde{u}_{S,1} \cdots \tilde{u}_{S,r_3}] \in \mathbb{C}^{L \times r_3}$ and $\overline{U}_D = [u_{D,1} \ldots, u_{D,r_4}]$ and the HO singular values $S_{ijkl}$ using a codebook approach, and reports them along with the L delays, represented by a set of indices $\mathbb{Q}$ that correspond to the selected DFT vectors in the codebook $\Omega$, to the gNB.

The gNB reconstructs the frequency-domain channel tensor $\mathcal{H}_c$ according to this embodiment where $\overline{U}_S$ is calculated as $\overline{U}_S = [u_{S,1}, \ldots, u_{S,r_3}] F_S \tilde{U}_S$.

Figure 13:
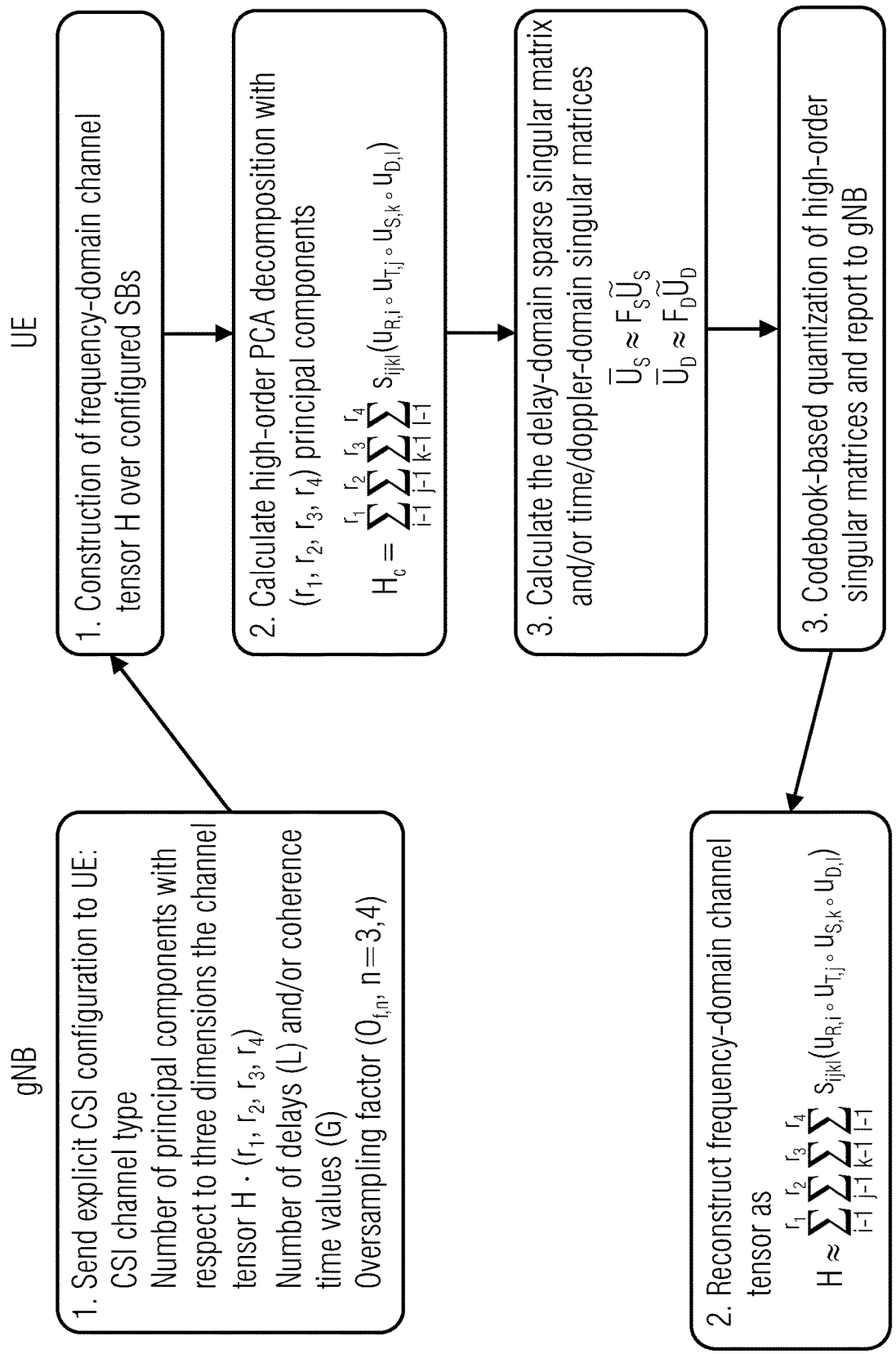
FIG. 13 is a flow diagram illustrating a HO-PCA decomposition/compression of a four-dimensional channel tensor in combination with a delay- or time/doppler domain compression, the reporting at the UE and the reconstruction the of channel tensor at the gNB in accordance with an embodiment of the present invention.

An illustration of this approach is shown in FIG. 13.

In one method, the number of delays L is configured via higher layer signaling from the gNB to the UE. In another method, the UE reports the preferred value of L as a part of the CSI report or it is known at the UE The oversampled factor $O_f$ of the DFT codebook matrix is configured via higher layer or via DCI physical layer signaling from the gNB to the UE or it is known at the UE.

In accordance with a sub-embodiment 52 of the fifth embodiment 5, a UE is configured to report "explicit CSI Type V" with "Doppler-frequency domain CSI for the higher-order singular-value matrix $\overline{U}_D$. In this configuration, the UE calculates an approximated reduced-sized (compressed) Doppler-frequency domain higher-order singular-matrix $\tilde{U}_D$ from the time domain higher-order singular-matrix $\overline{U}_D$.

The Doppler-frequency domain higher-order singular-matrix is given by $$\overline{U}_D \approx F_D \tilde{U}_D,$$

where $F_D \in \mathbb{C}^{D \times G}$ is an DFT matrix of size $D \times G$. The size of the compressed doppler-domain matrix $\tilde{U}_D$ is given by $G \times r_4$. A compression is achieved when $G < D$.

The DFT vectors in $F_D$ are selected from an oversampled DFT-codebook matrix of dimension $D \times DO_t$, where $O_t \in \{1, 2, 3, \ldots\}$ denotes the oversampling factor of the DFT-codebook matrix. The indices of the selected vectors in $F_D$ from the codebook $\Omega$ are stored in a set $\mathbb{Q} = (i_1, i_2, \ldots, i_G)$.

The UE quantizes the coefficients of the vectors in $\overline{U}_R = [u_{R,1}, \ldots, u_{R,r_1}]$, $\overline{U}_T = [u_{T,1}, \ldots, u_{T,r_2}]$, $\overline{U}_S = [u_{S,1}, \ldots, u_{S,r_3}]$ and $\tilde{U}_D = [u_{D,1}, \ldots, u_{D,r_4}] \in \mathbb{C}^{G \times r_4}$ and the HO singular values $S_{ijkl}$ using a codebook approach, and reports them along with the G Doppler-frequency values, represented by a set of indices $\mathbb{Q}$ that correspond to the selected DFT vectors in the codebook $\Omega$, to the gNB.

The gNB reconstructs the frequency-domain channel tensor $\mathcal{H}_c$ according to this embodiment, where $\overline{U}_D$ is calculated as $\overline{U}_D = [u_{D,1}, \ldots, u_{D,r_4}] = F_D \tilde{U}_D$.

An illustration of this approach is shown in FIG. 13.

In one method, the number of Doppler-frequency values G is configured via higher layer signaling from the gNB to the UE. In another method, the UE reports the preferred value of G as a part of the CSI report or it is known at the UE.

The oversampled factor $O_t$ of the DFT codebook matrix is configured via higher layer or via physical layer signaling (via DCI) from the gNB to the UE or it is known at the UE.

Extension to Doppler Frequency Domain: Compression of Four-Dimensional Channel Tensor in Combination with HO-PCA In accordance with a sixth embodiment 6, a UE is configured to report "explicit CSI Type VI" that represents a transformed and compressed form of a channel tensor, or a beam-formed channel tensor, or a channel covariance tensor, or a beam-formed covariance tensor over the configured subbands (SB), PRBs or subcarriers with respect to the space, frequency, time or frequency and space, or frequency and time, or space and time of the channel tensor. The CSI combines channel tensor transformation with data compression by exploiting the correlations of the channel coefficients in the spatial, frequency, delay and time/channel snapshot domain.

Figure 14:
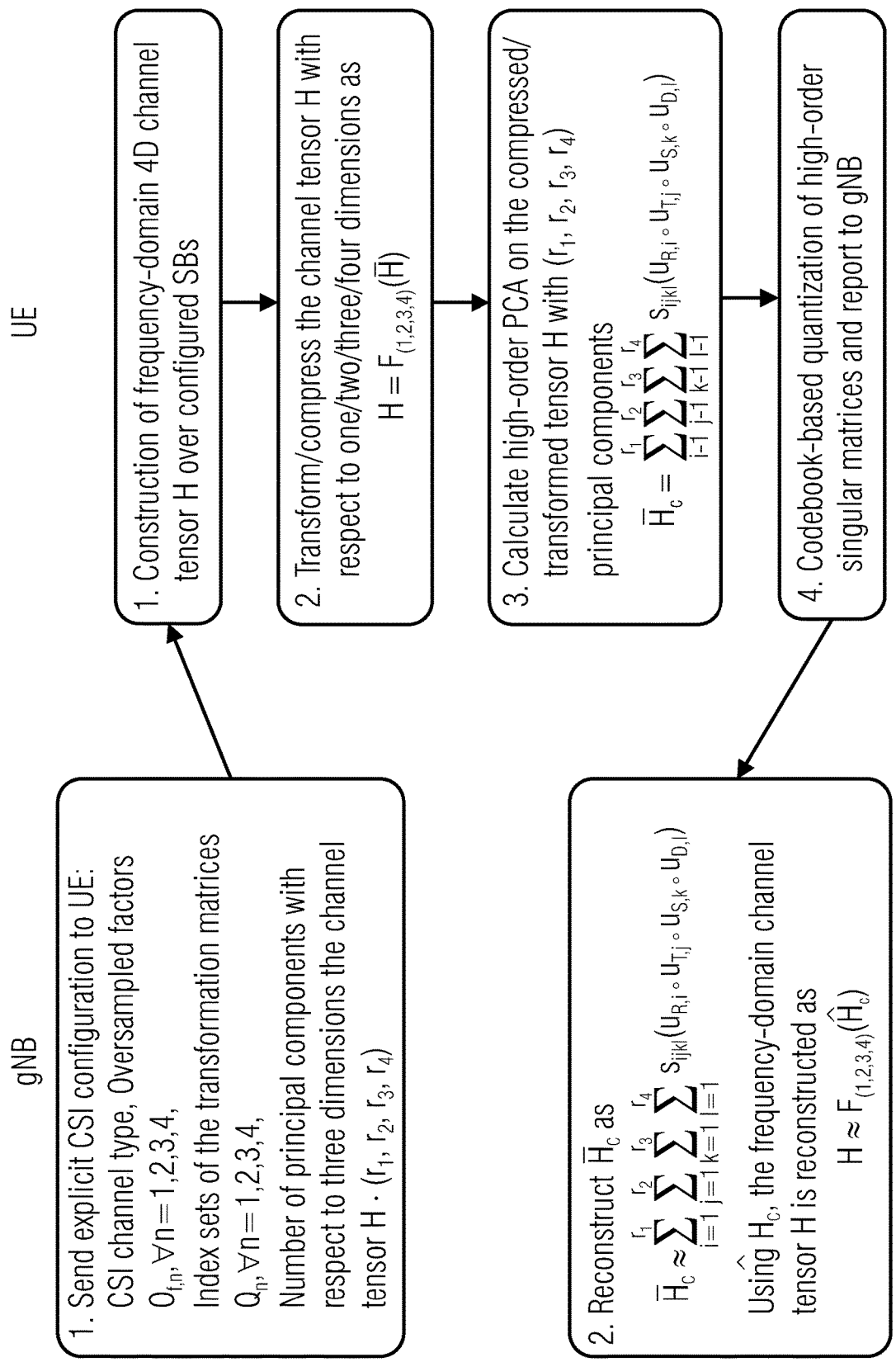
FIG. 14 is a flow diagram illustrating a transformation/compression of a four-dimensional channel tensor in addition to a HO-PCA decomposition, the reporting at the UE and the reconstruction of the channel tensor at the gNB in accordance with an embodiment of the present invention.

An illustration of this approach is shown in FIG. 14. The UE estimates in a first step the un-quantized explicit CSI using measurements on downlink reference signals (such as CSI-RS) in the frequency domain, and then constructs a 4D frequency-domain channel tensor $\mathcal{H} \in \mathbb{C}^{N_r \times N_t \times S \times D}$ of dimension $N_r \times N_t \times S \times D$, where S is the number of subbands, PRBs or subcarriers and D is number of snapshots of the channel measured at D consecutive time instants. The definition of $N_t$ and $N_r$ is dependent on the configuration of the CSI type:

$N_t$ is the number of transmit antenna ports $2N_1N_2$ for CSI type configuration "channel tensor", $N_t = 2N_1N_2$, and $N_r$ is the number of UE receive antenna ports; $N_t$ is the number of transmit antenna ports $2N_1N_2$ at the gNB, $N_t = 2N_1N_2$, $N_r = 2N_1N_2$ for CSI type configuration "channel covariance tensor";

$N_t$ is the number of beamformed antenna ports/beams $N_t = 2U$ and $N_r$ is the number of UE receive antenna ports for CSI type configuration "beamformed-channel tensor";

$N_t$ is the number of beamformed antenna ports/beams $N_t = 2U$ and $N_r$ is the number of beamformed antenna ports/beams $N_r = 2U$ for CSI type configuration "beamformed-channel covariance tensor";

After the construction of the frequency-domain channel tensor $\mathcal{H}$, a one-dimensional (1D), two-dimensional (2D) or three-dimensional (3D) or four-dimensional (4D) transformation of the channel tensor is applied with respect to the space, frequency, or time dimensions of the channel tensor. The aim of the transformation is to obtain a sparse or nearly-sparse representation of the channel tensor in one, two, three or four dimensions. After the transformation and compression step, the size of the channel tensor is reduced and a compression with respect to one, two or three dimensions or four dimensions of the channel tensor is achieved.

For example, a transformation/compression with respect to all four dimensions of the channel tensor $\mathcal{H}$ is represented by a (column-wise) Kronecker product as $$\mathcal{H} = \mathcal{F}_{(1,2,3,4)}(\hat{\mathcal{H}}),$$

$$vec(\mathcal{H}) = vec(\mathcal{F}_{(1,2,3,4)}(\hat{\mathcal{H}})) =$$

$$\sum_{n_r=0}^{N'_r-1} \sum_{n_t=0}^{N'_t-1} \sum_{s=0}^{S'-1} \sum_{d=0}^{D'-1} \gamma_{n_r,n_t,s,d} b_{4,n_r,n_t,s,d} \otimes b_{3,n_r,n_t,s,d} \otimes b_{2,n_r,n_t,s,d} \otimes b_{1,n_r,n_t,s,d},$$

where $b_{1,n_r,n_t,s,d}$ is a transformation vector of size $N_r \times 1$ with respect to the first dimension of the channel tensor $\mathcal{H}$, selected from a codebook matrix $\Omega_1$;

$b_{2,n_r,n_t,s,d}$ is a transformation vector of size $N_r \times 1$ with respect to the second dimension of the channel tensor $\mathcal{H}$, selected from a codebook matrix $\Omega_2$;

$b_{3,n_r,n_t,s,d}$ transformation is a vector of size $S \times 1$ with respect to the third dimension of the channel tensor $\mathcal{H}$, selected from a codebook matrix $\Omega_3$;

$b_{4,n_r,n_t,s,d}$ is a transformation vector of size $D \times 1$ with respect to the fourth dimension of the channel tensor $\mathcal{H}$, selected from a codebook matrix $\Omega_4$;

$\gamma_{n_r,n_t,s,d}$ is the transformed/compressed channel coefficient associated with the vectors $b_{1,n_r,n_t,s,d}$, $b_{2,n_r,n_t,s,d}$, $b_{3,n_r,n_t,s,d}$, and $b_{4,n_r,n_t,s,d}$ and $N'_r$, $N'_t$, $S'$ and $D'$ represents the value of the first, second, third and fourth dimension of the transformed/compressed channel tensor $\widehat{\mathcal{H}}$, respectively.

The transformed/compressed channel coefficients $\gamma_{n_r,n_t,s,d}$ are used to form the transformed/compressed channel tensor $\widehat{\mathcal{H}}$ of dimension $N'_r \times N'_t \times S' \times D'$, where $N'_r \leq N_r$, $N'_t \leq N_t$, $S' \leq S$, $D' \leq D$.

For example, a transformation/compression with respect to the two space dimensions of the channel tensor $\mathcal{H}$ is represented by $$\mathcal{H} = \mathcal{F}_{(1,2)}(\widehat{\mathcal{H}}),$$

$$vec(\mathcal{H}) = vec(\mathcal{F}_{(1,2)}(\widehat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,d} \otimes b_{3,s} \otimes b_{2,n_r,n_t,s,d} \otimes b_{1,n_r,n_t,s,d},$$

where $b_{4,d}$ is a vector of all zeros with the d-th element being one, $b_{3,s}$ is a vector of all zeros with the s-th element being one, $b_{2,n_r,n_t,s,d}$ is a vector of size $N_r \times 1$ with respect to the second dimension of the channel tensor $\mathcal{H}$, selected from a codebook matrix $\Omega_2$, $b_{1,n_r,n_t,s,d}$ is a transformation vector of size $N_t \times 1$ with respect to the first dimension of the channel tensor $\mathcal{H}$, selected from a codebook matrix $\Omega_1$ and $N'_r \leq N_r$, $N'_t$, $S'=S$ and $D'=D$.

For example, a transformation/compression with respect to the frequency and time dimension of the channel tensor $\mathcal{H}$ is represented by $$\mathcal{H} = \mathcal{F}_{(3,2)}(\widehat{\mathcal{H}}),$$

$$vec(\mathcal{H}) = vec(\mathcal{F}_{(3,4)}(\widehat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,n_r,n_t,s,d} \otimes b_{3,n_r,n_t,s,d} \otimes b_{2,n_r} \otimes b_{1,n_t},$$

Where $b_{4,n_r,n_t,s,d}$ is a transformation vector of size $D \times 1$ with respect to the fourth dimension of the channel tensor $\mathcal{H}$, selected from a codebook matrix $\Omega_4$, $b_{3,n_r,n_t,s,d}$ is a transformation vector of size $S \times 1$ with respect to the third dimension of the channel tensor $\mathcal{H}$, selected from a codebook matrix $\Omega_3$, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S' \leq S$ and $D' \leq D$.

For example, a transformation/compression with respect to the frequency dimension of the channel tensor $\mathcal{H}$ is represented by $$\mathcal{H} = \mathcal{F}_{(3)}(\widehat{\mathcal{H}}),$$

$$vec(\mathcal{H}) = vec(\mathcal{F}_{(3)}(\widehat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,d} \otimes b_{3,n_r,n_t,s,d} \otimes b_{2,n_r} \otimes b_{1,n_t},$$

where $b_{4,d}$ is a vector of all zeros with the d-th element being one, $b_{3,n_r,n_t,s,d}$ is a transformation vector of size $S \times 1$ with respect to the third dimension of the channel tensor $\mathcal{H}$, selected from a codebook matrix $\Omega_3$, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S' \leq S$ and $D'=D$.

For example, a transformation/compression with respect to the time dimension of the channel tensor $\mathcal{H}$ is represented by $$\mathcal{H} = \mathcal{F}_{(4)}(\widehat{\mathcal{H}}),$$

$$vec(\mathcal{H}) = vec(\mathcal{F}_{(4)}(\widehat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,n_r,n_t,s,d} \otimes b_{3,s} \otimes b_{2,n_r} \otimes b_{1,n_t},$$

where $b_{4,n_r,n_t,s,d}$ is a transformation vector of size $D \times 1$ with respect to the fourth dimension of the channel tensor $\mathcal{H}$, selected from a codebook matrix $\Omega_4$, $b_{3,s}$ is a vector of all zeros with the s-th element being one, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S'=S$ and $D' \leq D$.

As an example, the selection of the transformation/compression vectors and transformed/compressed channel coefficients for a transformation/compression with respect to the second and third dimension, can be calculated by $$\min \|vec(\mathcal{H}) - vec(\mathcal{F}_{(2,3)}(\widehat{\mathcal{H}}))\|_2^2.$$

The optimization problem may be solved by standard algorithms such as orthogonal matching pursuit. As a result, the indices of the vectors in the transformation matrices selected from the codebooks and the transformed channel coefficients associated with each domain are known.

The indices of the selected vectors $b_{1,n_r,n_t,s,d}$, $b_{2,n_r,n_t,s,d}$, $b_{3,n_r,n_t,s,d}$ and $b_{4,n_r,n_t,s,d}$ from the codebook matrices $\Omega_n$, $n=1, 2, 3, 4$ are stored in a set $\mathbb{Q}$ of g-tuples, where g refers to the number of transformed dimensions.

For example, for g=1, the set $\mathbb{Q}$ is represented by $\mathbb{Q} = \{i_1, i_2, \ldots, i_T\}$, where T denotes the number of selected vectors with respect to the transformed/compressed dimension of the channel tensor $\mathcal{H}$. For example, in the case of a transformation/compression with respect to the frequency dimension, T=S'.

For example, for g=4, the set $\mathbb{Q}$ is represented by 4-tuples $(i_{1,n_t}, i_{2,n_r}, i_{3,s}, i_{4,d})$, where $i_{1,n_t}$ is the index associated with vectors $b_{1,n_r,n_t,s,d}$, $i_{2,n_r}$ is the index associated with vector $b_{2,n_r,n_t,s,d}$, $i_{3,s}$ is the index associated with vector $b_{3,n_r,n_t,s,d}$ and $i_{4,d}$ is the index associated with vector $b_{4,n_r,n_t,s,d}$. The set $\mathbb{Q}$ is given by $$\mathbb{Q} = \{(i_{1,0}, i_{2,0}, i_{3,0}, i_{4,0}), \ldots, (i_{1,N'}, i_{2,N'}, i_{3,S'}, i_{4,D'})\}$$

In one method, the size of the set $\mathbb{Q}$ is configured via higher layer signaling from the gNB to the UE. In another method, the UE reports the preferred size of the set as a part of the CSI report or it is known at the UE.

The codebook matrices $\Omega_n$ are given by matrices $\Omega_n = [d_{n,0}, d_{n,1}, \ldots, d_{n,TO_n-1}]$, where the parameter $O_{f,n}$ denotes the oversampling factor with respect to the n-th dimension where T=$N_r$ for n=1, T=$N_t$ for n=2, T=S for n=3 and T=D' for n=4.

The oversampled factors $O_{f,n}$ of the codebook matrices are configured via higher layer (e.g., RRC, or MAC) or via DCI physical layer signaling from the gNB to the UE, or they are known at the UE or it is known at the UE.

After the channel transformation/compression, the UE performs a HO-PCA on the transformed/compressed channel tensor $\hat{\mathcal{H}}$, such that $\hat{\mathcal{H}}$ is represented by $$\hat{\mathcal{H}} = \sum_{i=1}^{N'_r} \sum_{j=1}^{N'_t} \sum_{k=1}^{S'} \sum_{l=1}^{D'} s_{ijkl} (u_{R,i} \circ u_{T,j} \circ u_{S,k} \circ u_{D,l}),$$

where $U_R = [u_{R,1}, \ldots, u_{R,N'_r}] \in \mathbb{C}^{N'_r \times N'_r}$ is a matrix containing the high-order singular vectors with respect to the first dimension of the transformed/compressed channel tensor $\hat{\mathcal{H}}$;

$U_T = [u_{T,1}, \ldots, u_{T,N'_t}] \in \mathbb{C}^{N'_t \times N'_t}$ is matrix containing the high-order singular vectors with respect to the second dimension of the transformed/compressed channel tensor $\hat{\mathcal{H}}$;

$U_S = [u_{S,1}, \ldots, u_{S,S'}] \in \mathbb{C}^{S' \times S'}$ is a matrix containing the high-order singular vectors with respect to the third dimension of the channel tensor $\mathcal{H}$.

$U_D = [u_{D,1}, \ldots, u_{D,R}] \in \mathbb{C}^{D' \times R}$ is a matrix containing the higher order singular vectors with respect to the time/channel snapshot dimension (fourth dimension of the channel tensor $\mathcal{H}$), where R is the rank of the channel tensor given by R=min{N',N',S', D'};

$S_{ijkl}$ are the higher order singular values, sorted as $S_{ijkl} \geq S_{i'j'k'l'}$ with i'≤i, j'≤j, k'≤k, l'≤l.

To reduce the number of channel coefficients, the channel tensor $\hat{\mathcal{H}}$ is approximated by $(r_1, r_2, r_3, r_4)$, $(1 \leq r_1 \leq N'_r, 1 \leq r_2 \leq N'_t, 1 \leq r_3 S', 1 \leq r_4 \leq D')$ dominant principal components with respect to the first, second, third and fourth dimensions and the corresponding 1-mode (left), 2-mode (right) and 3-mode (lateral) and 4-mode singular matrices. The compressed explicit frequency-domain channel tensor (explicit CSI) is given by $$\hat{\mathcal{H}}_c = \sum_{i=1}^{r_1} \sum_{j=1}^{r_2} \sum_{k=1}^{r_3} \sum_{l=1}^{r_4} S_{ijkl} (u_{R,i} \circ u_{T,j} \circ u_{S,k} \circ u_{D,l}),$$

where $\overline{U}_R = [u_{R,1}, \ldots, u_{R,r_1}] \in \mathbb{C}^{N'_r \times r_1}$, $\overline{U}_T = [u_{T,1}, \ldots, u_{T,r_2}] \in \mathbb{C}^{N'_t \times r_2}$, $\overline{U}_S = [u_{S,1}, \ldots, u_{S,r_3}] \in \mathbb{C}^{S' \times r_3}$.

$\overline{U}_D = [u_{D,1}, \ldots, u_{D,r_4}] \in \mathbb{C}^{D' \times r_4}$

The UE quantizes the coefficients of the vectors $u_{R,i}$, $u_{T,j}$, $u_{S,k}$, $u_{D,l}$ and the singular values $S_{ijkl}$ using a codebook approach. The quantized vectors $u_{R,i}$, $u_{T,j}$, $u_{S,k}$, $u_{D,l}$ and the quantized singular values $S_{ijkl}$ along with the index set $\mathbb{Q}$ are reported to the gNB.

The gNB reconstructs first the transformed/compressed channel tensor $\hat{\mathcal{H}}_c$ as $$\hat{\mathcal{H}}_c = \sum_{i=1}^{r_1} \sum_{j=1}^{r_2} \sum_{k=1}^{r_3} \sum_{l=1}^{r_4} s_{ijkl} (u_{R,i} \circ u_{T,j} \circ u_{S,k} \circ u_{D,l}).$$

Then, based on the transformed/compressed channel tensor $\hat{\mathcal{H}}_c$ and the signaled index set $\mathbb{Q}$, the frequency-domain channel tensor $\mathcal{H}$ is reconstructed as $\text{vec}(\mathcal{H}) \approx \mathcal{F}_{(1, 2, 3, 4)}(\hat{\mathcal{H}}_c)$(four-dimensional transformation/compression);

$\text{vec}(\mathcal{H}) \approx \mathcal{F}_{(1,2)}(\hat{\mathcal{H}}_c)$(two-dimensional transformation/compression);

$\text{vec}(\mathcal{H}) \approx \mathcal{F}_{(3,4)}(\hat{\mathcal{H}}_c)$(two-dimensional transformation/compression);

$\text{vec}(\mathcal{H}) \approx \mathcal{F}_{(3)}(\hat{\mathcal{H}}_c)$(one-dimensional transformation/compression).

$\text{vec}(\mathcal{H}) \approx \mathcal{F}_{(4)}(\mathcal{F})$(one-dimensional transformation/compression).

The number of complex coefficients that need to be quantized for the frequency-domain HO-PCA approach is given by $N'_r r_1 + N'_t r_2 + S' r_3 + D' r_4 + r_1 r_2 r_3 r_4$, for the higher-order singular vectors and the higher-order singular values.

In one method, the values of $(r_1, r_2, r_3, r_4)$, representing the number of dominant principal components with respect to the first, second, third and fourth dimension of the transformed/compressed channel tensor $\hat{\mathcal{H}}_c$, respectively, are configured via higher layer (e.g., RRC, or MAC-CE) signaling from the gNB to the UE. In another method, the UE reports the preferred values of $(r_1, r_2, r_3, r_4)$ as a part of the CSI report or they are known at the UE.

In accordance with a sub-embodiment 61 of the sixth embodiment 6, the 4D transformation/compression function $\mathcal{F}_{(1, 2, 3, 4)}(\hat{\mathcal{H}})$ is given by a two dimensional (2D-DCT) with respect to the space dimensions and a 2D-DFT transformation with respect to the frequency and time dimensions of the channel tensor. The codebook matrices $\Omega_n$, n=1,2 are given by oversampled DCT matrices and the codebook matrix $\Omega_3$ and $\Omega_4$ are given by an oversampled DFT matrices.

In accordance with a sub-embodiment 62 of the sixth embodiment 6, the 4D transformation/compression function $\mathcal{F}_{(1, 2, 3, 4)}(\hat{\mathcal{H}})$ is given by a 4D-DFT transformation and the codebook matrices $\Omega_n$, n=1, 2, 3, 4 are given by oversampled DFT matrices.

In accordance with a sub-embodiment 63 of the sixth embodiment 6, the 2D transformation/compression function $\mathcal{F}_{(1,2)}(\hat{\mathcal{H}})$ is given by a 2D-Discrete Cosine transformation (DCT) and the codebook matrices $\Omega_n$, n=1,2 are given by oversampled DCT matrices.

In accordance with a sub-embodiment 64 of the sixth embodiment 6, the 2D transformation/compression function $\mathcal{F}_{(3,4)}(\hat{\mathcal{H}})$ is given by a 2D-Discrete Fourier transformation (DFT) and the codebook matrices $\Omega_n$, n=3,4 are given by oversampled DFT matrices.

In accordance with a sub-embodiment 65 of the sixth embodiment 6, the 1D transformation/compression function $\mathcal{F}_{(3)}(\hat{\mathcal{H}})$ is given by a 1D-DFT transformation and the codebook matrix $\Omega_3$ is given by an oversampled DFT matrix.

In accordance with a sub-embodiment 66 of the sixth embodiment 6, the 1D transformation/compression function $\mathcal{F}_{(4)}(\hat{\mathcal{H}})$ is given by a 1D-DFT transformation and the codebook matrix $\Omega_4$ is given by an oversampled DFT matrix.

Extension to Doppler Frequency Domain: Compression of Four-Dimensional Channel Tensor in Combination with Non-HO-PCA (Standard PCA)

In accordance with a seventh embodiment 7, a UE is configured to report "explicit CSI Type VII" that represents a transformed and compressed form of a channel tensor, or a beam-formed channel tensor, or a channel covariance tensor, or a beam-formed covariance tensor over the configured subbands (SB), PRBs or subcarriers with respect to the space, frequency, time or frequency and space, or frequency and time, or space and time of the channel tensor. The CSI combines channel tensor transformation with data compression by exploiting the sparse representation in the delay domain and time domain and the correlations of the channel coefficients in the spatial and frequency/delay/time domains.

Figure 15:
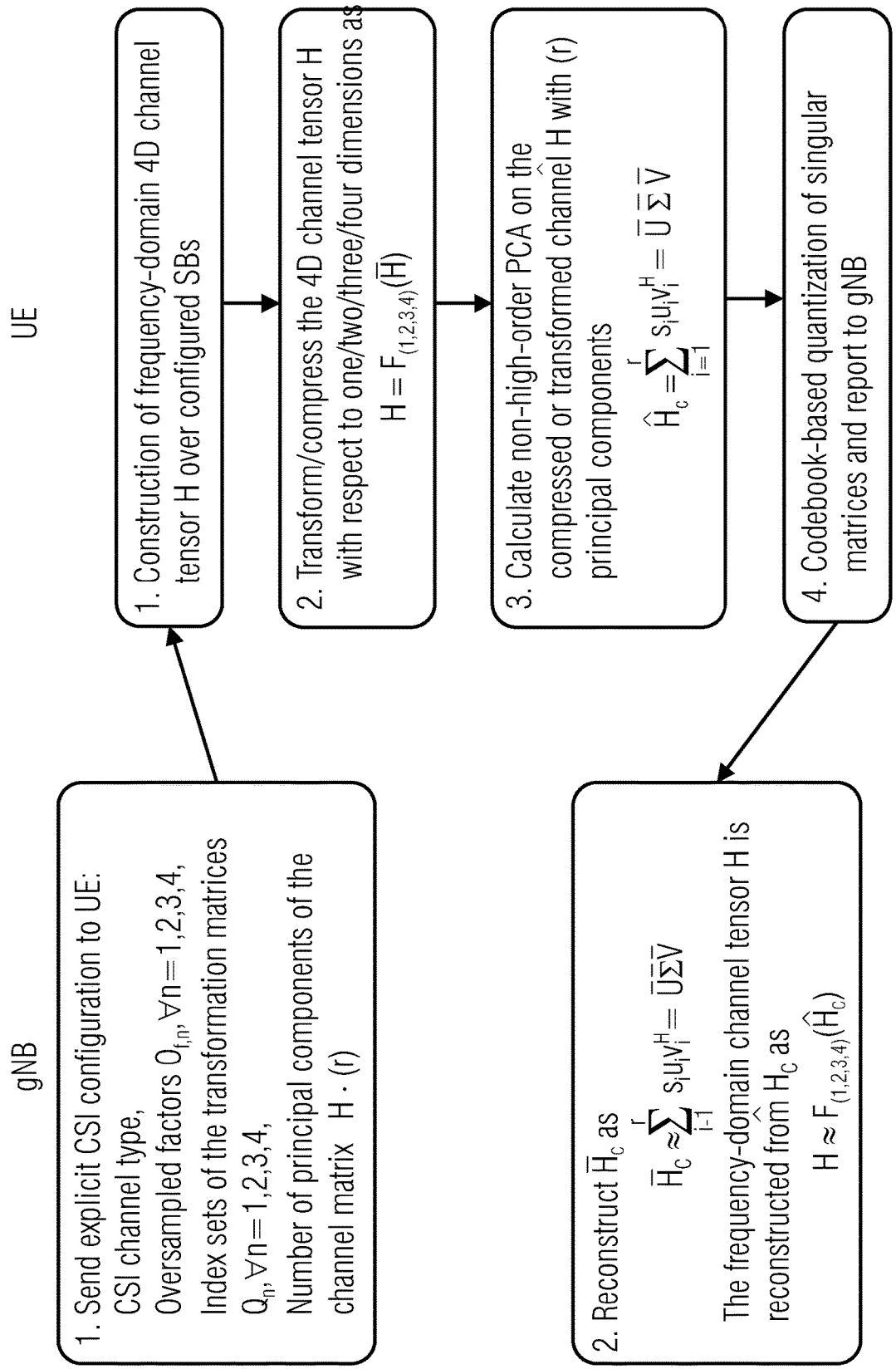
FIG. 15 is a flow diagram illustrating a transformation/compression of a four-dimensional channel tensor in addition to non-HO-PCA decomposition, the reporting at the UE and the reconstruction of the channel matrix at the gNB in accordance with an embodiment of the present invention.

An illustration of this approach is shown in FIG. 15. The UE estimates in a first step the un-quantized explicit CSI using measurements on downlink reference signals (such as CSI-RS) in the frequency domain, and then constructs a 4D frequency-domain channel $\mathcal{H} \in \mathbb{C}^{N_r \times N_t \times S \times D}$ of dimension $N_r \times N_t \times S \times D$, where S is the number of subbands, PRBs or subcarriers and D is number of CSI-RS channel measurements over D consecutive time instants/slots. The definition of $N_t$ and $N_r$ is dependent on the configuration of the CSI type:

- $N_t$ is the number of transmit antenna ports $2N_1N_2$ for CSI type configuration "channel tensor", $N_t=2N_1N_2$, and $N_r$ is the number of UE receive antenna ports; $N_t$ is the number of transmit antenna ports $2N_1N_2$ at the gNB, $N_t=2N_1N_2$, $N_r=2N_1N_2$, for CSI type configuration "channel covariance tensor";
- $N_t$ is the number of beamformed antenna ports/beams $N_t=2U$ and $N_r$ is the number of UE receive antenna ports for CSI type configuration "beamformed-channel tensor";
- $N_t$ is the number of beamformed antenna ports/beams $N_t=2U$ and $N_r$ is the number of beamformed antenna ports/beams $N_r=2U$ for CSI type configuration "beam-formed-channel covariance tensor";

After the construction of the frequency-domain channel tensor $\mathcal{H}$, a one-dimensional (1D), two-dimensional (2D) or three-dimensional (3D) or four-dimensional (4D) transformation of the channel tensor is applied with respect to the space, frequency, and/or time dimensions of the channel tensor. After the transformation and compression step, the size of the channel tensor is reduced and a compression with respect to one, two or three dimensions or four dimensions of the channel tensor is achieved.

For example, a transformation/compression with respect to all four dimensions of the channel tensor $\mathcal{H}$ is represented by a (column-wise) Kronecker product as $$\mathcal{H} = \mathcal{F}_{(1,2,3,4)}(\hat{\mathcal{H}}),$$

$$vec(\mathcal{H}) = vec(\mathcal{F}_{(1,2,3,4)}(\hat{\mathcal{H}})) =$$

$$\sum_{n_r=0}^{N'_r-1} \sum_{n_t=0}^{N'_t-1} \sum_{s=0}^{S'-1} \sum_{d=0}^{D'-1} \gamma_{n_r,n_t,s,d} b_{4,n_r,n_t,s,d} \otimes b_{3,n_r,n_t,s,d} \otimes b_{2,n_r,n_t,s,d} \otimes b_{1,n_r,n_t,s,d},$$

where

- $b_{1,n_r,n_t,s,d}$ is a transformation vector of size $N_r \times 1$ with respect to the first dimension of the channel tensor $\mathcal{H}$, selected from a codebook matrix $\Omega_1$;
- $b_{2,n_r,n_t,s,d}$ is a transformation vector of size $N_t \times 1$ with respect to the second dimension of the channel tensor $\mathcal{H}$, selected from a codebook matrix $\Omega_2$;
- $b_{3,n_r,n_t,s,d}$ is a transformation vector of size $S \times 1$ with respect to the third dimension of the channel tensor $\mathcal{H}$, selected from a codebook matrix $\Omega_3$;
- $b_{4,n_r,n_t,s,d}$ is a transformation vector of size $D \times 1$ with respect to the fourth dimension of the channel tensor $\mathcal{H}$, selected from a codebook matrix $\Omega_4$;
- $\gamma_{n_r,n_t,s,d}$ is the transformed/compressed channel coefficient associated with the vectors $b_{1,n_r,n_t,s,d}$, $b_{2,n_r,n_t,s,d}$, $b_{3,n_r,n_t,s,d}$, and $b_{4,n_r,n_t,s,d}$ and
- $N'_r$, $N'_t$, $S'$ and $D'$ represents the value of the first, second, third and fourth dimension of the transformed/compressed channel tensor $\hat{\mathcal{H}}$, respectively.

The transformed/compressed channel coefficients $\gamma_{n_r,n_t,s,d}$ are used to form the transformed/compressed channel tensor $\hat{\mathcal{H}}$ of dimension $N'_r \times N'_t \times S' \times D'$, where $N'_r \leq N_r$, $N'_t \leq N_t$, $S' \leq S$, $D' \leq D$.

For example, a transformation/compression with respect to the two space dimensions of the channel tensor $\mathcal{H}$ is represented by $$\mathcal{H} = \mathcal{F}_{(1,2)}(\hat{\mathcal{H}}),$$

$$vec(\mathcal{H}) = vec(\mathcal{F}_{(1,2)}(\hat{\mathcal{H}})) =$$

$$\sum_{n_r=0}^{N'_r-1} \sum_{n_t=0}^{N'_t-1} \sum_{s=0}^{S'-1} \sum_{d=0}^{D'-1} \gamma_{n_r,n_t,s,d} b_{4,d} \otimes b_{3,s} \otimes b_{2,n_r,n_t,s,d} \otimes b_{1,n_r,n_t,s,d},$$

where $b_{4,d}$ is a vector of all zeros with the d-th element being one, $b_{3,s}$ is a vector of all zeros with the s-th element being one, $b_{2,n_r,n_t,s,d}$ is a vector of size $N_t \times 1$ with respect to the second dimension of the channel tensor $\mathcal{H}$, selected from a codebook matrix $\Omega_2$, $b_{1,n_r,n_t,s,d}$ is a transformation vector of size $N_r \times 1$ with respect to the first dimension of the channel tensor $\mathcal{H}$, selected from a codebook matrix $\Omega_1$ and $N'_r \leq N_r$, $N'_t \leq N_t$, $S'=S$ and $D'=D$ For example, a transformation/compression with respect to the frequency and time dimension of the channel tensor $\mathcal{H}$ is represented by $$\mathcal{H} = \mathcal{F}_{(3,4)}(\hat{\mathcal{H}}),$$

$$vec(\mathcal{H}) = vec(\mathcal{F}_{(3,4)}(\hat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,n_r,n_t,s,d} \otimes b_{3,n_r,n_t,s,d} \otimes b_{2,n_r} \otimes b_{1,n_t},$$

where $b_{4,n_r,n_t,s,d}$ is a transformation vector of size D×1 with respect to the fourth dimension of the channel tensor $\mathcal{H}$, selected from a codebook matrix $\Omega_4$, $b_{3,n_r,n_t,s,d}$ is a transformation vector of size S×1 with respect to the third dimension of the channel tensor $\mathcal{H}$, selected from a codebook matrix $\Omega_3$, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S'\leq S$ and $D'\leq D$.

For example, a transformation/compression with respect to the frequency dimension of the channel tensor $\mathcal{H}$ is represented by $$\mathcal{H} = \mathcal{F}_{(3)}(\hat{\mathcal{H}}),$$

$$vec(\mathcal{H}) =$$

$$vec(\mathcal{F}_{(3)}(\hat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,d} \otimes b_{3,n_r,n_t,s,d} \otimes b_{2,n_r} \otimes b_{1,n_t},$$

where $b_{4,d}$ is a vector of all zeros with the d-th element being one, $b_{3,n_r,n_t,s,d}$ is a transformation vector of size S×1 with respect to the third dimension of the channel tensor $\mathcal{H}$, selected from a codebook matrix $\Omega_3$, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S'\leq S$ and $D'=D$.

For example, a transformation/compression with respect to the time dimension of the channel tensor $\mathcal{H}$ is represented by $$\mathcal{H} = \mathcal{F}_{(4)}(\hat{\mathcal{H}}),$$

$$vec(\mathcal{H}) =$$

$$vec(\mathcal{F}_{(4)}(\hat{\mathcal{H}})) = \sum_{n_r=0}^{N'_r-1}\sum_{n_t=0}^{N'_t-1}\sum_{s=0}^{S'-1}\sum_{d=0}^{D'-1} \gamma_{n_r,n_t,s,d} b_{4,n_r,n_t,s,d} \otimes b_{3,s} \otimes b_{2,n_r} \otimes b_{1,n_t},$$

where $b_{4,n_r,n_t,s,d}$ is a transformation vector of size D×1 with respect to the fourth dimension of the channel tensor $\mathcal{H}$, selected from a codebook matrix $\Omega_4$, $b_{3,s}$ is a vector of all zeros with the s-th element being one, $b_{2,n_r}$ is a vector of all zeros with the $n_r$-th element being one, $b_{1,n_t}$ is a vector of all zeros with the $n_t$-th element being one and $N'_r=N_r$, $N'_t=N_t$, $S'=S$ and $D'\leq D$.

As an example, the selection of the transformation/compression vectors and transformed/compressed channel coefficients for a transformation/compression with respect to the third and fourth dimension, can be calculated by $$\min\|vec(\mathcal{H}) - vec(\mathcal{F}_{(3,4)}(\hat{\mathcal{H}}))\|_2^2.$$

The optimization problem may be solved by standard algorithms such as orthogonal matching pursuit. As a result, the indices of the vectors in the transformation matrices selected from the codebooks and the transformed channel coefficients associated with each domain are known.

The indices of the selected vectors $b_{1,n_r,n_t,s,d}$, $b_{2,n_r,n_t,s,d}$, $b_{3,n_r,n_t,s,d}$ and $b_{4,n_r,n_t,s,d}$ from the codebook matrices $\Omega_n$, n=1, 2, 3, 4 are stored in a set $\mathbb{Q}$ of g-tuples, where g refers to the number of transformed dimensions.

For example, for g=1, the set $\mathbb{Q}$ is represented by $\mathbb{Q}=\{i_1, i_2, \ldots, i_T\}$, where T denotes the number of selected vectors with respect to the transformed/compressed dimension of the channel tensor $\mathcal{H}$. For example, in the case of a transformation/compression with respect to the frequency dimension, T=S'.

For example, for g=4, the set $\mathbb{Q}$ is represented by 4-tuples $(i_{1,n_r}, i_{2,n_t}, i_{3,s}, i_{4,d})$, where $i_{1,n_r}$ is the index associated with vectors $b_{1,n_r,n_t,s,d}$, $i_{2,n_t}$ is the index associated with vector $b_{2,n_r,n_t,s,d}$, $i_{3,s}$ is the index associated with vector $b_{3,n_r,n_t,s,d}$ and $i_{4,d}$ is the index associated with vector $b_{4,n_r,n_t,s,d}$. The set $\mathbb{Q}$ is given by $$\mathbb{Q} = \{(i_{1,0}, i_{2,0}, i_{3,0}, i_{4,0}), \ldots, (i_{1,N'_r}, i_{2,N'_t}, i_{3,S'}, i_{4,D'})\}$$

In one method, the size of the set $\mathbb{Q}$ is configured via higher layer signaling from the gNB to the UE. In another method, the UE reports the preferred size of the set as a part of the CSI report or it is known at the UE.

The codebook matrices $\Omega_n$ are given by matrices $\Omega_n = [d_{n,0}, d_{n,1}, d_{n,TO_n-1}]$, where the parameter $O_{f,n}$ denotes the oversampling factor with respect to the n-th dimension with T being $T=N_r$ for n=1, $T=N_t$ for n=2, T=S for n=3 and T=D' for n=4.

The oversampled factors $O_{f,n}$ of the codebook matrices are configured via higher layer (e.g., RRC, or MAC) or via DCI physical layer signaling from the gNB to the UE, or they are known at the UE.

After the channel transformation/compression, the UE rewrites the transformed/compressed channel tensor to a transformed/compressed channel matrix $\hat{H}$ of size $N'_t N'_r \times S'D'$, (see FIG. 12) and applies a standard PCA decomposition, represented by $$\hat{H} = U\Sigma V^H = \sum_{i=1}^{R} s_i u_i v_i^H,$$

where
$U=[u_1, u_2, \ldots, u_R]$ is the $N'_t N'_r \times R$ left-singular matrix;
$V=[v_1, v_2, \ldots, v_R]$ is the $S'D' \times R$ right-singular matrix;
$\Sigma$ is a R×R diagonal matrix with ordered singular values $s_i$ ($s_1 \geq s_2 \geq \ldots \geq s_R$) on its main diagonal, and R=min(S'D', $N'_t N'_r$).

The transformed/compressed channel matrix $\hat{H}_c$ is then constructed using r, $1 \leq r \leq R$ dominant principal components as $$\hat{H}_c = \overline{U}\overline{\Sigma}\overline{V}^H,$$

where $\overline{U}=[u_1, u_2, \ldots, u_r]$ and $\overline{\Sigma}=\text{diag}(s_1, s_2, \ldots, s_r)$, and $\overline{V}=[v_1, v_2, \ldots, v_r]$.

The UE quantizes $\overline{U}$, $\overline{V}$ and the singular values $s_1, s_2, \ldots, s_r$ using a codebook approach, and then reports them along with the index set $\mathbb{Q}$ to the gNB.

The gNB reconstructs first the transformed/compressed channel matrix $\hat{H}_c$ as $$\hat{H}_c = \overline{U}\overline{\Sigma}\overline{V}^H.$$

Then, based on the transformed/compressed channel matrix, the gNB constructs the transformed/compressed channel tensor $\hat{\mathcal{H}}_c$. Using the signaled index sets $\mathbb{Q}$, the frequency-domain channel tensor $\mathcal{H}$ is reconstructed as $\mathrm{vec}(\mathcal{H}) \approx \mathcal{F}_{(1,2,3,4)}(\hat{\mathcal{H}}_c)$(four-dimensional transformation/compression);

$\mathrm{vec}(\mathcal{H}) \approx \mathcal{F}_{(1,2)}(\hat{\mathcal{H}}_c)$(two-dimensional transformation/compression);

$\mathrm{vec}(\mathcal{H}) \approx \mathcal{F}_{(3,4)}(\hat{\mathcal{H}}_c)$(two-dimensional transformation/compression);

$\mathrm{vec}(\mathcal{H}) \approx \mathcal{F}_{(3)}(\hat{\mathcal{H}}_c)$(one-dimensional transformation/compression).

$\mathrm{vec}(\mathcal{H}) \approx \mathcal{F}_{(4)}(\hat{\mathcal{H}}_c)$(one-dimensional transformation/compression).

In one method, the value of r representing the number of dominant principal components of the transformed/compressed channel matrix $\hat{H}_c$ is configured via higher layer (e.g., RRC, or MAC-CE) signaling from the gNB to the UE. In another method, the UE reports the preferred value of r as part of the CSI report or it is known at the UE.

In accordance with a sub-embodiment 71 of the seventh embodiment 7, the 4D transformation/compression function $\mathcal{F}_{(1,2,3,4)}(\hat{\mathcal{H}}_c)$ is given by a two dimensional (2D-DCT) with respect to the space dimensions and a 2D-DFT transformation with respect to the frequency and time dimension of the channel tensor. The codebook matrices $\Omega_n$, n=1,2 are given by oversampled DCT matrices and the codebook matrix $\Omega_3$ and $\Omega_4$ are given by an oversampled DFT matrices.

In accordance with a sub-embodiment 72 of the seventh embodiment 7, the 4D transformation/compression function $\mathcal{F}_{(1,2,3,4)}(\hat{\mathcal{H}}_c)$ is given by a 4D-DFT transformation and the codebook matrices $\Omega_n$, n=1, 2, 3, 4 are given by oversampled DFT matrices.

In accordance with a sub-embodiment 73 of the seventh embodiment 7, the 2D transformation/compression function $\mathcal{F}_{(1,2)}(\hat{\mathcal{H}}_c)$ is given by a 2D-DCT and the codebook matrices $\Omega_n$, n=1,2 are given by oversampled DCT matrices.

In accordance with a sub-embodiment 74 of the seventh embodiment 7, the 2D transformation/compression function $\mathcal{F}_{(3,4)}(\hat{\mathcal{H}}_c)$ is given by a 2D-DFT and the codebook matrices $\Omega_n$, n=3,4 are given by oversampled DFT matrices.

In accordance with a sub-embodiment 75 of the seventh embodiment 7, the 1D transformation/compression function $\mathcal{F}_{(3)}(\hat{\mathcal{H}})$ is given by a 1D-DFT transformation and the codebook matrix $\Omega_3$ is given by an oversampled DFT matrix.

In accordance with a sub-embodiment 76 of the seventh embodiment 7, the 1D transformation/compression function $\mathcal{F}_{(4)}(\hat{\mathcal{H}})$ is given by a 1D-DFT transformation and the codebook matrix $\Omega_4$ is given by an oversampled DFT matrix.

CSI Type Configurations and Needed Signaling

In accordance with an eighth embodiment 8, the explicit CSI reporting is performed according to one of different proposed standard PCA or HO-PCA based CSI transformation/compression schemes. The gNB sends the explicit CSI report configuration to the UE. The explicit CSI report configuration contains "Explicit CSI Type I":
  CSI channel type ("channel", "covariance of channel", "beamformed-channel", "covariance of beamformed-channel");
  the values ($r_1$, $r_2$, $r_3$) of dominant principal components with respect to the first, second and third dimension of the channel tensor;

"Explicit CSI Type I" With "Delay-Domain CSI for the Higher-Order Singular Matrix $U_S$":
  CSI channel type ("channel", "covariance of channel", "beamformed-channel", "covariance of beamformed-channel");
  the values ($r_1$, $r_2$, $r_3$) of dominant principal components with respect to the first, second and third dimension of the channel tensor;
  the number of delays L reported by the UE;
  the oversampling factor $O_f$ of the DFT-codebook;

"Explicit CSI Type II":
  CSI channel type ("channel", "covariance of channel", "beamformed-channel", "covariance of beamformed-channel");
  the value r of the dominant principal components of the channel matrix;
  the number of delays L reported by the UE;
  the oversampling factor $O_f$ of the DFT-codebook;

"Explicit CSI Type III":
  CSI channel type ("channel", "covariance of channel", "beamformed-channel", "covariance of beamformed-channel");
  the transformation function type of the channel tensor ("3D-DFT", "2D-DCT", "2D-DCT+1D-DFT", "1D-DFT");
  the oversampling factors $O_{f,n}$ of the codebooks with respect to the three dimensions of the channel tensor;
  the values ($r_1$, $r_2$, $r_3$) of dominant principal components with respect to the first, second and third dimension of the transformed/compressed channel tensor;

"Explicit CSI Type IV":
  CSI channel type ("channel", "covariance of channel", "beamformed-channel", "covariance of beamformed-channel");
  the transformation function type of the channel tensor ("3D-DFT", "2D-DCT", "2D-DCT+1D-DFT", "1D-DFT")
  the oversampling factors $O_{f,n}$ of the codebooks with respect to the three dimensions of the channel tensor;
  the value r of the dominant principal components of the transformed/compressed channel matrix;

"Explicit CSI Type V":
  CSI channel type ("channel", "covariance of channel", "beamformed-channel", "covariance of beamformed-channel");
  the values ($r_1$, $r_2$, $r_3$, $r_4$) of dominant principal components with respect to the first, second, third and fourth dimension of the channel tensor;

"Explicit CSI Type V" With "Delay-Domain CSI for the Higher-Order Singular Matrix $U_S$":
  CSI channel type ("channel", "covariance of channel", "beamformed-channel", "covariance of beamformed-channel");
  the values ($r_1$, $r_2$, $r_3$, $r_4$) of dominant principal components with respect to the first, second, third and fourth dimension of the channel tensor;
  the number of delays L reported by the UE;
  the oversampling factor $O_f$ of the DFT-codebook;

"Explicit CSI Type V" With "Time/Doppler-Frequency-Domain CSI for the Higher-Order Singular Matrix $\bar{U}_D$":
  CSI channel type ("channel", "covariance of channel", "beamformed-channel", "covariance of beamformed-channel");
  the values ($r_1, r_2, r_3, r_4$) of dominant principal components with respect to the first, second, third and fourth dimension of the channel tensor;
  the number of doppler frequencies G reported by the UE;
  the oversampling factor $O_t$ of the DFT-codebook;
"Explicit CSI Type VI":
  CSI channel type ("channel", "covariance of channel", "beamformed-channel", "covariance of beamformed-channel");
  the transformation function type of the channel tensor ("4D-DFT", "2D-DCT", "2D-DCT+2D-DFT", "2D-DFT for frequency- and time/Doppler-frequency domain", "1D-DFT for time/Doppler-frequency-domain", "1D-DFT for frequency-domain")
  the oversampling factors $O_{f,n}$ of the codebooks with respect to the four dimensions of the channel tensor;
  the values ($r_1, r_2, r_3, r_4$) of dominant principal components with respect to the first, second, third and fourth dimension of the transformed/compressed channel tensor;
"Explicit CSI Type VII":
  CSI channel type ("channel", "covariance of channel", "beamformed-channel", "covariance of beamformed-channel");
  the transformation function type of the channel tensor ("4D-DFT", "2D-DCT", "2D-DCT+2D-DFT", "2D-DFT for frequency- and time/Doppler-frequency domain", "1D-DFT for time/Doppler-frequency domain", "1D-DFT for frequency-domain")
  the oversampling factors $O_{f,n}$ for the codebooks with respect to the four dimensions of the channel tensor;
  the value r of the dominant principal components of the transformed/compressed channel matrix;
In response, the UE
  performs measurements of CSI-RS over D time instants/slots [if D is configured]
  constructs the channel tensor or channel matrix depending on the configured CSI channel type for each SB in which it is configured to report explicit CSI;
  applies a transformation/compression function to the channel tensor or channel matrix and calculates the index set $\mathbb{Q}$ depending on the configuration as explained with reference to embodiments 1-7;
  performs a standard PCA on the channel matrix, or an HO-PCA on the channel tensor depending on the configuration as explained with reference to embodiments 1-7;
  finally quantizes the singular matrices, singular values and reports them along with the index set $\mathbb{Q}$ to the gNB.

The gNB reconstructs the channel tensor or channel matrix as explained with reference to embodiments 1-7.

Codebook for Singular-Value Matrices and Singular Values Quantization

In accordance with a ninth embodiment 9, a UE is configured with separate codebooks, or a joint codebook for the quantization of "Explicit CSI Type I":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\bar{U}_S = [u_{S,1}, \ldots, u_{S,r_3}]$;
  singular values $S_{ijk}$ "Explicit CSI Type I" in Combination With "Delay-Domain CSI for the Higher-Order Singular Matrix $\bar{U}_S$":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\tilde{U}_S = [\tilde{u}_{S,1}, \ldots, \tilde{u}_{S,r_3}]$;
  singular values $S_{ijk}$ "Explicit CSI Type II":
  entries of each vector of $\bar{U} = [u_1, u_2, \ldots, u_r]$;
  entries of each vector of $\tilde{V} = [\tilde{v}_1, \tilde{v}_2, \ldots, \tilde{v}_r]$;
  singular values $\Sigma = \text{diag}(s_1, s_2, \ldots, s_r)$ "Explicit CSI Type III":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\bar{U}_S = [u_{S,1}, \ldots, u_{S,r_3}]$;
  singular values $S_{ijk}$ "Explicit CSI Type IV":
  entries of each vector of $\bar{U} = [u_1, u_2, \ldots, u_r]$;
  entries of each vector of $\bar{V} = [v_1, v_2, \ldots, v_r]$;
  singular values $\Sigma = \text{diag}(s_1, s_2, \ldots, s_r)$ "Explicit CSI Type V":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\bar{U}_S = [u_{S,1}, \ldots, u_{S,r_3}]$;
  entries of each vector of $\bar{U}_D = [u_{D,1}, \ldots, u_{D,r_4}]$;
  singular values $S_{ijkl}$ "Explicit CSI Type V" in Combination with "Delay-Domain CSI for the Higher-Order Singular Matrix $\bar{U}_S$":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\tilde{U}_S = [\tilde{u}_{S,1}, \ldots, \tilde{u}_{S,r_3}]$;
  entries of each vector of $\bar{U}_D = [u_{D,1}, \ldots, u_{D,r_4}]$;
  singular values $S_{ijkl}$ "Explicit CSI Type V" in Combination with "Doppler-Frequency Domain CSI for the Higher-Order Singular Matrix $\bar{U}_D$":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\bar{U}_S = [u_{S,1}, \ldots, u_{S,r_3}]$;
  entries of each vector of $\tilde{U}_D = [\tilde{u}_{D,1}, \ldots, \tilde{u}_{D,r_4}]$;
  singular values $S_{ijkl}$ "Explicit CSI Type "VI":
  entries of each vector of $\bar{U}_R = [u_{R,1}, \ldots, u_{R,r_1}]$;
  entries of each vector of $\bar{U}_T = [u_{T,1}, \ldots, u_{T,r_2}]$;
  entries of each vector of $\bar{U}_S = [u_{S,1}, \ldots, u_{S,r_3}]$;
  entries of each vector of $\bar{U}_D = [u_{D,1}, \ldots, u_{D,r_4}]$;
  singular values $S_{ijkl}$ "Explicit CSI Type "VII":
  entries of each vector of $\bar{U} = [u_1, u_2, \ldots, u_r]$;
  entries of each vector of $\bar{V} = [v_1, v_2, \ldots, v_r]$;
  singular values $\Sigma = \text{diag}(s_1, s_2, \ldots, s_r)$ according to the following embodiments.

In accordance with a sub-embodiment 91 of the ninth embodiment 9, a UE is configured with a scalar codebook for the quantization of each entry of vector of the HO-PCA, or standard-PCA singular-matrices according to the following alternatives:
  Common codebook: each entry of each HO-PCA, or standard-PCA singular-matrix is quantized with the same resolution/codebook, with k bits for the amplitude and n bits for the phase;
  Separate codebooks: the entries of each HO-PCA, or standard-PCA singular-matrix are quantized with different resolutions/codebooks. For example, for the HO-PCA channel compression, entries of each vector of $\bar{U}_R$ are quantized with $k_1$ bits for the amplitude and $n_1$ bits for the phase, and entries of each vector of $\bar{U}_T$ are quantized with $k_2$ bits for the amplitude and $n_2$ bits for the phase, and entries of each vector of $\bar{U}_S$ are quantized with $k_3$ bits for the amplitude and $n_3$ bits for the phase, and entries of each vector of $\bar{U}_D$ are quantized with $k_4$ bits for the amplitude and $n_4$ bits for the phase.

The codebook(s) is/are a priori known by the UE, or configured via higher layer signaling from the gNB to the UE.

In accordance with a sub-embodiment 92 of the ninth embodiment 9, a UE is configured with unit-norm vector codebook(s) for the quantization of each vector of the HO-PCA, or standard-PCA singular-matrices.

Let $C_{\bar{U}_R}$, $C_{\bar{U}_T}$, $C_{\bar{U}_S}$, $C_{\bar{U}_D}$, $C_{\tilde{U}_S}$, $C_{\tilde{U}_D}$ and $C_{\bar{U}}$, $C_{\bar{V}}$, $C_{\tilde{U}}$ be codebooks for high order singular matrices $\bar{U}_R$, $\bar{U}_T$, $\bar{U}_S$, $\bar{U}_D$, $\tilde{U}_S$ and the singular matrices $\bar{U}$, $\bar{V}$, $\tilde{V}$, respectively, where depending on the explicit CSI configuration, "Explicit CSI Type I":
  Codebook $C_{\bar{U}_R}$ comprises a set of unit-norm vectors, each of size $N_r \times 1$,
  Codebook $C_{\bar{U}_T}$ comprises a set of unit-norm vectors, each of size $N_t \times 1$, and
  Codebook $C_{\bar{U}_S}$ comprises a set of unit-norm vectors, each of size $S \times 1$.

"Explicit CSI Type I" in Combination With "Delay-Domain CSI for the Higher-Order Singular Matrix $\bar{U}_S$":
  Codebook $C_{\bar{U}_R}$ comprises a set of unit-norm vectors, each of size $N_r \times 1$,
  Codebook $C_{\bar{U}_T}$ comprises a set of unit-norm vectors, each of size $N_t \times 1$, and
  Codebook $C_{\tilde{U}_S}$ comprises a set of unit-norm vectors, each of size $L \times 1$.

"Explicit CSI Type II":
  Codebook $C_{\bar{U}}$ comprises a set of unit-norm vectors, each of size $N_t N_r \times 1$,
  Codebook $C_{\bar{V}}$ comprises a set of unit-norm vectors, each of size $L \times 1$.

"Explicit CSI Type III":
  Codebook $C_{\bar{U}_R}$ comprises a set of unit-norm vectors, each of size $N'_r \times 1$,
  Codebook $C_{\bar{U}_T}$ comprises a set of unit-norm vectors, each of size $N'_t \times 1$, and
  Codebook $C_{\bar{U}_S}$ comprises a set of unit-norm vectors, each of size $S' \times 1$.

"Explicit CSI Type IV":
  Codebook $C_{\bar{U}}$ comprises a set of unit-norm vectors, each of size $N' \times 1$,
  Codebook $C_{\bar{V}}$ comprises a set of unit-norm vectors, each of size $S' \times 1$.

"Explicit CSI Type V":
  Codebook $C_{\bar{U}_R}$ comprises a set of unit-norm vectors, each of size $N_r \times 1$,
  Codebook $C_{\bar{U}_T}$ comprises a set of unit-norm vectors, each of size $N_t \times 1$, and
  Codebook $C_{\bar{U}_S}$ comprises a set of unit-norm vectors, each of size $S \times 1$.
  Codebook $C_{\bar{U}_D}$ comprises a set of unit-norm vectors, each of size $D \times 1$.

"Explicit CSI Type V" in Combination With "Delay-Domain CSI for the Higher-Order Singular Matrix $\bar{U}_S$":
  Codebook $C_{\bar{U}_R}$ comprises a set of unit-norm vectors, each of size $N_r \times 1$,
  Codebook $C_{\bar{U}_T}$ comprises a set of unit-norm vectors, each of size $N_t \times 1$,
  Codebook $C_{\tilde{U}_S}$ comprises a set of unit-norm vectors, each of size $L \times 1$.
  Codebook $C_{\bar{U}_D}$ comprises a set of unit-norm vectors, each of size $D \times 1$.

"Explicit CSI Type V" in Combination with "d Time/Doppler-Frequency-Domain CSI for the Higher-Order Singular Matrix $\bar{U}_D$":
  Codebook $C_{\bar{U}_R}$ comprises a set of unit-norm vectors, each of size $N_r \times 1$,
  Codebook $C_{\bar{U}_T}$ comprises a set of unit-norm vectors, each of size $N_t \times 1$,
  Codebook $C_{\bar{U}_S}$ comprises a set of unit-norm vectors, each of size $S \times 1$.
  Codebook $C_{\tilde{U}_D}$ comprises a set of unit-norm vectors, each of size $G \times 1$.

"Explicit CSI Type VI":
  Codebook $C_{\bar{U}_R}$ comprises a set of unit-norm vectors, each of size $N'_r \times 1$,
  Codebook $C_{\bar{U}_T}$ comprises a set of unit-norm vectors, each of size $N'_t \times 1$, and
  Codebook $C_{\bar{U}_S}$ comprises a set of unit-norm vectors, each of size $S' \times 1$.
  Codebook $C_{\bar{U}_D}$ comprises a set of unit-norm vectors, each of size $D' \times 1$.

Explicit CSI Type VII":
  Codebook $C_{\bar{U}}$ comprises a set of unit-norm vectors, each of size $N'_t N'_r \times 1$,
  Codebook $C_{\bar{V}}$ comprises a set of unit-norm vectors, each of size $S'D' \times 1$.

The UE selects for each vector/column in matrix A (where A represents one of the following matrices $\bar{U}_R$, $\bar{U}_T$, $\bar{U}_S$, $\tilde{U}_S$, $\bar{U}_D$, $\tilde{U}_D$, or $\bar{U}$, $\bar{V}$, $\tilde{V}$) a vector in $C_A$ to represent the vector/column in matrix A, and reports the indices corresponding to the selected vectors in $C_A$ as a part of the CSI report to the gNB.

In accordance with a sub-embodiment 93 of the ninth embodiment 9, a UE is configured with a scalar codebook to quantize the high-order singular values $S_{ijk}$ or $\tilde{S}_{ijk}$ the non-HO singular values in matrix $\Sigma$ using a scalar codebook, where each singular value is quantized with k bits for the amplitude.

Overhead Reduction

In accordance with a tenth embodiment 10, a UE is configured with explicit CSI reporting as described in embodiments 1-7 and to reduce overhead the UE reports, depending on the explicit CSI configuration, the HO singular matrices ($\bar{U}_R$, $\bar{U}_T$, $\bar{U}_S$ or $\tilde{U}_S$, $\bar{U}_D$ or $\tilde{U}_D$) or the non-HO singular matrices ($\bar{U}$, $\bar{V}$, or $\tilde{V}$), separately in alternative CSI reporting instances.

CSI-RS-BurstDuration

In accordance with further embodiments, the gNB or base station sends a CSI-RS configuration and CSI report configuration to the UE, and the CSI-RS configuration may include a CSI-RS resource(s) configuration with respect to sub-clause 7.4.1.5 in TS 38.211 (3GPP TS 38.211 V15.1.0, "3rd Generation Partnership Project; Technical Specification Group Radio Access Network; NR; Physical channels and modulation (Release 15), March 2018) and with sub-clause 6.3.2 in TS.38.331 (3GPP TS 38.331 V15.1.0, "3rd Generation Partnership Project; Technical Specification Group Radio Access Network; NR; Radio Resource Control (RRC); Protocol specification (Release 15), March 2018. Further, an additional higher layer parameter configuration referred to as CSI-RS-BurstDuration is included.

The CSI-RS-BurstDuration is included to provide a CSI-RS design allowing to track the time-evolution of the channel. In accordance with embodiments, a UE is configured with a CSI-RS resource set(s) configuration with the higher layer parameter CSI-RS-BurstDuration, in addition to the configurations from clause 7.4.1.5 in TS 38.211 and clause 6.3.2 in TS.38.331 mentioned above, to track the time-evolution of CSI. The time-domain-repetition of the CSI-RS, in terms of the number of consecutive slots the CSI-RS is repeated in, is provided by the higher layer parameter CSI-RS-BurstDuration. The possible values of CSI-RS-BurstDuration for the NR numerology µ are $2^\mu \cdot X_B$ slots, where $X_B \in \{0, 1, 2, \ldots, \text{maxNumBurstSlots}-1\}$. The NR numerology µ=0, 1, 2, 3, 4 . . . defines, e.g., a subcarrier spacing of $2^\mu \cdot 15$ kHz in accordance with the NR standard.

Figure 16A:
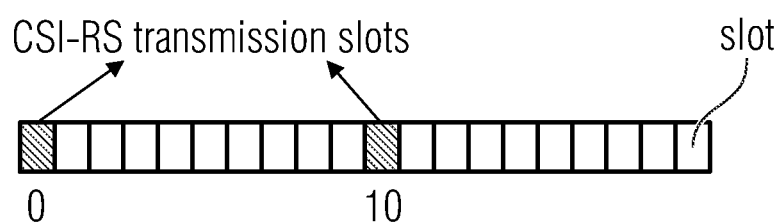
FIG. 16(a) illustrates a CSI-RS with a periodicity of 10 slots and no repetition (CSI-RS-BurstDuration not configured or CSI-RS-BurstDuration=0)
Figure 16B:
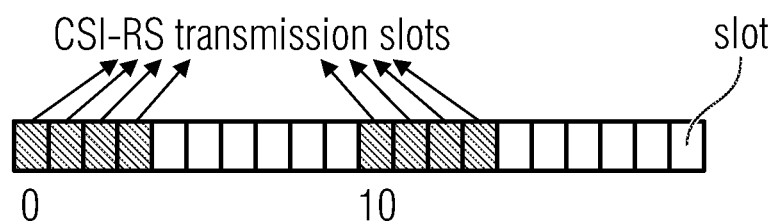
FIG. 16(b) illustrates a CSI-RS with a periodicity of 10 slots and repetition of 4 slots (CSI-RS-BurstDuration=4)

For example, when the value of $X_B$=0 or the parameter CSI-RS-BurstDuration is not configured, there is no repetition of the CSI-RS over multiple slots. The burst duration scales with the numerology to keep up with the decrease in the slot sizes. Using the same logic used for periodicity of CSI-RS. FIG. 16(a) illustrates a CSI-RS with a periodicity of 10 slots and no repetition (CSI-RS-BurstDuration not configured or CSI-RS-BurstDuration=0), and FIG. 16(b) illustrates a CSI-RS with a periodicity of 10 slots and repetition of 4 slots (CSI-RS-BurstDuration=4). FIG. 17 illustrates a CSI-RS-BurstDuration information element in accordance with an embodiment. The information element of the new RRC parameter CSI-RS-BurstDuration is as follows: the value next to the text burstSlots indicates the value of $X_B$, which for a given New Radio numerology µ (see [1]) provides the burst duration $2^\mu \cdot X_B$ of the CSI-RS, i.e., the number of consecutive slots of CSI-RS repetition.

The burst-CSI-RS across multiple consecutive slots enables the extraction of time-evolution information of the CSI and for reporting the explicit CSI, in a way as described in more detail above. In other words, the UE may calculate the explicit CSI according to the embodiments described above with a repetition of the CSI-RS resource(s) over multiple consecutive slots, and report them accordingly.

In accordance with the embodiments, the wireless communication system may include a terrestrial network, or a non-terrestrial network, or networks or segments of networks using as a receiver an airborne vehicle or a spaceborne vehicle, or a combination thereof.

In accordance with the embodiments, the the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with the embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system employing a rank 1 or layer 1 communication. However, the present invention is not limited to such embodiments and may also be implemented in a communication system employing a higher rank or layer communication. In such embodiments, the feedback includes the delays per layer and the complex precoder coefficients per layer.

The embodiments of the present invention have been described above with reference to a communication system in which the transmitter is a base station serving a user equipment, and the communication device or receiver is the user equipment served by the base station. However, the present invention is not limited to such embodiments and may also be implemented in a communication system in which the transmitter is a user equipment station, and the communication device or receiver is the base station serving the user equipment. In accordance with other embodiments, the communication device and the transmitter may both be UEs communicating via directly, e.g., via a sidelink interface.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 18 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A communication device for providing an explicit channel state information, CSI, feedback in a wireless communication system, the communication device comprising:

a transceiver configured to receive, from a transmitter a radio signal via a radio time-variant frequency MIMO channel, the radio signal comprising downlink reference signals according to a reference signal configuration, and downlink signals comprising the reference signal configuration; and a processor configured to estimate the CSI using measurements on the downlink reference signals of the radio channel, construct a frequency-domain channel matrix using the CSI estimate, perform a standard principal component analysis, PCA, on the channel matrix, identify the dominant principal components of the channel matrix, the channel matrix comprising a first set of r basis vectors comprised by a matrix $\overline{U}=[u_1, u_2, \ldots, u_r] \in \mathbb{C}^{N_t N_r \times r}$;

a second set of r basis vectors comprised by a matrix $\overline{V}=[v_1, v_2, \ldots, v_r] \in \mathbb{C}^{S \times r}$; and a third set of r coefficients comprised by a diagonal matrix $\Sigma = \text{diag}(s_1, s_2, \ldots, s_r) \in \mathbb{C}^{r \times r}$ with ordered singular values $s_i$ ($s_1 \geq s_2 \geq \ldots \geq s_r$) on its diagonal;

calculate a reduced-sized delay-domain matrix $\tilde{V}$ from the frequency-domain matrix $\overline{V}$, wherein the delay-domain matrix, comprising r basis vectors, is given by $$\overline{V} \approx F_V \tilde{V},$$

where $F_V \in \mathbb{C}^{S \times L}$ contains L vectors of size S×1, selected from a discrete Fourier transform, DFT, codebook $\Omega$, the size of a compressed delay-domain matrix $\tilde{V}=[\tilde{v}_1, \tilde{v}_2, \ldots, \tilde{v}_r]$ is given by L×r, and L is the number of delays, and the oversampled codebook matrix is given by $\Omega=[d_0, d_1, \ldots, d_{SO_f-1}]$, where $$\left[1 \ e^{\frac{-j2\pi i}{O_f S}} \ \ldots \ e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes an oversampling factor of the DFT-codebook matrix; and report to the transmitter the explicit CSI comprising an identified first set of r basis vectors, a second reduced-sized delay-domain set of r basis vectors, along with the L delays, represented by a set of indices that correspond to the selected DFT-vectors in the codebook $\Omega$.

2. The communication device of claim 1, wherein a value of r representing the number of dominant principal components of a transformed channel matrix is configured via a CSI report configuration by the transmitter, or it is reported by the communication device in the CSI report, or it is pre-determined and known at the communication device.

3. The communication device of claim 1, wherein the processor is configured to quantize the coefficients of the basis vectors $u_i$, $\tilde{v}_i$, and the singular values $s_i$ of the channel matrix using a codebook approach.

4. The communication device of claim 1, wherein
the communication device is configured with
one or more scalar codebooks for a quantization of each entry of each basis vector of the plurality of dominant principal components of a channel tensor or a compressed channel tensor and the singular values or high order singular values, or
one or more unit-norm vector codebooks for a quantization of each basis vector of the plurality of dominant principal components of the channel tensor or the compressed channel tensor, and wherein the communication device selects for each basis vector a codebook vector to represent the basis vector, and
the communication device is configured to report the indices corresponding to the selected entries in a scalar or vector codebook as a part of the CSI report to the transmitter.

5. A transmitter in a wireless communication system, the transmitter comprising:
an antenna array comprising a plurality of antennas for a wireless communication with one or more communication devices for providing a channel state information, CSI, feedback to the transmitter; and
a precoder connected to the antenna array, the precoder to apply a set of beamforming weights to one or more antennas of the antenna array to form, by the antenna array, one or more transmit beams or one or more receive beams,
a transceiver configured to
transmit, to a communication device, downlink reference signals (CSI-RS) according to a CSI-RS configuration, and downlink signals comprising the CSI-RS configuration for allowing the communication device to
estimate the CSI using measurements on the downlink reference signals of a radio channel,
construct a frequency-domain channel matrix using the CSI estimate,
perform a standard principal component analysis, PCA, on the channel matrix,
identify the dominant principal components of the channel matrix, the channel matrix comprising
a first set of r basis vectors comprised by a matrix $\overline{U}=[u_1, u_2, \ldots, u_r] \in \mathbb{C}^{N_t N_r \times r}$;
a second set of r basis vectors comprised by a matrix $\overline{V}=[v_1, v_2, \ldots, v_r] \in \mathbb{C}^{S \times r}$; and
a third set of r coefficients comprised by a diagonal matrix $\Sigma=\text{diag}(s_1, s_2, \ldots, s_r) \in \mathbb{C}^{r \times r}$ with ordered singular values $s_i$ ($s_1 \geq s_2 \geq \ldots \geq s_r$) on its diagonal;
calculate a reduced-sized delay-domain matrix $\tilde{V}$ from the frequency-domain matrix $\overline{V}$, wherein the delay-domain matrix, comprising r basis vectors, is given by $$\overline{V} \approx F_V \tilde{V},$$

where
$F_V \in \mathbb{C}^{S \times L}$ contains L vectors of size S×1, from a discrete Fourier transform, DFT, codebook $\Omega$, the size of a compressed delay-domain matrix $\tilde{V}=[\tilde{v}_1, \tilde{v}_2, \ldots, \tilde{v}_r]$ is given by L×r, and L is the number of delays, and an oversampled codebook matrix is given by $\Omega=[d_0, d_1, \ldots, d_{SO_f-1}]$, where $$\left[1 \quad e^{\frac{-j2\pi i}{O_f S}} \quad \ldots \quad e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes an oversampling factor of the DFT-codebook matrix; and
report to the transmitter the explicit CSI comprising an identified first set of r basis vectors, a second reduced-sized delay-domain set of r basis vectors, along with the L delays, represented by a set of indices that correspond to the selected DFT-vectors in the codebook $\Omega$; and
receive uplink signals comprising a plurality of CSI reports comprising an explicit CSI from the communication device; and
a processor configured to construct a precoder matrix applied on antenna ports using the explicit CSI.

6. A method for providing by a communication device in a wireless communication system an explicit channel state information, CSI, feedback, the method comprising:
receiving, from a transmitter, a radio signal via a radio time-variant frequency MIMO channel, the radio signal comprising downlink reference signals according to a reference signal configuration, and downlink signals comprising the reference signal configuration; and
estimating the CSI using measurements on the downlink reference signals of the radio channel,
constructing a frequency-domain channel matrix using the CSI estimate,
performing a standard principal component analysis, PCA, on the channel matrix,
identifying the dominant principal components of the channel matrix, the channel matrix comprising
a first set of r basis vectors comprised by a matrix $\overline{U}=[u_1, u_2, \ldots, u_r] \in \mathbb{C}^{N_t N_r \times r}$;
a second set of r basis vectors comprised by a matrix $\overline{V}=[v_1, v_2, \ldots, v_r] \in \mathbb{C}^{S \times r}$; and
a third set of r coefficients comprised by a diagonal matrix $\Sigma=\text{diag}(s_1, s_2, \ldots, s_r) \in \mathbb{C}^{r \times r}$ with ordered singular values $s_i$ ($s_1 \geq s_2 \geq \ldots \geq s_R$) on its diagonal;
calculating a reduced-sized delay-domain matrix $\tilde{V}$ from the frequency-domain matrix $\overline{V}$, wherein the delay-domain matrix, comprising r basis vectors, is given by $$\overline{V} \approx F_V \tilde{V},$$

where
$F_V \in \mathbb{C}^{S \times L}$ contains L vectors of size S×1, selected from a discrete Fourier transform, DFT, codebook $\Omega$, the size of a compressed delay-domain matrix $\tilde{V}=[\tilde{v}_1, \tilde{v}_2, \ldots, \tilde{v}_r]$ is given by L×r, and L is the number of delays, and
the oversampled codebook matrix is given by $\Omega=[d_0, d_1, \ldots, d_{SO_f-1}]$, where $$\left[1 \quad e^{\frac{-j2\pi i}{O_f S}} \quad \ldots \quad e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes
an oversampling factor of the DFT-codebook matrix;
and reporting the explicit CSI comprising an identified first set of r basis vectors, a second reduced-sized delay-domain set of r basis vectors, along with the L delays, represented by a set of indices that correspond to the selected DFT-vectors in the codebook $\Omega$ from the communication device to the transmitter.

7. A non-transitory digital storage medium having a computer program stored thereon to perform, when run by a computer, a method for providing by a communication device in a wireless communication system an explicit channel state information, CSI, feedback, the method comprising:
receiving, from a transmitter, a radio signal via a radio time-variant frequency MIMO channel, the radio signal comprising downlink reference signals according to a reference signal configuration, and downlink signals comprising the reference signal configuration; and
estimating the CSI using measurements on the downlink reference signals of the radio channel,
constructing a frequency-domain channel matrix using the CSI estimate,
performing a standard principal component analysis, PCA, on the channel matrix,
identifying the dominant principal components of the channel matrix, the channel matrix comprising
a first set of r basis vectors comprised by a matrix $\overline{U}=[u_1, u_2, \ldots, u_r] \in \mathbb{C}^{N_t N_r \times r}$;
a second set of r basis vectors comprised by a matrix $\overline{V}=[v_1, v_2, \ldots, v_r] \in \mathbb{C}^{S \times r}$; and
a third set of r coefficients comprised by a diagonal matrix $\overline{\Sigma}=\text{diag}(s_1, s_2, \ldots, s_r) \in \mathbb{C}^{r \times r}$ with ordered singular values $s_i$ ($s_1 \geq s_2 \geq \ldots \geq s_r$) on its diagonal;
calculate a reduced-sized delay-domain matrix $\tilde{V}$ from the frequency-domain matrix $\overline{V}$, wherein the delay-domain matrix, comprising r basis vectors, is given by $$\overline{V} \approx F_V \tilde{V},$$

where
$F_V \in \mathbb{C}^{S \times L}$ contains L vectors of size S×1, selected from a discrete Fourier transform, DFT, codebook $\Omega$, the size of a compressed delay-domain matrix $\tilde{V}=[\tilde{v}_1, \tilde{v}_2, \ldots, \tilde{v}_r]$ is given by L×r, and L is the number of delays, and
an oversampled codebook matrix is given by $\Omega=[d_0, d_1, \ldots, d_{SO_f-1}]$, where $$\left[1 \; e^{\frac{-j2\pi i}{O_f S}} \; \ldots \; e^{\frac{-j2\pi i(S-1)}{O_f S}}\right]^T \in \mathbb{C}^{S \times 1}, i \in \{0, \ldots, SO_f - 1\},$$

and $O_f \in \{1, 2, 3, \ldots\}$ denotes
an oversampling factor of the DFT-codebook matrix; and
reporting the explicit CSI comprising an identified first set of r basis vectors, a second reduced-sized delay-domain set of r basis vectors, along with the L delays, represented by a set of indices that correspond to the selected DFT-vectors in the codebook $\Omega$ from the communication device to the transmitter.

* * * * *